United States Patent [19]

Berend et al.

[11] Patent Number: 5,692,117
[45] Date of Patent: Nov. 25, 1997

[54] METHOD AND APPARATUS FOR PRODUCING ANIMATED DRAWINGS AND IN-BETWEEN DRAWINGS

[75] Inventors: Andrew Louis Charles Berend; Mark Jonathan Williams; Michael John Brocklehurst; Stuart Philip Hawkins; Gavin Timothy Jones, all of Cambridge, United Kingdom

[73] Assignee: Cambridge Animation Systems Limited, United Kingdom

[21] Appl. No.: 844,634

[22] PCT Filed: Nov. 29, 1991

[86] PCT No.: PCT/GB91/02122

§ 371 Date: Mar. 30, 1992

§ 102(e) Date: Mar. 30, 1992

[87] PCT Pub. No.: WO92/09964

PCT Pub. Date: Jun. 11, 1992

[30] Foreign Application Priority Data

Nov. 30, 1990 [GB] United Kingdom ............... 9026120
Jan. 11, 1991 [GB] United Kingdom ............... 9100632
Jan. 31, 1991 [GB] United Kingdom ............... 9102125
May 21, 1991 [GB] United Kingdom ............... 9110945
Aug. 12, 1991 [GB] United Kingdom ............... 9117409

[51] Int. Cl.[6] .................................................. G06T 13/00
[52] U.S. Cl. ...................................................... 395/152
[58] Field of Search ............................. 345/113, 114, 345/119, 122; 395/118, 119, 120, 121, 122, 138, 140, 159, 160, 152

[56] References Cited

U.S. PATENT DOCUMENTS

| | | | |
|---|---|---|---|
| 3,364,382 | 1/1968 | Harrison, III | 315/18 |
| 3,898,438 | 8/1975 | Nater et al. | 395/99 |
| 4,600,919 | 7/1986 | Stern | 340/725 |
| 4,683,468 | 7/1987 | Himelstein et al. | 340/709 |
| 4,760,548 | 7/1988 | Baker et al. | 364/718 |
| 4,858,150 | 8/1989 | Aizawa et al. | 395/120 |
| 4,952,051 | 8/1990 | Lovell et al. | 352/87 |
| 5,214,758 | 5/1993 | Ohba et al. | 395/164 |
| 5,233,671 | 8/1993 | Murayama | 382/56 |
| 5,416,899 | 5/1995 | Poggio et al. | 395/152 |

FOREIGN PATENT DOCUMENTS

| | | | |
|---|---|---|---|
| 0156117 | 1/1985 | European Pat. Off. | G06F 15/20 |
| 0194442 | 2/1986 | European Pat. Off. | G06F 15/62 |
| 0246340 | 5/1986 | European Pat. Off. | G09B 23/28 |
| 0358498 | 9/1989 | European Pat. Off. | G06F 15/72 |
| 0365960 | 10/1989 | European Pat. Off. | G06F 15/72 |
| 63-143676 | 6/1988 | Japan | G06F 15/62 |
| 1399538 | 2/1971 | United Kingdom | G06F 1/00 |
| 1437795 | 7/1973 | United Kingdom | G06K 15/20 |
| 2017459 | 2/1979 | United Kingdom | G06K 15/20 |

OTHER PUBLICATIONS

Strasmann, "Hairy Brushes" 1986 Siggraph Conference Proceedings (vol. 20, No. 4, pp. 225–232).

"3-D Character Animation on the Symbolic System", P. Bergeron (issued as course notes at the Siggraph '87 conference) 2435 Computer Vision, Graphics and Image Processing 33, No. 3, pp. 346–363.

(1986), Florida, U.S.A.; Yang: "Automatic Curve Fitting with Quadradic B-Spline Functions and its Applications to Computer-Assisted Animation" 2388 Computers & Graphics 13, No. 1, pp. 77–82, 1989, Oxford, Great Britain.

Pintado: "Grafields: Field-Directed Dynamic Splines for Interactive Motion control" (See, p. 77, lns. 16–23).

PCT International Publication #WO 89/09458 (PCT/SE89/00152 (Oct. 5, 1989).

Primary Examiner—Robert W. Beausoliel, Jr.
Assistant Examiner—Stephen Elmore
Attorney, Agent, or Firm—Lerner, David, Littenberg, Krumholz & Mentlik

[57] ABSTRACT

Apparatus for generating an animated sequence of pictures consists of a store for storing data defining a plurality of pictures and data defining, for each, a temporal position in the sequence; and interpolator for reading stored data and generating therefrom data defining a plurality of intervening pictures occurring at time positions between those of said stored pictures, and providing a transition therebetween; and an editor for editing the data so as to amend the sequence.

83 Claims, 66 Drawing Sheets

PRIOR ART

FREEHAND CURVE

REPRESENTATION OF
CURVE WITH MANY
STRAIGHT LINE SEGMENTS

REPRESENTATION OF
CURVE AS SERIES
OF CURVE SEGMENTS

CURVE SEGMENTS WITH
CURVATURE DISCONTINUITY

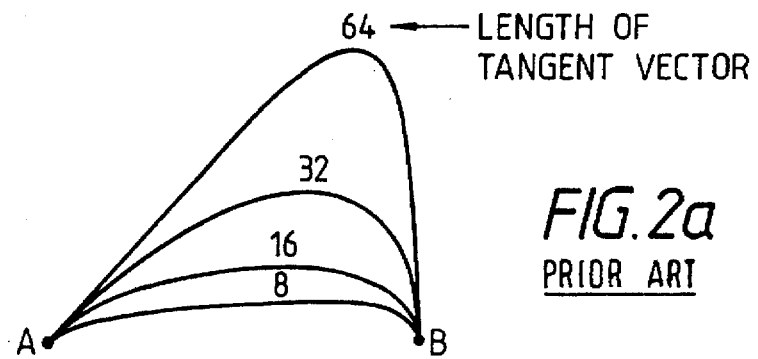

SEQUENCE:

TIMELINE 1
TIMELINE 2
⋮
TIMELINE n

POINTER TO PARENT EPOCH OBJECT
COMPOSITE CURVE-SET LIST
BASE CURVE-SET LIST
LENGTH OF COMPOSITE SEQUENCE
LENGTH OF BASE SEQUENCE
POINTER TO CURRENT TIMELINE
COMPOSITE CURVES UPPER BOUND POINTER
COMPOSITE CURVES LOWER BOUND POINTER
TEMPLATE CURVE SET

1100

TIMELINE:

FIG. 13d

KEYFRAME:

- INTERPOLANT 1
- INTERPOLANT 2
- ⋮
- INTERPOLANT n

POINTER TO PARENT TIMELINE OBJECT
FRAME TYPE [ = "KEY"]

FRAME NUMBER
KEY NUMBER
POINTER TO FRAME CURVE SET 122

NUMBER OF INTERPOLANTS

INTERPOLANT:

POINTER TO PARENT TIMELINE OBJECT
POINTER TO PARENT KEYFRAME OBJECT
FRAME TYPE [ = "INTERPOLANT" ]

FRAME NUMBER
INTERPOLANT FACTOR [ 0 TO 1 ]
POINTER TO FRAME CURVE SET 122

| | | | | | | | | |
|---|---|---|---|---|---|---|---|---|
| K1 | 0.0 | | | | | | | |
| K2 | 0.9 | | | | | | | |
| F1 | 0.2 | $x_1\ y_1$ | $x_{e1}\ y_{e1}$ | $x_{f1}\ y_{f1}$ | | $x_2\ y_2$ | $x_{e2}\ y_{e2}$ | $x_{f2}\ y_{f2}$ |
| F2 | 0.6 | $x_1\ y_1$ | $x_{e1}\ y_{e1}$ | $x_{f1}\ y_{f1}$ | | $x_2\ y_2$ | $x_{e2}\ y_{e2}$ | $x_{f2}\ y_{f2}$ |
| | | | | | | | | |
| FN | | | | | | | | |
| (ARMATURE) | | | | | | | | |

5110, 5111, 5112, 5113, 5114, 5115, 5116

| VIEW DIRECTION | $N_x, N_y, N_z, U_x, U_y, U_z, V_x, V_y, V_z$ |
|---|---|
| DISTANCE | D |
| ZOOM | M |
| | |

3100, 3200, 3000

METHOD AND APPARATUS FOR PRODUCING ANIMATED DRAWINGS AND IN-BETWEEN DRAWINGS

FIELD OF THE INVENTION

This invention relates to apparatus for, and a method of, producing a sequence of images defining an animated sequence, such as a cartoon.

DESCRIPTION OF THE BACKGROUND ART

Traditionally, cartoons are manually drawn as a sequence of frames which, when played in succession at relatively high speed, form a moving picture (typical frame rates are 24, 25 or 30 frames per second, although sometimes frames are repeated twice). Even for a short sequence, many thousands of frames thus need to be drawn by hand and production of the hand drawn frames requires large teams of skilled animators and assistance. Almost all cartoon animation today is still produced in this way.

Some essential steps in production of cartoon animations are:

1. "key frame" production, in which senior animator draws each character at significant points throughout the sequence;
2. "in betweening", in which more junior (less skilled) animators create the missing intermediate frames by a process of interpolating by eye between adjacent key frames, and then
3. "line testing", in which the sequence of key frames and in between frames are recorded on film or video tape and then replayed to check for other errors. If necessary, frames are redrawn at this point; otherwise, the pencil drawings are then transferred to clear cel, inked in, painted in the required colours, placed on the required background, and recorded on film or video.

In view of the sheer volume of drawings required, and of the time and expense involved in producing cartoons by this method, some attempts have been made to automate parts of the process. Inking and colouring has successfully been automated, resulting in some savings in manpower and time.

It has also previously been proposed to automate the interpolation or "in betweening" stage. In such proposals, the key frames produced by the senior animator are scanned in some manner by input means into an image processor such as a programmed computer, where an internal representation of each is stored. Corresponding points or lines, or other parts of two key frames, are identified manually and in between images are generated by producing a sequence of frames in each of which a similar set of points, lines or parts are generated by interpolation between those of two adjacent stored key frames. The remainder of the frame between the identified points or parts is then generated.

Such proposals have been uniformally unsuccessful, however, because the problem of identifying corresponding parts in two key frames derived from the original picture material is extremely difficult. Two key frames drawn by the same artist may appear similar to the human eye, but every point of the two line drawings may be different and the image processing apparatus is unable to distinguish between differences which correspond to motion or intentional change, and are hence to be interpolated, and those which are merely accidental.

One prior proposal for character animation is described in "3-D character animation on the symbolics system", by P. Bergeron, issued as Course Notes on the Course "3D Character Animation by Computer" at the Siggraph '87 Conference in 1987.

This publication describes the use of a three dimensional modelling program (S-geometry) and an animation (in the broad sense of the word) program (S-dynamics) to animate cartoon characters. Each character is modelled as a spline surface defined by a mesh of control points. The article proposes to create a plurality of "expressions" corresponding to different pictures, each of which is derived from a "source" expression. The "expressions" are created by performing a transformation upon a plurality of the control points of the mesh of the "source" expression, using the S-geometry program.

After creating the expressions, the separate S-dynamics program is used to produce a sequence of pictures. A bar chart illustrating the value of a control variable as the height of bars along a timeline is interactively manipulated by a position sensitive input device (a mouse) to create or modify the different pictures of the sequence. The control variable may dictate the amount of a given transformation operation to be applied (such as rotation), or may give a percentage of one of the predetermined expressions so that a given picture is interpolated between the "source" expression and the given expression in proportion to the percentage. In this case, an interpolated sequence of pictures can be produced between first and second percentages of a single expression. Different sub-sequences of pictures can be combined to produce a composite sequence, of which each picture is defined by the control variables from each of the sub-sequences.

The publication teaches that, although automatic interpolation between "key" values of the control variable (for instance, percentages of a single expression) is possible in the S-dynamics program, it is particularly important for character animation not to use this facility for interpolating between percentages of an expression but instead to allow the user to specify every value of the control variable for each frame by freehand sketch. Further, although the values of the. control variable may be edited, the "expressions" themselves cannot while the sequence is retained. We have found, however, that the apparatus described in the publication makes character animation relatively slow and laborious.

The S-geometry three dimensional modelling programme referred to above describes the three dimensional figure as a wire frame model, comprising a mesh of control points at the surface of the figure. Other previous three dimensional modelling systems have approached the problem in different ways. For example, in GB 1399538, a mannikin model is supplied with position sensing transducers, so that the user can manually manipulate the mannikin whilst a computer senses the positions of the joints thereof. WO89/09458 employs a similar principle, but provides instead a human actor in a suit provided with position sensors. U.S. Pat. No. 3,364,382 represents bones of a figure as deflection voltages on a cathode ray tube, and provides a surrounding flesh envelope by superimposing a modulating voltage. U.S. Pat. No. 3,747,087 appears to treat different components (e.g. limbs) of an animated figure (in two dimensions) by scanning a real image of each component, and combining the resulting raster component images.

U.S. Pat. No. 4,600,919 provides a three dimensional model of a humanoid figure to be animated by providing three dimensional coordinates defining limbs connected at joints. The limbs are rigid, and are specified by points defining the corners of a polygonal box. To represent a rounded or curved figure, it would therefore be necessary to provide a large number of corners so as to approximate a curved surface, which is complex to edit and slow to calculate.

SUMMARY OF THE INVENTION

Accordingly, in a first embodiment, we provide a system in which, rather than specifying "expressions" and then manipulating percentages of a single expression to create a sequence or sub-sequence, the apparatus defines pictures which will actually occur at predetermined times in the sequence and then generates the interpolated pictures in between. The interpolation may be, in one system mode, performed automatically following a predetermined (e.g. linear) curve or rule. In this case, in particular since the interpolation will not always be successful, it is also strongly preferred (but not essential in all embodiments) to provide editing means enabling the user to subsequently edit the sequence thus produced. This greatly accelerates the animation process, since in many cases the interpolation will be acceptable, whilst not sacrificing the necessary flexibility to amend those instances where it is not.

The present invention, in one aspect, provides apparatus which interpolates between key frames which are generated to explicitly correspond one to another. Preferably, the key frames are stored as data defining parametric curves (that is, curves controlled by control points), and the control points in the two key frames are labelled as corresponding one to the other. Preferably, the apparatus includes means allowing the user to define key frames, and preferably key frames are defined by adapting a common template key frame so that all key frames correspond.

Preferably, the apparatus is provided with means for allowing the user to insert additional control points, so as to permit the complexity of a frame to vary; preferably, in this embodiment, the template is correspondingly modified to add the further control point. Advantageously, the further control point may be active or inactive depending on an associated flag; thus, two keyframes of different complexity may be interpolated or combined.

Preferably, the apparatus is arranged to create or insert new key frames between existing ones. This helps overcome a problem with the above discussed type of prior art interpolation aids. This problem arises because two key frames are two dimensional projections of a solid object or objects. The object will have moved through three dimensions between key frames, and not usually merely in the two dimensions in which both key frames lie. Interpolating in the two dimensions of the key frames therefore generally leads to distortions which often make the interpolated frames look unrealistic. However, equally, for simple shapes this distortion may not be particularly noticeable.

We have found that an efficient solution is therefore provided by interpolating in two dimensions, and replaying the interpolating sequence, and then permitting a user to insert a new intermediate key frame where the present interpolation is unsuccessful due to this problem.

In another aspect, the invention provides a system comprising means for defining stored pictures and means for interpolating predetermined proportions of the stored pictures to build up an animated sequence; the means for interpolating may be automatic as above, or could be manually controlled as in the above referenced prior art, but in either case, the unnecessary complexity of the above discussed proposal is avoided by providing that the pictures are provided as lines defined by a small (preferably minimal) number of control points, so as to obtain bold, smooth curves. Very preferably, editing means are provided enabling an operator to edit a picture by editing individual control points in isolation, rather than by effecting a transformation on a plurality of control points as in the prior art discussed above; this is found to provide a simple but fast and effective method of generating character animation.

To facilitate interpolation, the number of such control points in different pictures is generally the same and control points of different pictures generally correspond one to another; however, in a particularly preferred embodiment, there are provided means for storing points of two different kinds; the first (active) kind which define properties of a line and are used by the interpolation means to generate interpolated pictures and a second (dormant) kind which do not, and the editing means is arranged to be capable of converting such a dormant point to an active one, whilst retaining the correspondence between the point and those of other pictures, so as to enable the complexity of a particular picture to be increased relative to others without losing the correspondence between the pictures which facilitates interpolation, and retaining a small set of control points to keep the lines bold and simplify processing.

In another preferred embodiment, all pictures are derived from an original or template picture, and new control points may be added to a particular picture to increase the complexity thereof, in which case the corresponding control point (preferably dormant) is added to the template picture so as to maintain the correspondence therebetween.

In another aspect, the invention provides an animation system in which a three dimensional modelling means generates at least one set of two dimensional template data, which is then edited in two dimensions to permit two dimensional interpolation between different edited versions of the template. This provides an advantageous animation system in which a user can pose a character in three dimensions, select a desired two dimensional view, and then animate in two dimensions from that view.

In another aspect, the invention provides a system for modelling a three dimensional object, in which the object is represented by linked armature, skeleton or frame portions defined by three dimensional coordinate data, in which the data defines a curved armature path and permits editing of the armature path. This permits a much greater degree of control over the figure than in the apparatus of U.S. Pat. No. 4,600,919, for instance. Preferably the data defining the curved armature path comprises control point data defining a spline curve; in this case, a complex curve path can be represented using little more data than the straight line paths of U.S. Pat. No. 4,600,919.

In another aspect, the invention provides a system for three dimensional modelling of an object in which the object is defined by three dimensional armature portions, and the surface of the object (its envelope in three dimensional space) is defined by providing data defining at least one cross section, spaced along the or each armature. Preferably, the section is normal to the armature. The section may, but does not need to, surround the armature. Advantageously, the section is defined by defining its perimeter curve as a spline curve, defined by stored control point data (advantageously, in the Bezier format). This allows representation of complex cross sections using a small amount of data, and permits easy editing and manipulation of the cross section.

Preferably, the position of the sections is defined as a scalar (preferably a proportion) value defining their length along the armature. Thus, if it is desired to combine two different three dimensional models or to interpolate between two different three dimensional models, in which the positions or lengths of the armatures are different, the sections will move and vary with the armatures. This is particularly advantageous in cartoon animation, where a limb of a character, for example, may often be stretched.

In another aspect, the invention provides a system for editing a three dimensional model of a character comprising a jointed skeleton comprising means for displaying first and second views from different viewing angles of the skeleton, and position sensitive input means for providing an input to the displaying means so as to cause the display of a cursor symbol on the letter in a selected one of said displays, and means for amending the skeleton defining data to correspond to cursor symbol movements in said two viewing directions. This provides a readily learned method of editing a three dimensional character.

In a yet further aspect, the invention provides a three dimensional interpolation system, for defining first and second time separated three dimensional character versions and for generating at least one interpolated version therebetween in time, in which each of the said object versions is represented by point data defining object vectors, and there is provided a template object, and in which the points data in each case represents the difference of a corresponding point in each version from its counterpart in the template object. This facilitates interpolation. The principle of providing the stored object versions as differences from a template has further advantages when used for other purposes; for example, a composite version of an object can be produced by adding together the first and second versions if they are stored in this format.

Other preferred aspects and embodiments of the invention are as described or claimed hereafter, with advantages that will be apparent from the following: singly or in combination, these embodiments enable the provision of an animation system for character animation which is fast and straightforward to use. Equally, it will be appreciated that many aspects of the invention may be employed in other fields of animation, however (such as computer aided design).

The invention will now be described, by way of example only, with reference to the accompanying drawings, in which:

BRIEF DESCRIPTION OF DRAWINGS

FIGS. 2a and 2b illustrate the effect of varying the control variables used in parametric cubic curves in a known prior art technique;

FIG. 9 shows an embodiment of the present invention, and is a block diagram schematically illustrating the operation of editing the data shown in FIG. 6a;

FIGS. 13a–13e show an embodiment of the present invention, and provide greater details of the data stored within the elements of FIG. 12;

FIG. 39b shows an embodiment of the present invention, and shows diagramatically the outline surrounding the sections of FIG. 39a;

FIG. 43 shows an embodiment of the present invention, and shows in greater detail a portion of the contents of FIG. 42 describing the component shown in FIGS. 39a and 39b;

FIG. 48a shows an embodiment of the present invention, and shows the table held in the memory of FIG. 3 representing a viewing angle corresponding to an area of the monitor 160 display of FIG. 44;

FIG. 48b shows an embodiment of the present invention, and illustrates diagramatically the physical significance of the contents of the table of FIG. 48a;

FIG. 53 shows an embodiment of the present invention, and shows schematically a table in the memory of FIG. 3 for storing the data representing the outline;

TWO DIMENSIONAL ANIMATION PARAMETRIC CURVES

Before discussing the invention in detail a brief description of parametric curves will be given; such curves form part of a common general knowledge of the skilled worker, and are referred to in, for example, "Interactive Computer Graphics", P. Burger and D. Gillies, 1989, Edison Wesley, ISBN 0-201-17439-1, or "An Introduction to Splines for Use in Computer Graphics and Geometric Modelling", by R. H. Bartels, J. C. Beatty and B. A. Barsky, published by Morgan Kaufmann, ISBN 0-934613-27-3 (both incorporated herein by reference).

Figure 1A:
FIGS. 1a–e illustrate curve approximations in various known prior art techniques.
Figure 1B:
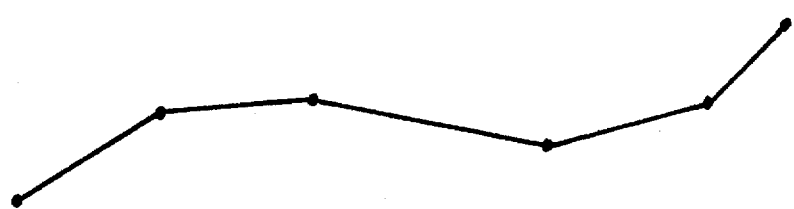
Figure 1C:

Referring to FIG. 1A, a fairly smooth freehand curve is shown. Referring to FIG. 1B, one way of representing the curve would be to draw a series of straight line segments, meeting at points. However, the number of straight line segments has to be large, as illustrated in FIG. 1C, before the simulation is at all convincing.

Figure 1D:
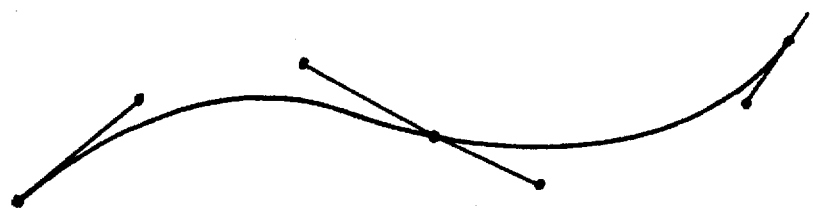

Alternatively, the curve may be represented as a series of curve segments running between points. If, as in FIG. 1D, adjacent curve segments have the same slope at the point at which they join, the curve can be made smooth.

One well known type of curve approximating technique employs a cubic curve in which the coordinate variables x and y are each represented as a third order or cubic polynomial of some parameter t. Commonly, the value of the parameter is constrained to lie between 0 and 1. Thus, each curve segment is described as:

$$x = a_x t^3 + b_x t^2 + c_x t + d_x \quad (1)$$

$$y = a_y t^3 + b_y t^2 + c_y t + d_y \quad (2)$$

Each segment has two end points, at which t=0 and t=1. The coordinates of the t=0 end point are therefore $x_0=d_x$, $y_0=d_y$, and those of the t=1 point are given by:

$$x_1 = a_x + b_x + c_x + d_x \quad (3)$$

$$y_1 = a_y + b_y + c_y + d_y \quad (4)$$

At the end points, the slope of the curved segment is also fixed or predetermined so that each segment can be matched to its neighbours to provide a continuous curve if desired.

The shape of the curve between the end points is partially dictated by the slopes at the end points, but also by a further item of information at each point which is conveniently visualised as the length of a tangent vector at each point. The curve between the two points may be thought of as having at its end clamped at the end points, at fixed slopes thereat, whilst the tangent vector exercises a pull on the direction of the curve which is proportional to its length, so that if the tangent vector is long the curve tends to follow the tangent over much of its length. The tangent vector may be derived from the above equations (1)–(4) and vice versa; for example, where the end of the Bezier tangent vector at the t=0 point has coordinates $x_2,y_2$, and that at the end of the t=1 point has coordinates $x_3,y_3$, the coefficients a, b, c, d are given by:

$$d_x = x_0 \text{(likewise } d_y=y_0\text{)} \quad (5)$$

$$b_x = 3(x_0 - 2x_2 + x_3) \text{ (and likewise } b_y\text{)} \quad (6)$$

$$c_x = 3(x_2 - x_0) \text{ (and likewise } c_y\text{)} \quad (7)$$

$$a_x = 3x_2 - x_0 - 3x_3 + x_1 \text{(and likewise } a_y\text{)} \quad (8)$$

The differential of the curve equation with respect to the variable t is:

$$c + 2bt + 3at^2 \quad (9)$$

The differential values at the t=0 and t=1 points are, respectively, $$3(x_2 - x_0) = c_x;$$

$$3(y_2 - y_0) = c_y;$$

$$3(x_1 - x_3) = c_x + 2b_x + 3a_x;$$

$$3(y_1 - y_3) = c_y + 2b_y + 3a_y$$

From these equations, by inspection, it will be seen that the length of the tangent to the Bezier control points $(x_2,y_2)$, $(x_3,y_3)$ is ⅓ that of the actual tangent vector. Although the actual tangent vector could be employed, it is mathematically more convenient to employ the Bezier tangent vector (which has the same direction but ⅓rd the magnitude).

In the so called Hermite form of a cubic equation, the data used to define a curve segment is the coordinates of the end points, the slope of the tangent vector at each end point, and the length of each tangent vector. In the Bezier format, the data used to define a curve segment are the coordinates of the end points, and the coordinates of the ends of each tangent vectors. Conversion between the Hermite and Bezier format is merely a matter of polar to rectangular conversion, and vice versa.

FIG. 2A shows the effect of varying the magnitude or lengths of the tangent vectors, whilst keeping their angle constant. It will be seen that the effect is to "pull" the curve towards the tangent vector, more or less strongly depending on the length of the tangent vector.

FIG. 2B shows the effect of varying the angle of the tangent vector whilst keeping its magnitude fixed.

Other types of cubic curve are also known; for example, the B-spline, which is defined by two ends points and a plurality of intervening control points through which the curve does not pass. However, the Bezier curve description is used in many applications because it is relatively easy to manipulate; for instance, in matching an approximated curve to an existing curve, the coordinates and tangent angles at points along the curve can directly be measured and employed. The PostScript command language used to control many laser printers employs this curve description, accepting values defining the coordinates of curve segment end points and the coordinates of corresponding tangent end points.

In general, a smooth curve is defined by a number of such end points, and two adjacent such segments will share a common end point. If the curve is to be smooth, the tangent angles defined at the end point in relation to each curve segment will be equal, although the tangent vector lengths will in general not.

Figure 1E:

However, as shown in FIG. 1e, it is possible to represent a line with a curvature discontinuity by providing that the tangent angle at end point is different for each of the two segments it defines.

For present purposes, the main usefulness of this form of curve representation is that a smooth, bold curve can be defined using only a small number of coefficients or control points, and parts of it can be amended without extensive recalculation of the whole line.

A 3 dimensional cubic spline is specified if each point has 3 dimensional coordinates; corresponding equations in z to those above are derivable by inspection.

Apparatus for performing the invention will now be described.

GENERAL DESCRIPTION OF APPARATUS

Figure 3:
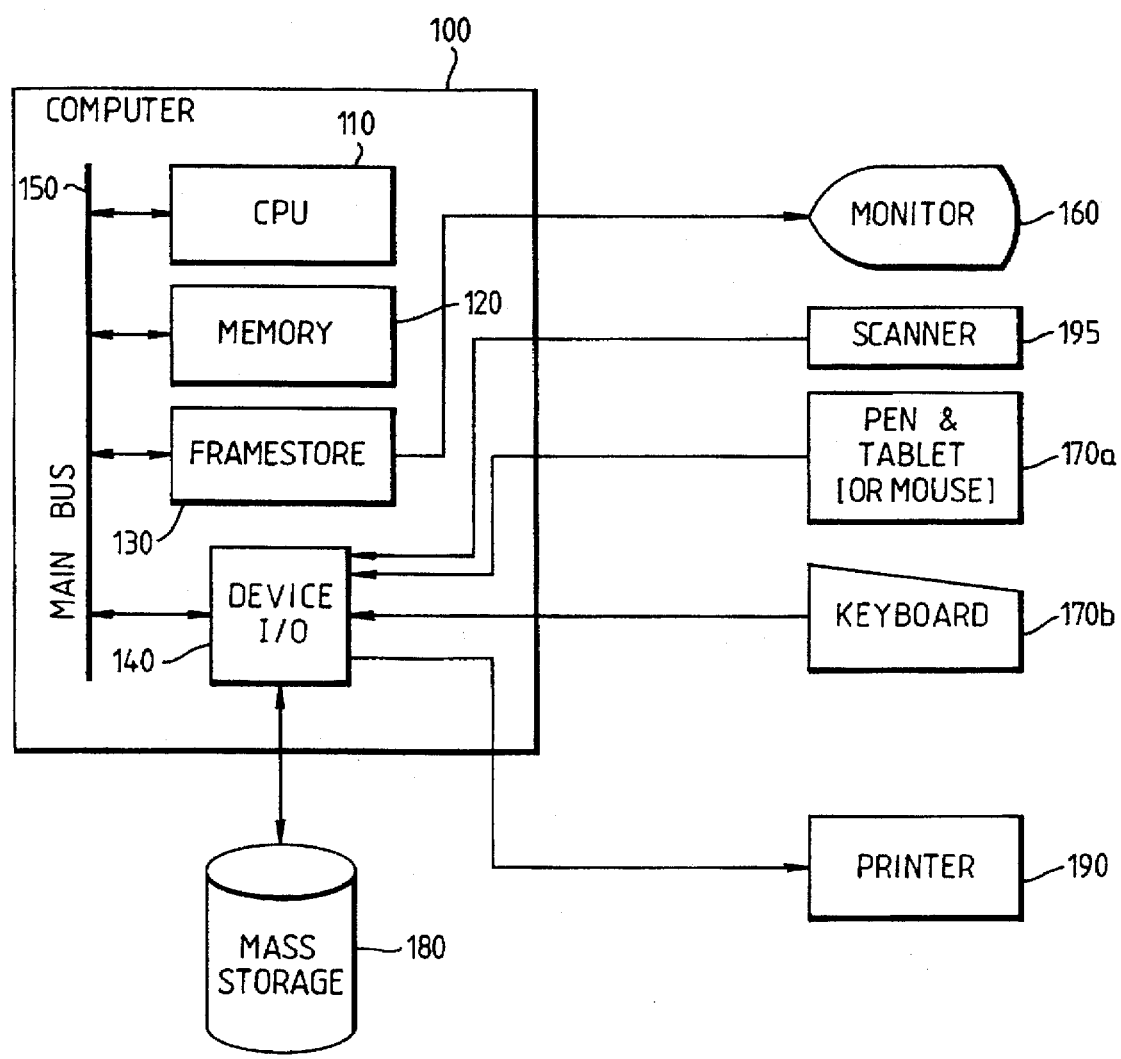
FIG. 3 is a block diagram of apparatus according to one embodiment of the invention.

Referring to FIG. 3, apparatus according to an embodiment of the invention comprises a computer 100 comprising a central processing unit 110, a memory device 120 for storing the program sequence for the CPU 110 and providing working read/write memory, a frame store 130 comprising a series of memory locations each associated with, or mapped to, a point in an image to be generated or processed, and an input/output controller 140 providing input and output ports for reading from and writing to external devices, all intercoupled through common parallel data and address buses 150.

A monitor 160 is connected to the computer 100 and its display updated from the frame store 130 under control of the CPU 110. At least one user input device 170a,170b is provided; typically a keyboard 170b for inputting commands or control signals for controlling peripheral operations such as starting, finishing and storing the results of an image generation or image processing operation, and a position sensitive input device 170a such as, in combination, a stylus and digitising tablet, or a "mouse", or a touch sensitive screen on the monitor 160, or a "trackerball" device or a joystick. A cursor symbol is generated by the computer 100 for display on the monitor 160 in dependence upon the signal from the position sensitive input device 170a to allow a user to inspect an image on the monitor 160 and select or designate a point or region of the image during image generation or processing.

A mass storage device 180 such as, for instance, a hard disk device is preferably provided as a long term image store, since the amount of data associated with a single image stored as a frame at an acceptable resolution is high. Preferably, the mass storage device 180 also or alternatively comprises a removable medium storage device such as a floppy disk drive or a high capacity tape drive, to allow data to be transferred into and out from the computer 100.

Also preferably provided, connected to the input/output device 140, is a printer 190 for producing a permanent visual output record of the image generated. The output may be provided on a transparency or on a sheet of paper. A film recorder 196 and/or a video recorder 197, and means for generating a suitably formatted moving picture output comprising a succession of frames, are also preferably provided.

A picture input device 195 such as a scanner for scanning an image on, for example, a slide, and inputting a corresponding video signal to the computer 100 may also be provided.

Figure 4:
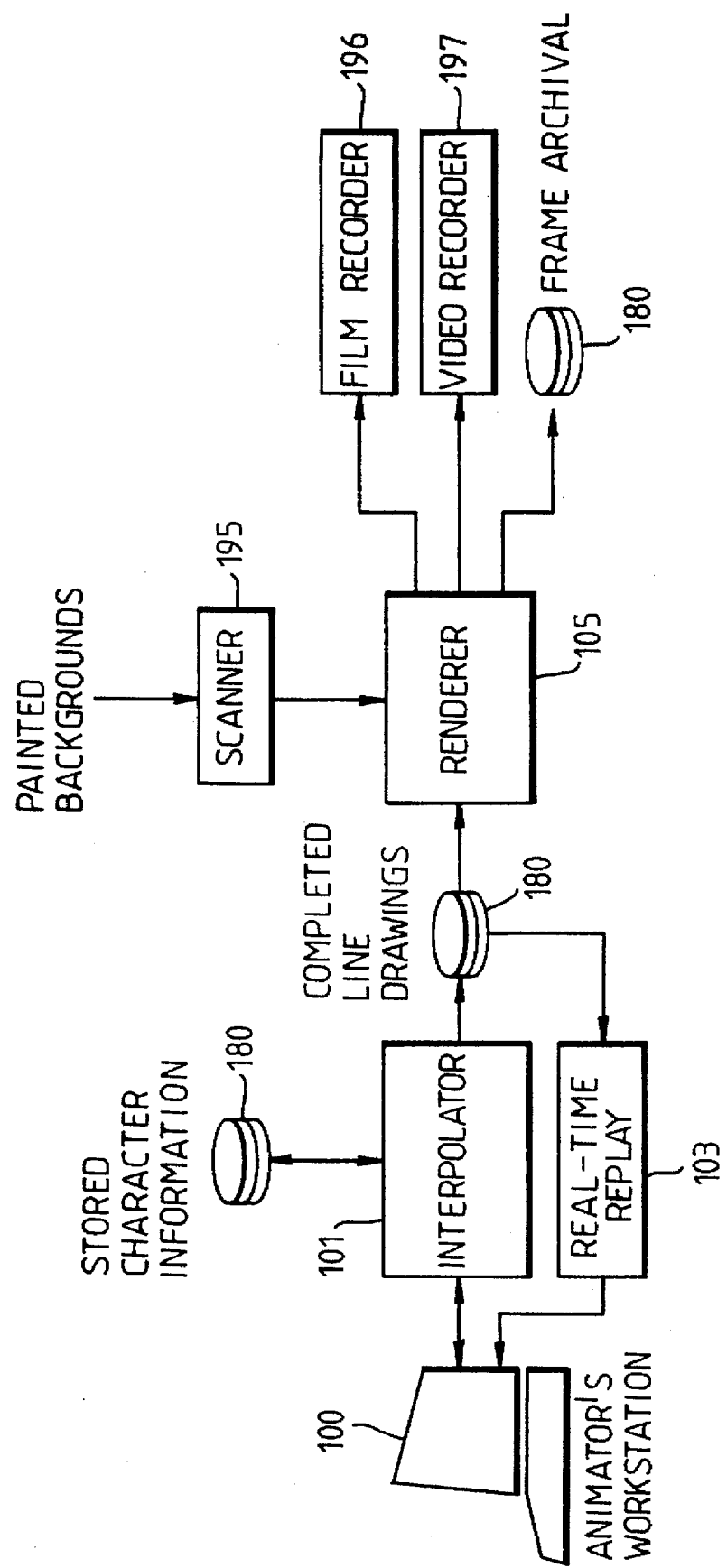
FIG. 4 is a block diagram of apparatus according to a further embodiment of the invention.

Referring to FIG. 4, an animation system in one embodiment of the invention comprises the computer 100 of FIG. 3 providing an animators work station, and arranged to execute three different stored sequences so as to comprise an interpolator 101, a replayer 103 and a renderer 105. The interpolator, with which the present invention is chiefly concerned, is arranged to generate sequences of image frames. The replayer 103 is arranged to recall a stored image sequence previously created, and generate a display of the sequence as a moving image on the animators workstation monitor 160. The renderer 105 is arranged to colour the image, and may also affect the way in which the lines are represented (for example, their thickness). The renderer 105 preferably operates as disclosed in our copending U.S. patent application Ser. No. 08/811,898 and our PCT Application published as WO92/09966.

Figure 5:
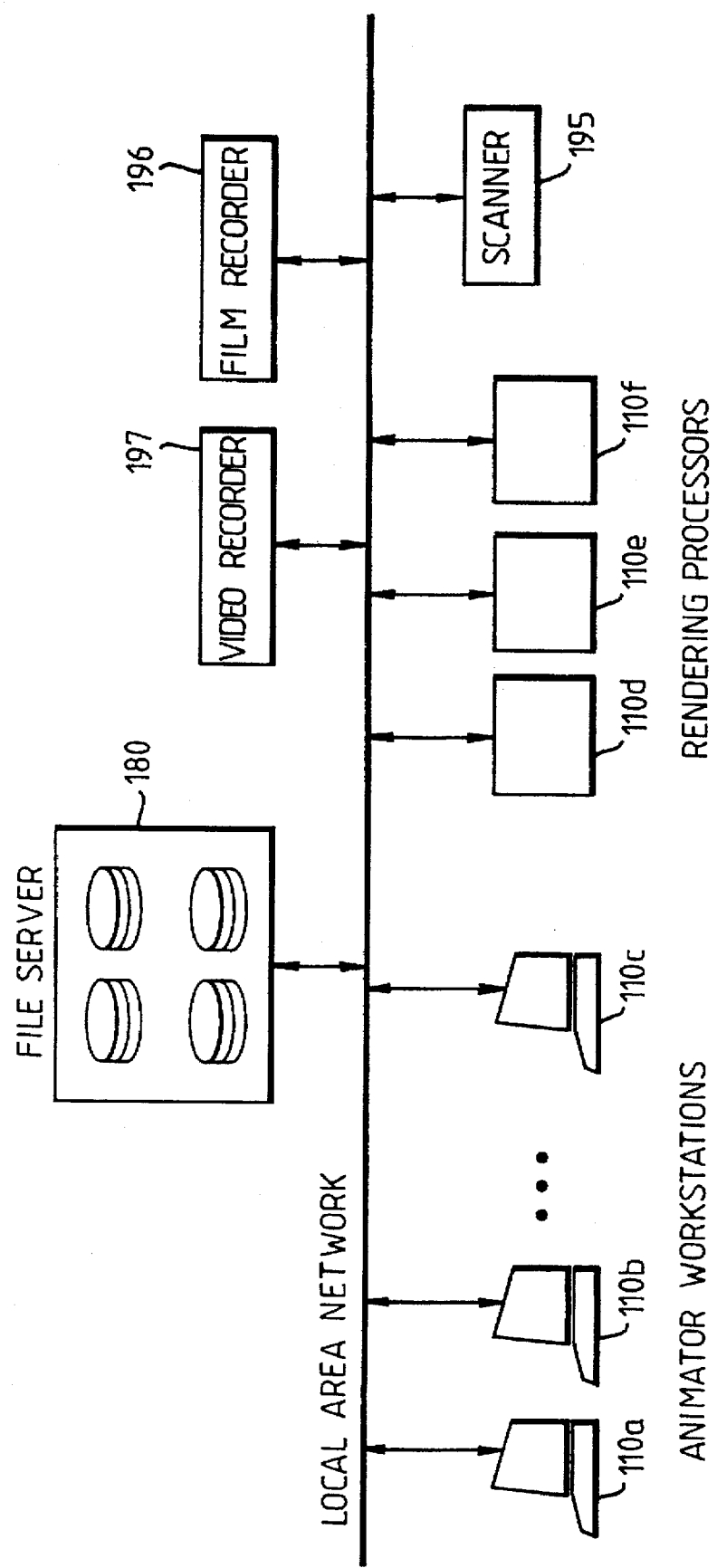
FIG. 5 is a block diagram of apparatus according to yet further embodiments of the invention.

Referring to FIG. 5, in an embodiment of the invention for larger scale animation production, there may be a plurality of workstations 110a–110c allowing different users to develop different parts of a given animated sequence, sharing a common mass storage (file server) unit 180 such as a disk drive unit with a controlling processor, and connected thereto via a local area network (LAN) such as Ethernet.

Since the rendering process usually requires many more pixel calculations than the interpolation process according to the invention for each frame, it may be advantageous to provide separate processors (typically, a smaller number) 110d–110f for performing the rendering operation, interconnected to the workstations 110a–110c via the local area network. This enables the use to be made of simpler computers for the animator workstations 110a–110c; they may, for example, lack maths coprocessor devices and/or, sophisticated graphics engines. Alternatively, the same processors may act either as rendering processors or workstations, depending on demand. In this case, control means may be provided for determining the current processing load on each processor and for allocating rendering or workstation tasks to processors connected to the network so as to manage (e.g. balance) the processing load.

One example of a suitable computer 100 for implementing the above embodiments of FIGS. 3 and 4 is the NeXTCUBE computer including the NeXTdimension colour board, available from NeXTComputer, Inc., USA. This arrangement provides direct formatted outputs for connection to a videocassette recorder or other video storage device, and accepts video input signals. Further, it includes means for compressing images for storage on a disk store 180, and for decompressing such stored images for display.

In this embodiment of the invention, display frames, consisting of line drawings of objects, are created and/or edited with reference to stored control point data (preferably data stored in the Bezier format referred to above). In other words, a stored representation of a display frame comprises a plurality of control points which define line segments which make up a line representation.

Figure 6A:
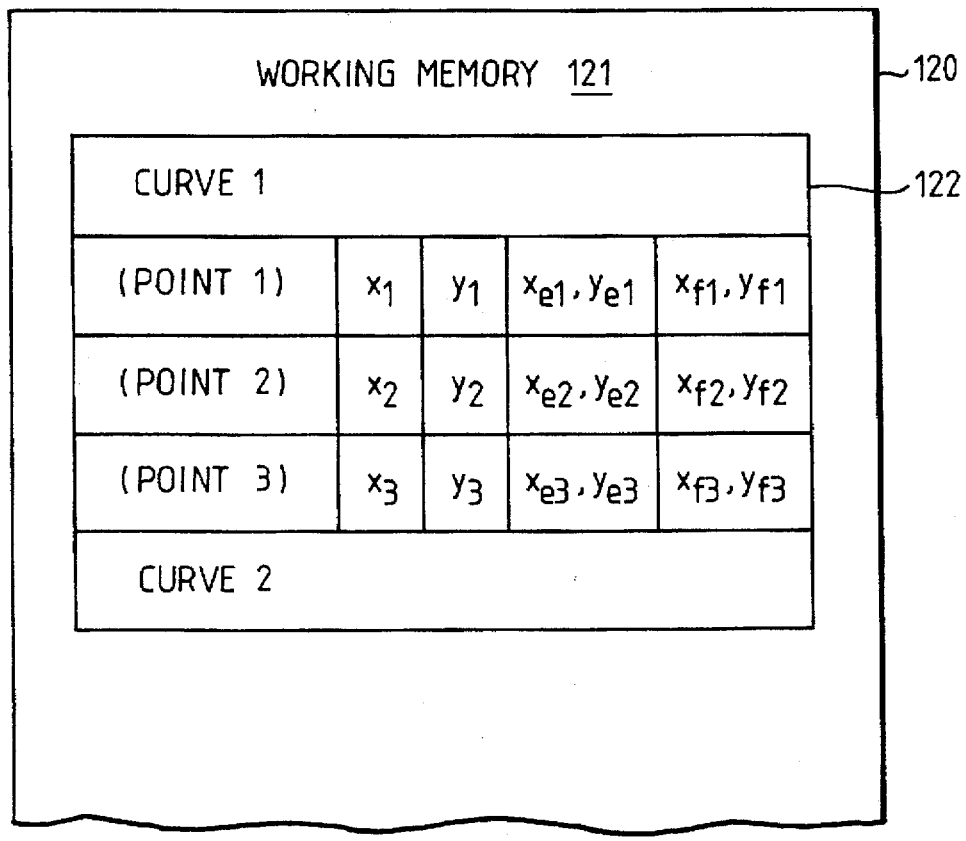
FIGS. 6a–b shows an embodiment of the present invention, and illustrates the information stored in a memory of the apparatus to represent the curve shown in FIG. 6b.
Figure 6B:
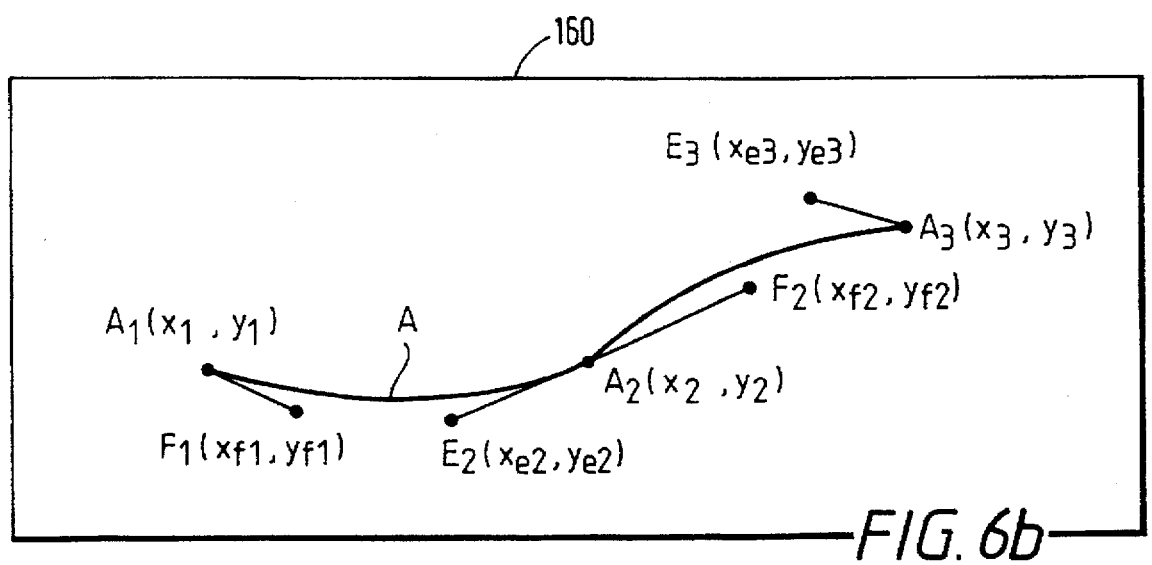

Referring to FIG. 6a, the memory 120 includes a working memory area 121 to which data may be written (for example, a random access memory area). Referring to FIG. 6b, an image displayed on the monitor 160 includes at least one line A, which is drawn as a cubic curve defined by three control points $A_1$, $A_2$, $A_3$. Corresponding image frame data representing the line image is stored within a frame table 122 within the working memory 121, as a series of curves (curve 1, curve 2 etc) each of which is defined by a series of control points (point 1, point 2, point 3). Each control point is represented by data comprising positional data $(x_i, y_i)$ representing the position within the area of the display of that control point, and tangent data $(x_{ei}, y_{ei}, x_{fi}, y_{fi})$ defining two tangent end points associated with the curved segments on either side of the control point. The tangent extent point data $(x_{ei}, y_{ei}, x_{fi}, y_{fi})$ are stored as position data X, Y defining the position of the tangent end point. It would also be possible to store instead the x,y offsets from the control point position.

The monitor 160 is usually of the raster scanned type and consequently expects a raster scanned image, which is supplied from a memory mapped image store 130 as discussed above. Accordingly, it is necessary to provide a line display generating means 111 arranged to read the stored data representing the curve segments making up the frame, and generate corresponding raster image data comprising a plurality of pixels for storage in the image store 130. Each pixel need only comprise a single data bit or a small number of bits, if the display is monochrome black/white.

Figure 7:
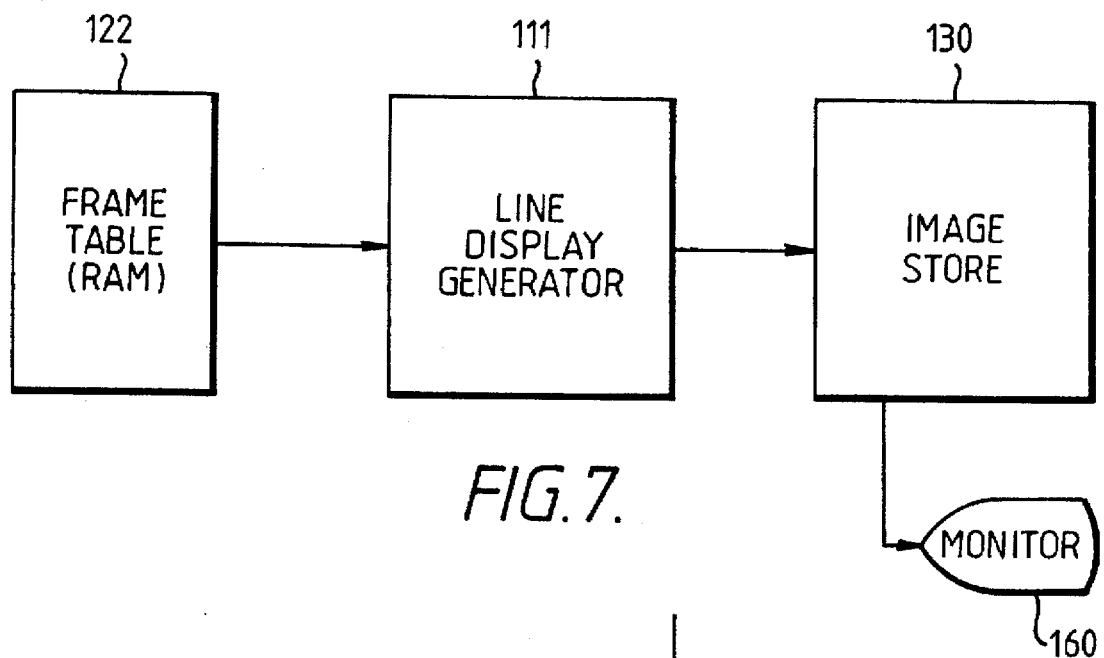
FIG. 7 shows an embodiment of the present invention, and is a block diagram schematically illustrating the operation in generating a display.
Figure 8:
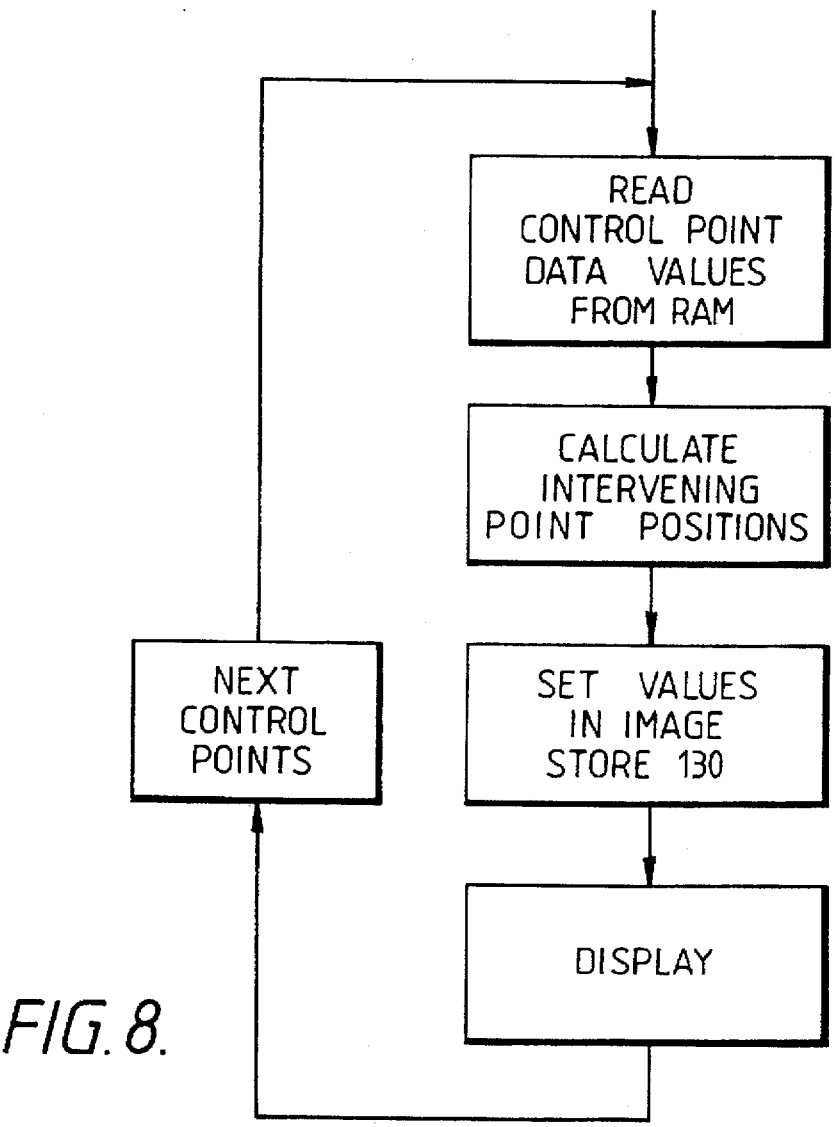
FIG. 8 shows an embodiment of the present invention, and is a flow diagram schematically illustrating the operation of the apparatus of FIG. 7.

The line display generator 111 shown in FIG. 7 is accordingly arranged to access the memory 122 to read the stored data, and the image store 130 to write pixel data. As shown in FIG. 8, it calculates intervening point positions, and sets those memory locations within the image store 130 which corresponds to pixels lying on the curve to "dark" and all those which do not to "bright". The contents of the image store 130 are then displayed on the monitor 160. In practice, the line display generating means 111 comprises the CPU 110 operating under control of the programme stored in a programme store area in the memory 120. Where the computer 100 comprises the above mentioned NeXTComputer, the line display generating means 111 may comprise the CPU 110 operating under the "PostScript" display command language provided within the operating system.

The manner in which some basic operations are performed by the above apparatus will now be discussed.

EDITING A FRAME

As will be discussed in greater detail below, the preferred embodiments of the invention provide means for enabling a user to edit a frame. Editing a frame may involve either modifying the trajectory of existing lines or (more rarely) adding new lines. It is therefore necessary both to amend the data held in the frame table 122, and desirably to amend the image data in the image store 130 so as to enable the user to view the effects of the change. It is found that the best way of providing the user with means for amending the frame data stored in the table 122 is to allow him to employ a position sensitive input device 170a, so as to appear to directly amend the displayed representation of the frame on the screen monitor 160.

DEFINING AND EDITING A CURVE

Figure 9:
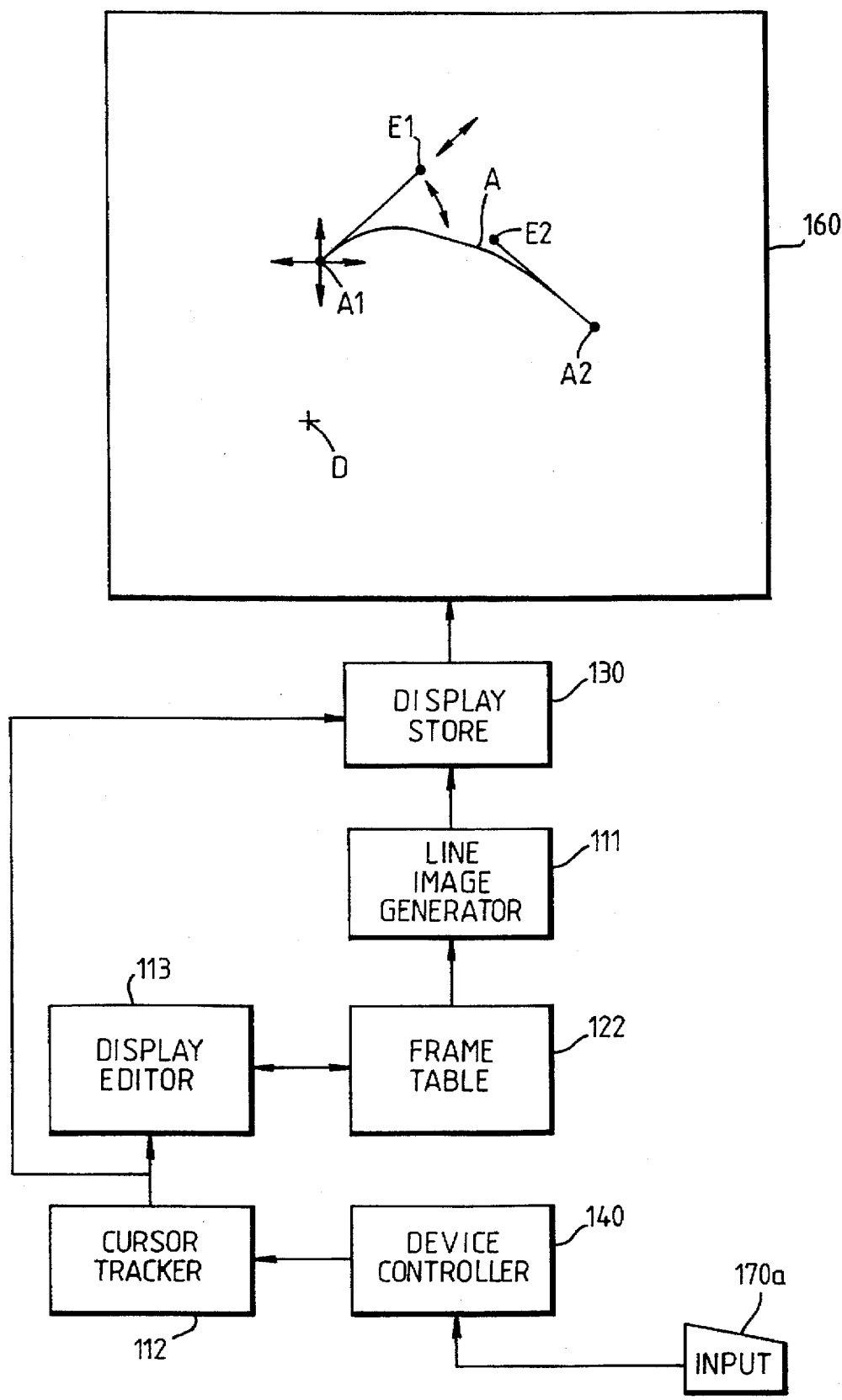

In this embodiment, referring to FIG. 9, a user manipulates the position sensing input device 170a, for example "mouse", by moving the device 170a so as to generate a signal indicating the direction and extent of the movement. This signal is sensed by the device input/output controller 140, which provides a corresponding signal to a cursor position controller 112 (in practice, provided by the CPU 110 operating under stored program control) which maintains stored current cursor position data in x,y co-ordinates and updates the stored cursor position in accordance with the signal from the device input/output controller 140. The cursor position controller 112 accesses the image store 130 and amends the image data corresponding to the stored cursor position to cause the display of a cursor position symbol D on the display shown on the monitor 160. The user may thus, by moving the input device 170a, move the position of the displayed cursor position symbol D.

In a preferred embodiment, the display line generator 111 is arranged in the editing mode not only to write data corresponding to the line A into the image store 130, but also to generate a display of the control point data. Accordingly, for each control point $A_1, A_2$, the display generator 111 writes data representing a control point symbol (for example, a dark blob) into the image store 130 at address locations corresponding to the control point co-ordinates x,y.

Further, the display generator 111 preferably, for each control point, correspondingly generates a second control point symbol $E_1$ (or two such symbols) located relative to the $A_1$ along a line defined by the control point tangent data at a position $x_{e1}, y_{e1}$, and/or $x_{f1}, y_{f1}$; preferably, a line between the two points $A_1$ and $E_1$ is likewise generated to show the tangent itself.

To enter a new curve A, the user signals an intention so to do (for example by typing a command on the keyboard 170b, or by positioning the cursor symbol at a designated area of a displayed control menu), positions the cursor symbol D at desired point on the display 160, by manipulating the position sensitive input device 170a and generates a control signal to indicate that the desired point has been reached. The cursor position controller 112 supplies the current cursor position data to the frame table 122 as control point position co-ordinates, and the display generator 111 correspondingly writes data representing a control point symbol into the image store 130 at address locations corresponding to the control point co-ordinates. The user then inputs tangent extent point information, for example via the keyboard 170b, or in the manner described below. When a second path control point has been thus defined and stored in the table 122, the supervisory image generator 111 will correspondingly generate the line segment therebetween on the supervisory display by writing the intervening image points into the image store 130.

Figure 10:
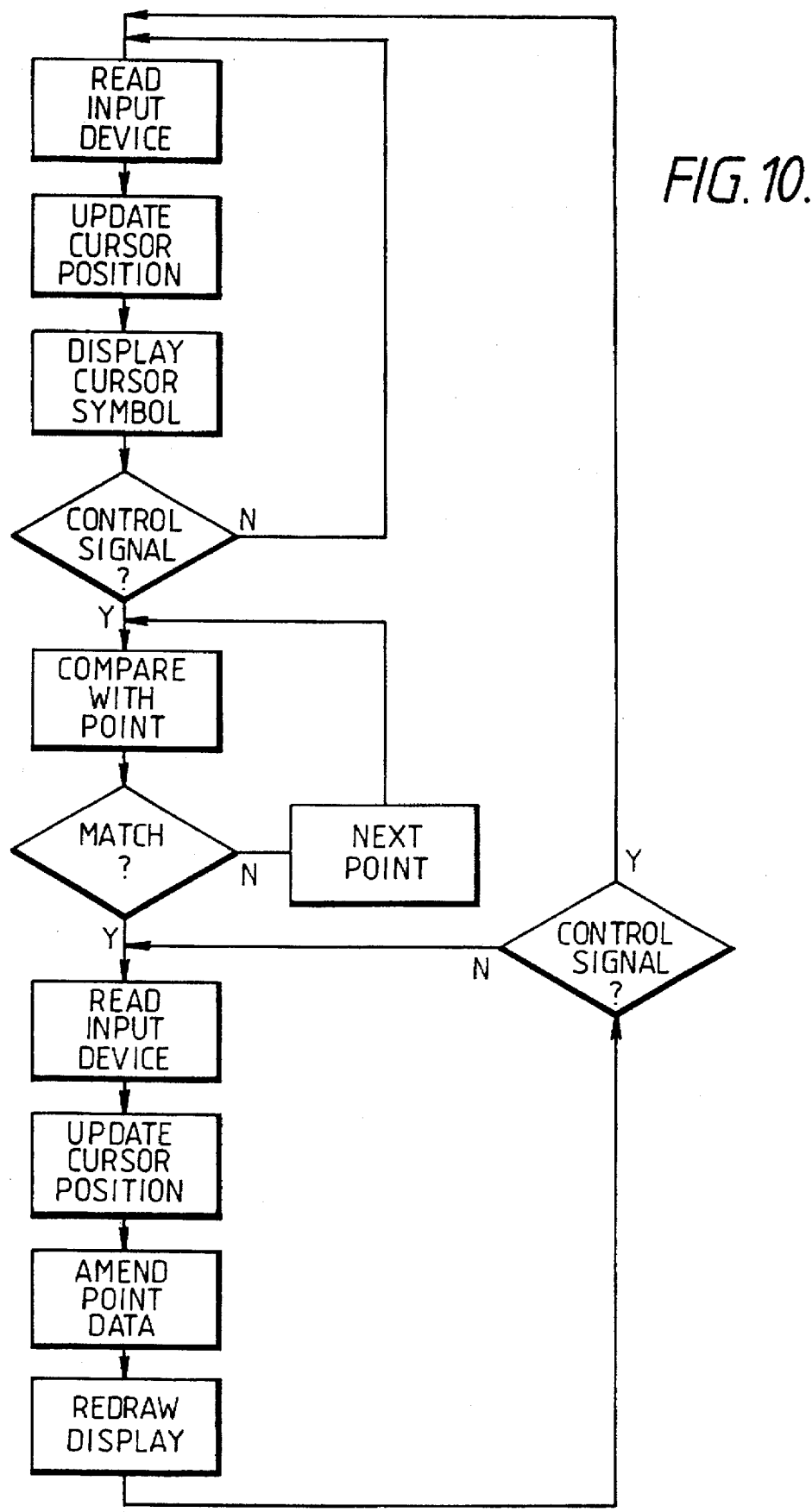
FIG. 10 shows an embodiment of the present invention, and is a flow diagram schematically showing the process operation of the apparatus of FIG. 9.

Referring to FIG. 10, to amend the shape or path of the line A displayed on the supervisory display, a user manipulates the input device 170a to move the cursor position symbol D to coincide with one of the control point symbols $A_1$ or $E_1$ on the display 160. To indicate that the cursor is at the desired position, the user then generates a control signal (for example, by "clicking" a mouse input device 170a). The device input/output controller 140 responds by supplying a control signal to the cursor position controller 112. The cursor position controller 112 supplies the cursor position data to a supervisory display editor 113, (comprising in practice the CPU 110 operating under stored program control) which compares the stored cursor position with, for each point, the point A position (X,Y) and the point E position $(x_e, y_e)$.

When the cursor position is determined to coincide with any point position A or tangent end position E, the display editor 113 is thereafter arranged to receive the updated cursor position from the cursor controller 112 and to amend the point data corresponding to the point $A_1$ with which the cursor symbol coincides, so as to move that point to track subsequent motion of the cursor.

If the cursor is located at the point $A_1$ on the curve A, manipulation by a user of the input device 170a amends the position data $(X_1, Y_1)$ in the line table 122, but leaves the tangent data $(x_{e1}, y_{e1})$ unaffected. If, on the other the cursor is located at an end of tangent point $E_1$, manipulation by a user of the input device 170a alters the tangent end point data in the frame table 122 within the memory 120, leaving the control point position data (x,y) unaffected.

In either case, after each such amendment to the contents of the line table 122, the display generator 111 regenerates the line segment affected by the control point in question within the image store 130 so as to change the representation of the line on the monitor 160.

Once a line has been amended to a desired position, the user generates a further control signal (e.g by "clicking" the mouse input device 170a), and the supervisory display editor 113 thereafter ceases to amend the contents of the memory 120. The cursor controller 112 continues to update the stored cursor position.

This method of amending the line representation is found to be particularly simple and quick to use.

GENERAL DESCRIPTION OF PROCESSES FOR 2-D ANIMATION

The processes performed by the apparatus of the preferred embodiment to the invention to enable a user to define an animated sequence are:

1. Defining Objects to be Animated—for example, characters. As will be disclosed in greater detail below, the apparatus of this embodiment permits the definition of a topological representation of a character or object to be animated.

2. Defining Key Frames—image frames in which the character previously defined is represented in a particular shape, orientation or position are defined, corresponding to spaced apart frames of an animated sequence.

2. Creating Interpolated Frames—from the key frames created above, a plurality of intervening frames in which the object is manipulated.

3. Displaying/Editing—the sequence of key frames and interpolated frames, or a representation thereof, is displayed and may be edited.

4. Replaying—the sequence of frames is successively displayed at a display rate corresponding to a video image (24, 25 or 30 frames per second), to enable the user to view a representation of the animated sequence. The sequence may be replayed with an associated sound track, to assess the correctness of timings and synchronisation.

6. Rendering—frames or sequences are coloured and/or shaded, and/or mixed with a desired background, to produce a finished video sequence.

GENERAL OVERVIEW OF 2-D SYSTEM OPERATION

Figure 11:
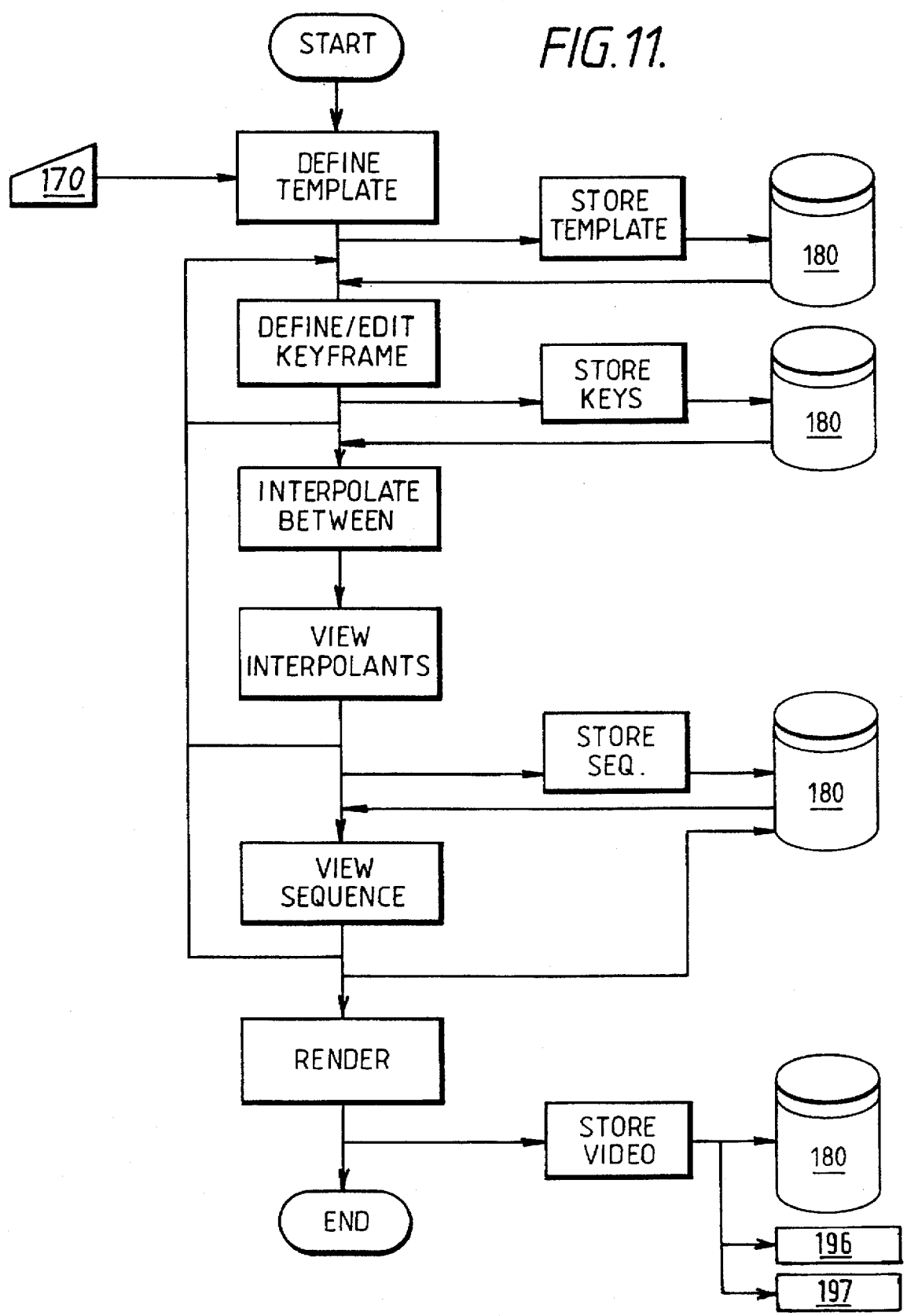
FIG. 11 shows an embodiment of the present invention, and is a flow diagram showing schematically the sequence of operations undertaken by a user of the apparatus.

One typical sequence of operations of this embodiment is shown in FIG. 11. Initially, the user will wish to create a character or object to animate. The shape of the object will be changeable, but its underlying topology is maintained constant and the user will therefore create an initial "template" or set of data storing this underlying topology. The template is a view of the character or object which includes all the lines (and, therefore, is defined by all the control points) which it is desired to show in later pictures of the character or object. The template picture or frame is created on the monitor 160, preferably using the position sensitive input device 170a (for example "mouse") as described in greater detail below.

At this stage, it may be desirable to store the template data (the curve control points, together with identification data labelling the template) permanently, on the mass storage device 180. Equally, rather than creating a template anew, the user may summon a stored template from mass storage 180.

The next stage may be to create a number of key frames. As is the case with hand produced animations, key frames are frames spaced apart in time which include some change or shape or position of the character or object to be animated. Each key frame therefore has corresponding data identifying the point in the animated sequence at which the key frame occurs.

Key frames may be produced directly from the template to which they correspond, by copying the control point data making up the template and then editing the copied control point data to cause the key frame to diverge from the template. The editing is preferably performed interactively, using as above the position sensitive input device 170a, and viewing the effects of the editing on the monitor 160. The edited control point data then comprises the key frame data. A key frame may likewise be produced by copying an existing frame; in this case it will be an indirect copy of the template frame.

At this point it may be convenient to save the key frame data to the mass storage device 180. Preferably, the key frame control point data comprise offset data defining the difference between a given key frame data and the corresponding data in the template. Thus, when the template is amended, the key frames need not be individually amended. Other advantages of this representation are discussed below.

The key frames thus generated, or key frames recalled from the mass storage device 180, may then be processed to derive the intervening frames (interpolated frames). Each interpolated frame comprises, as above, a set of control points defining the curves or lines making up the image frame. Each control point of each interpolated frame is derived to lie between the control points of the pair of key frames it lies between. The number of interpolated frames depends upon the separation in time of the two key frames between which the interpolation is performed.

The user may next view the interpolated sequence. Typically, key frames are separated by less than one second, or less than 30 interpolants (although greater separations are of course possible) and it is therefore possible to provide a display including several key frames and the interpolants lying therebetween simultaneously on the screen of the monitor 160. At this point, the user may store the sequence of interpolated frames in mass storage 180, or may wish to amend the sequence in some manner.

A first type of amendment comprises changing the time occurrence of the key frame; in this case, the key frame itself is not redrawn but the number of interpolants will change and consequently the interpolation must be repeated. Alternatively, the user may wish to edit a key frame. Finally, he may (as discussed below) decide that a sequence cannot be directly interpolated and that therefore a new key frame needs to be inserted between two existing key frames; this may be achieved by converting an interpolated frame into a key frame (as discussed below in greater detail).

The next stage may typically be to animate the sequence, to test whether the timing and appearance is correct. The apparatus therefore displays each key frame and interpolated frame of the sequence in turn, at short intervals in time. If the sequence is to be displayed at "normal" running speed, the interval is 1/24, 1/25 or 1/30 second between frames. Preferably, however, the user can vary the frame repetition rate so as to view the sequence in slow motion. Preferably, the user can also designate a short sub-sequence to be animated, and can move repeatedly forwards or backwards through the short sub-sequence. If the sequence is not correct, then as before the user will edit either the appearance or position in time of the key frame, or add or delete a key frame. The control point data making up the frames of the sequence are then typically saved to mass storage device 180, for later use.

Additionally, or alternatively, the frames may be coloured and/or filled and/or added to an existing background ("rendered"), to generate a corresponding series of raster image frames which may be displayed on a colour monitor, saved on a video tape recorder, or compression coded and stored on the mass storage device 180.

It will be clear from FIG. 11 and the following description that the above described sequences is by no means exhaustive of the options open at each stage to the user.

STORAGE OF DATA IN MEMORY 120

From the foregoing, it will be apparent that a number of different types of data must be evaluated and stored by the apparatus to enable a completed animated sequence to be produced. One exemplary arrangement of data will now be discussed.

Figure 12:
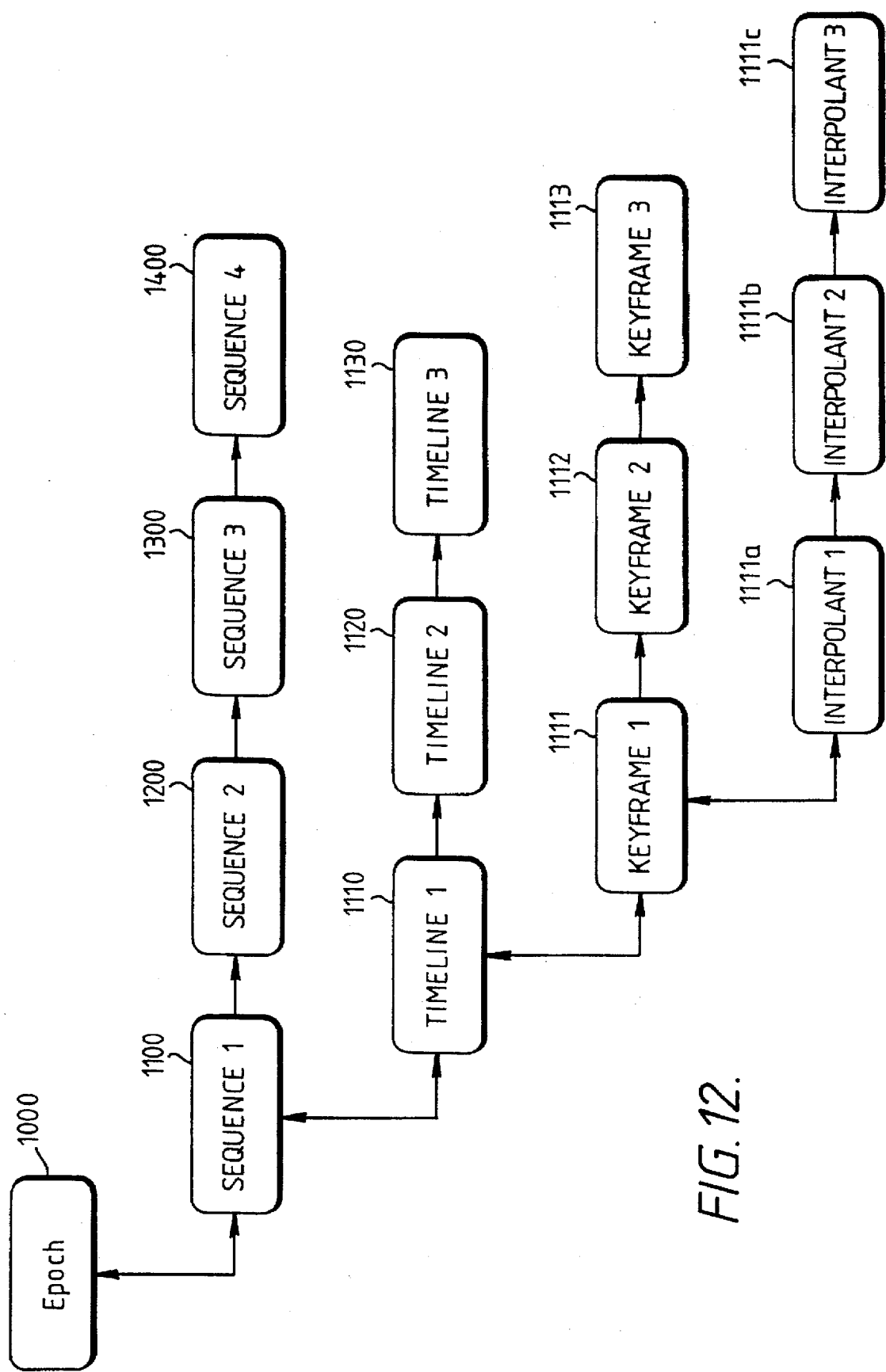
FIG. 12 shows an embodiment of the present invention, and is a block diagram indicating schematically the manner in which data is stored within the memory as a linked list.
Figure 13A:
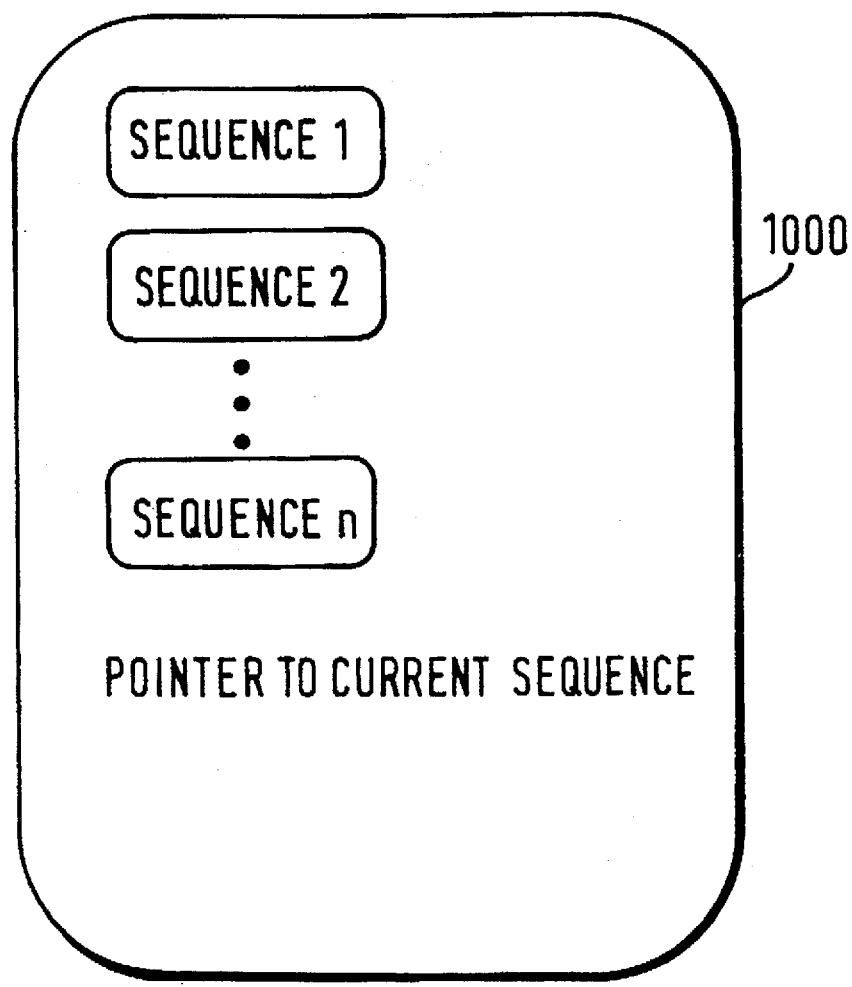

A finished animation will involve different characters, and will be produced in segments or sequences. Referring to FIG. 13a, for each completed animation (labelled "epoch" in FIGS. 12 and 13) a table 1000 of data is defined which includes data establishing the identity of the animated sequence (a title), data relating to the soundtrack, and a table of sequences 1100, 1200, 1300, 1400 of successive frames. The sequences will occur in succession. Conveniently, the sequences are stored as a linked list in the working memory 121; in other words, the complete animation table stores data identifying the location in the memory 121 of the first (and preferably the last) of the sequence tables 1100..., and each sequence table 1100... includes data identifying the address in memory 121 of the next sequence table (and preferably, the previous sequence table).

In animation of cartoons, for example, it is very common for several parts of a character or object to move simultaneously and substantially independently. For example, a character may walk and talk at the same time. In a preferred embodiment, the invention therefore enables separate movements to be defined for different parts of the same template. This is achieved by creating separate key frames and interpolated frames therebetween for different parts of the template, and editing the separate sets of key frames and interpolants to achieve the desired motion, and then subsequently merging together the separate sets as will be discussed below. Each set of key frames and interpolants does form a sequence over time, but for consistency the term "sequence" will be reserved in the following for the merged sequence of frames, and the term "timeline" will be used to describe the sequential set of frames (key frames and interpolated frames) corresponding to separate parts of the templates, separately animated which are merged to form the sequence. Of course, where the whole object is animated simultaneously, the single timeline also comprises the finished sequence.

Figure 13B:
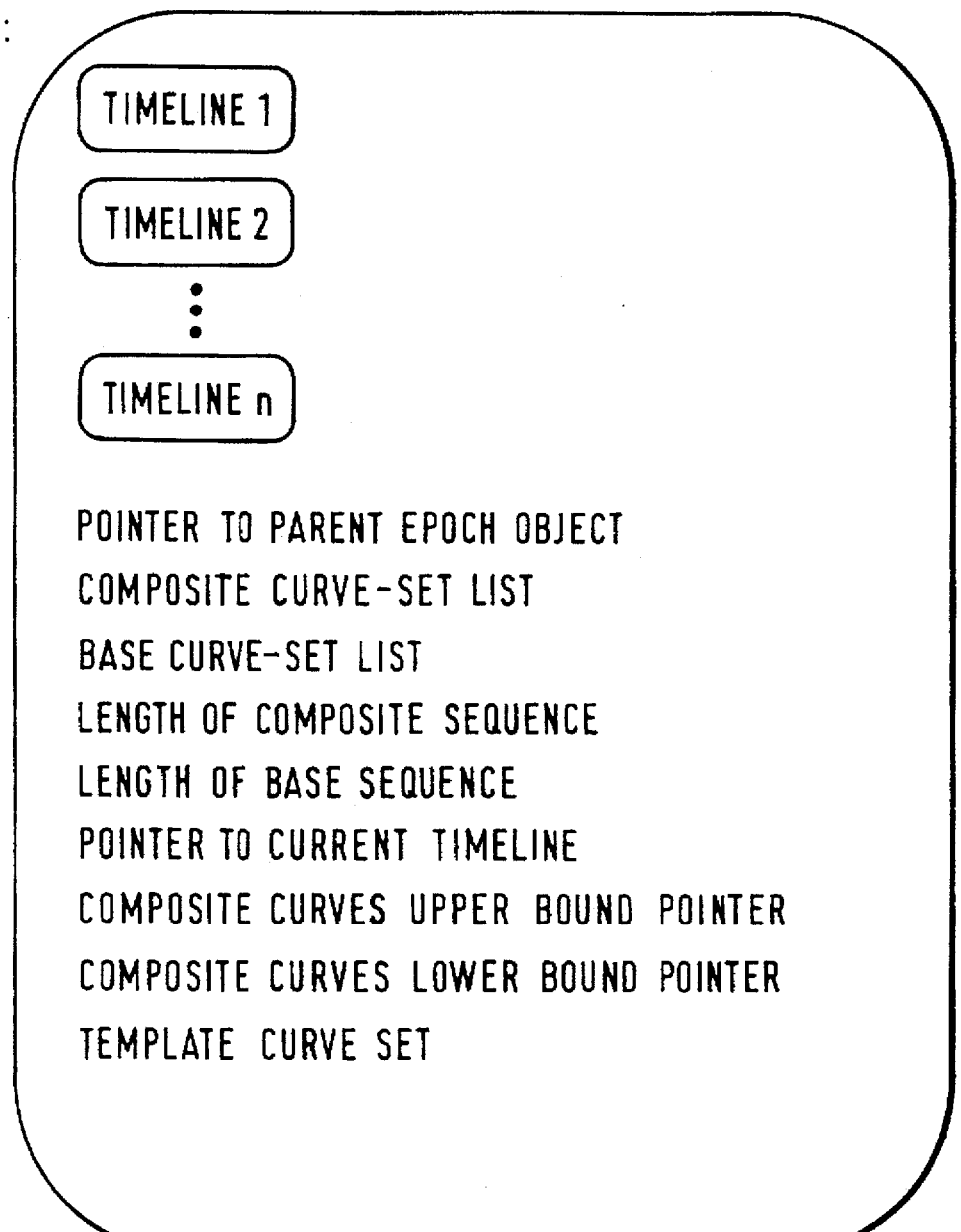

Thus, in general, referring to FIG. 13b, each sequence table 1100 comprises data defining the template frame which the sequence animates, data (e.g. a pointer) indicating to which animation or epoch 1000 the sequence 1100 corresponds, a set of frame tables (curve sets) comprising the composite or merged sequence (conveniently stored as a linked list of frames), a set of timeline tables 1110, 1120, 1130 . . . (discussed below), data defining a currently displayed timeline, and, conveniently, a set of frames or curve-sets which comprises the merged sum of all timelines except that currently displayed. This enables the currently displayed timeline to be easily edited, then merged with this "base" sequence of frames to replace the existing composited sequence. The length, and the first and last frame addresses of the composite sequence are also stored.

Figure 13C:
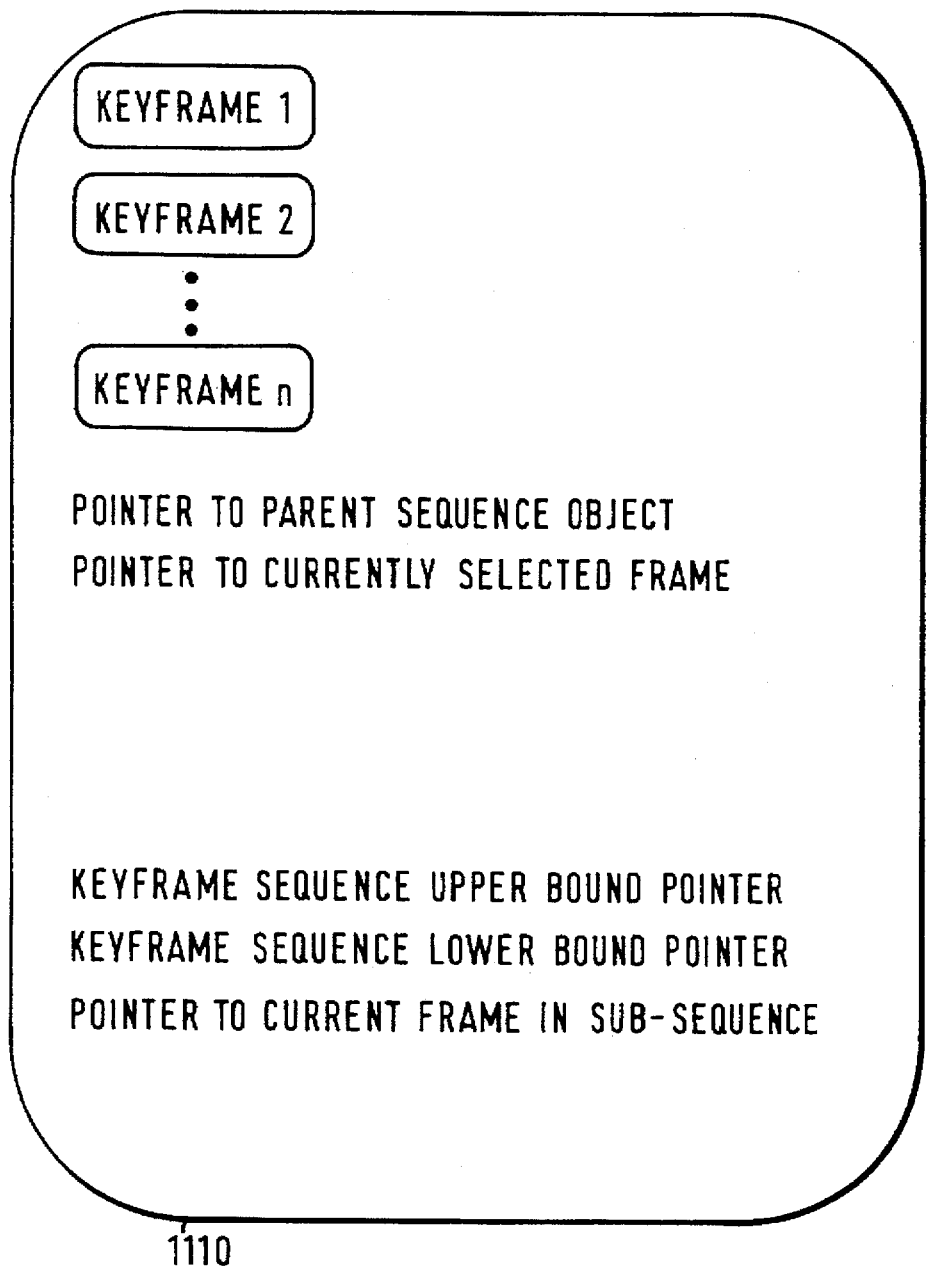

Referring to FIG. 13c, each timeline table 1110, 1120 . . . likewise defines a series of frame data tables, and for convenience these are stored as a linked list of key frames 1111, 1112, 1113 . . . .

Referring to FIG. 13d, each key frame data table 1111, 1112, 1113 includes a pointer to a frame table 122, but also includes further data. A pointer to a list of interpolant frame tables comprising those defining the interpolant frames lying after that key frame and prior to the next is included. Frame tables 122 are associated with a stored frame type indicator, which in this case indicates that the frame table 122 is a key frame. Additionally, data defining the key frame number (i.e. its order amongst the key frames in the timeline 1110) is stored.

Referring to FIG. 13e, the interpolant frame data tables 1111A, 1111B, 1111C . . . for each key frame 1111 each comprise a pointer to a frame curve set data table 122. Each also includes an interpolation factor (typically 0–1) defining the extent to which the frame depends upon the following key frame 1112; thus, for successive interpolated frames 1111A, 1111B, 1111C . . . , the interpolation factor gradually rises from close to 0 to close to 1. The interpolated frame 1111A and the key frame 1111 each store a frame number, which defines their position in the timeline 1110 and sequence 1100. Frame numbers correspond to points in time succeeding one another by 1/24, 1/25 or 1/30 of a second (or whatever the frame repetition period is desired to be).

Figure 14:
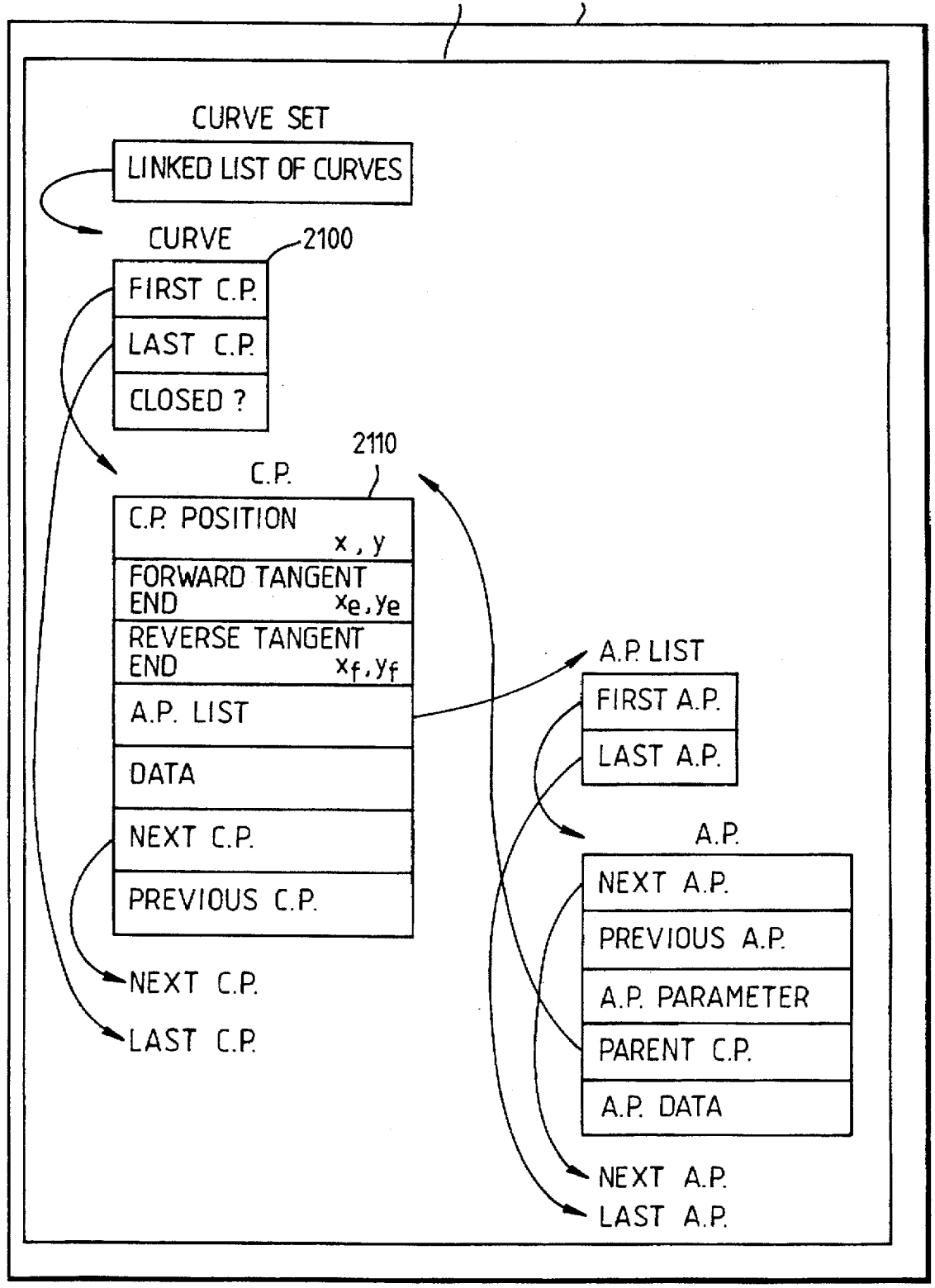
FIG. 14 shows an embodiment of the present invention, and shows in greater detail the arrangement of data stored in the memory corresponding to a displayed picture.
Figure 15:
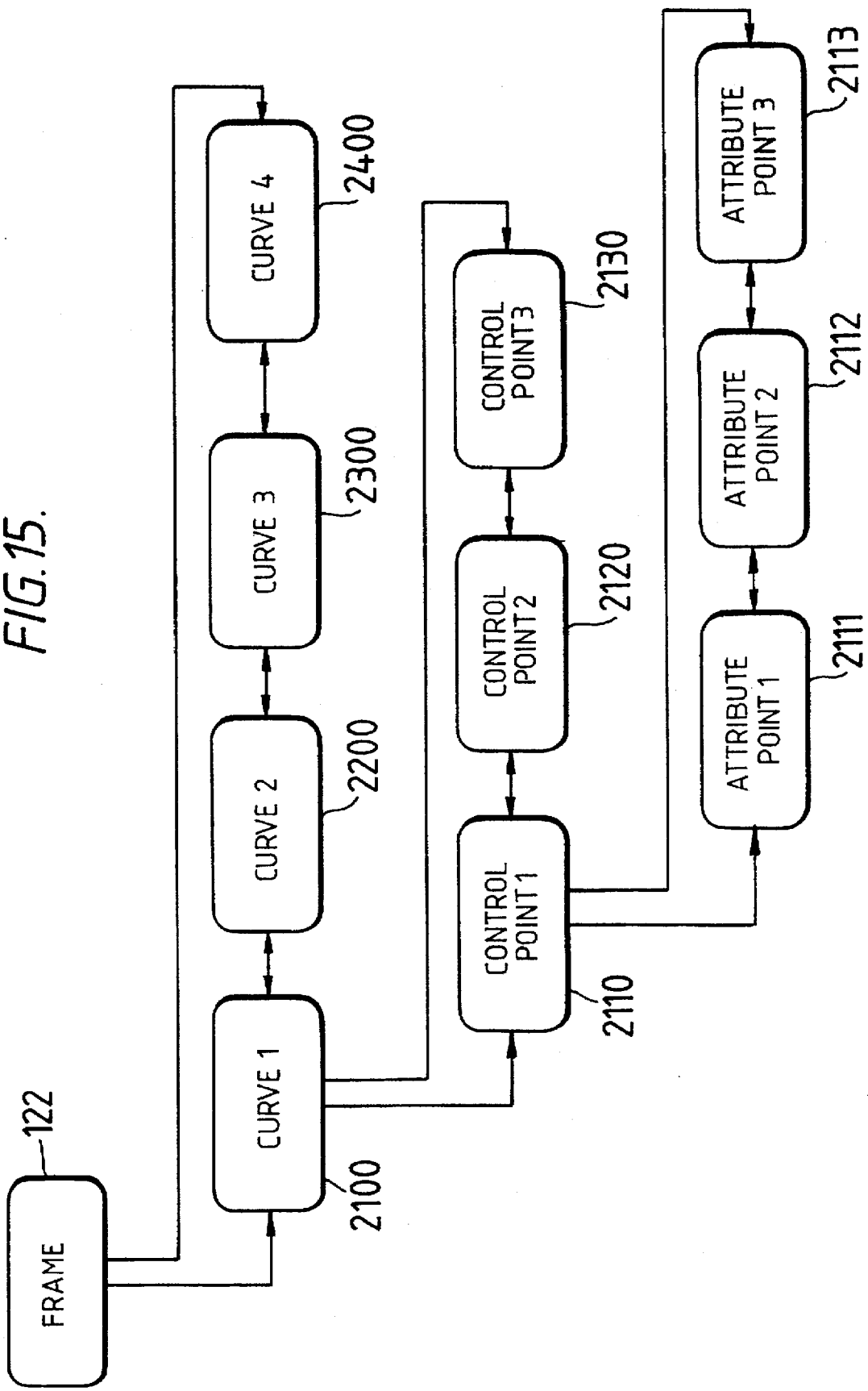
FIG. 15 shows an embodiment of the present invention, and shows schematically the arrangement of the information of FIG. 14 within the memory as a linked list.

FIGS. 14 and 15 show the arrangement of the frame table 122 of FIG. 6a in greater detail. Each frame table 122 includes a list of lines or curves making up a set which represent the object or character which the frame depicts (and corresponds topologically to the template). The template, key frames and interpolated frames may thus all be represented by similar frame tables 122. The lines or curves are conveniently provided as a linked list of curve tables 2100, 2200, 2300, 2400, each curve table comprising a list of curve control points (again conveniently stored as a link list) 2110, 2120, 2130.

Each control point 2110 comprises position data defining the control point coordinates, and position data defining the control point tangent end coordinates. The curve segment to the next control point may include attribute control points (which will be discussed in greater detail below) for controlling the values of attributes such as colour and transparency during the rendering process, or for enabling compatibility during interpolation as discussed below, and in this case it is desirable for the positions of these attribute control points to be interpolated between key frames at which they are defined, for use in the subsequent rendering operation.

Accordingly, the control points 2110 . . . include a list or table of attribute control points over the curve segment to the next curve control point. Each attribute control point table entry may comprise data defining the value of the attribute controlled by the point (for example, the line colour or transparency), and comprises data defining the position along the line segment of the attribute control point; conveniently, this is the value of the parameter t at the point. Further details of attribute control points will be found in U.S. Pat. No. 5,611,086.

The use of a linked list arrangement discussed above for storing frame data, timeline data and sequence data is not essential, but is particularly preferred since this enables individual frames, sub-sequences or sequences to be moved in time by breaking and replacing links at either side of the frame, sequence or sub-sequence.

During operation of the apparatus, all of the above data tables will normally be resident in the working memory 121.

DISPLAYS ON MONITOR 160

From the foregoing, it will be apparent that a considerable amount of data is held by the apparatus during use, and that the data is held in a form in which it is not immediately comprehensible to the user. The manner in which data is presented to the user through the monitor 160, and in which it may be amended by the user, is therefore of considerable importance, and has major functional effects on the performance of the apparatus according to the invention.

Firstly, it is advantageous to provide a single frame display, and means for designating a stored frame (an interpolated or a key frame) for display. To display a single frame, the display generator 111 reads the corresponding frame table 122 and generates corresponding image data in an image buffer 130, which is then displayed.

Figure 16:
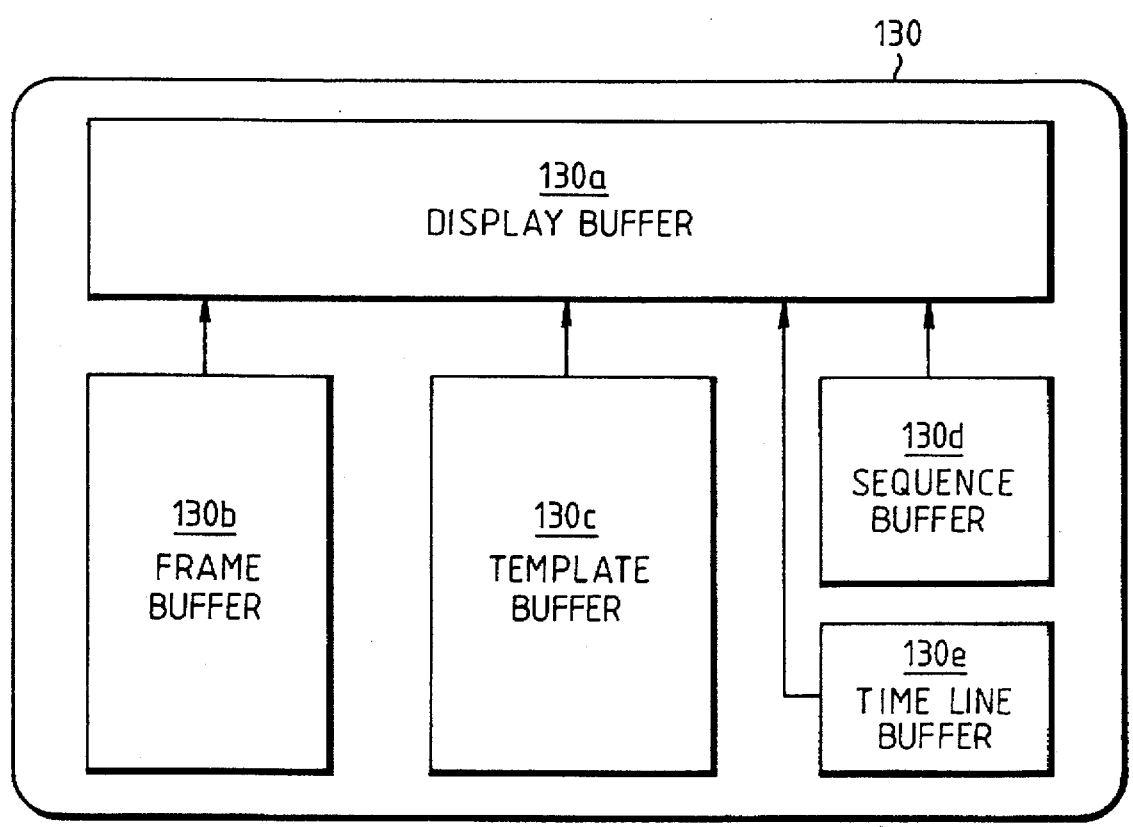
FIG. 16 shows an embodiment of the present invention, and is a block diagram illustrating schematically the contents of an image store.

Referring to FIG. 16, accordingly, preferably, a plurality of image buffers 130a to 130e are provided within the image store 130. One buffer 130a comprises the display buffer, which represents (is mapped to) the display produced on the monitor 160. The other buffers 130b, 130c . . . provide "windows", as is known generally in the computing art, and each of which contains image data corresponding to a raster image optionally forming a portion of the monitor 160 display. The images held in the frame buffers 130b, 130c . . . are combined into the buffer 130a, and the size, position and order (i.e. which window overwrites which) may be determined by the user manipulating the keyboard 170b or mouse 170a, as is provided in the operating systems of many commercially available personal computers in a manner which is well known and forms no part of the present invention.

Figure 17:
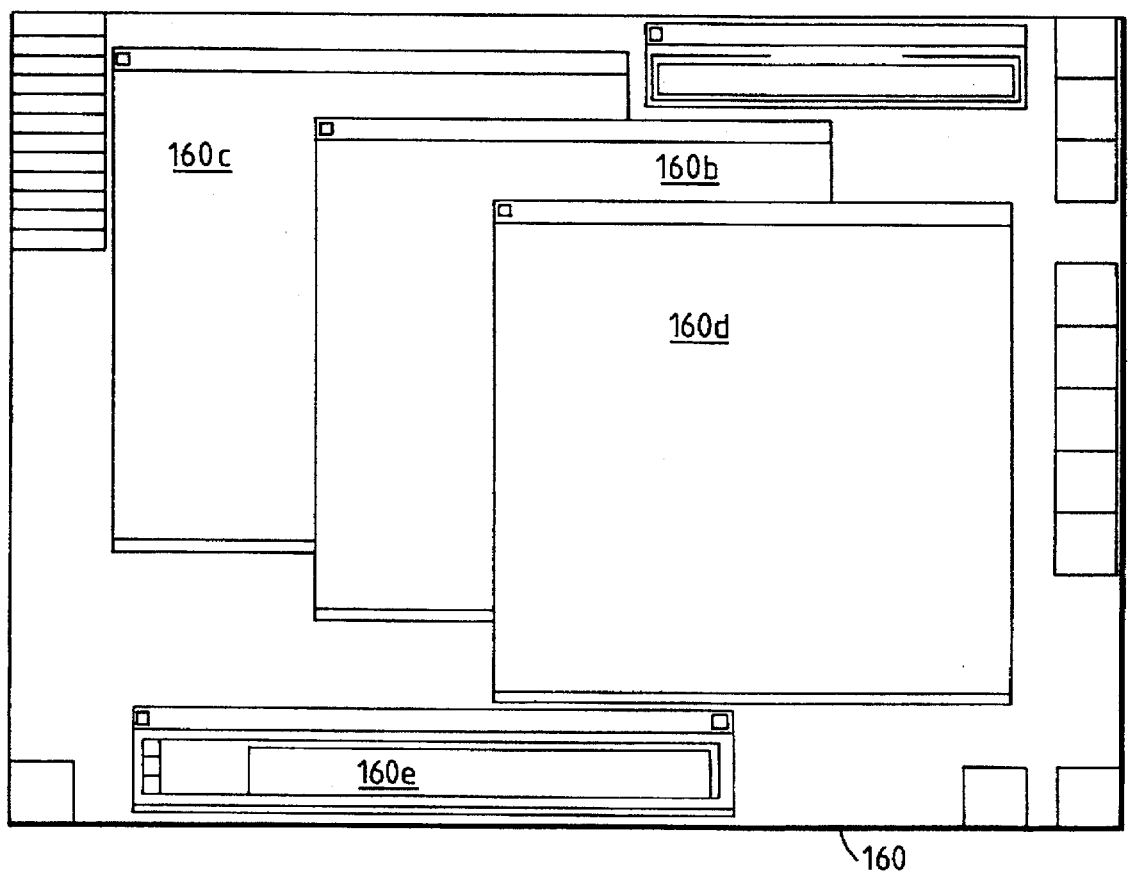
FIG. 17 shows an embodiment of the present invention, and shows schematically the arrangement of display areas of a display device.

Referring to FIG. 17, the display generated on the monitor 160 may therefore include display areas 160b–160e corresponding to some or all of the buffers 130b–130e, although preferably means (the input means 170 and CPU 110) are provided for enabling a user to select only one or some such display areas.

The buffer 130b as discussed above comprises image data which corresponds to a single selected frame of a sequence.

The buffer 130c is likewise dimensioned to contain a single frame image, which is however the image corresponding to the stored template.

The buffer 130d is arranged to store an image which comprises a montage of a succession of frames (key frames and interpolated frames) having successive frame numbers, and defining part of a timeline or sequence, in a manner described in greater detail below.

The buffer 130e stores a bar chart image comprising a plurality of bars each corresponding to one frame of the image in the buffer 130d, and each displaying the value of the interpolant factor for a corresponding frame as a length along the bar.

Figure 18:
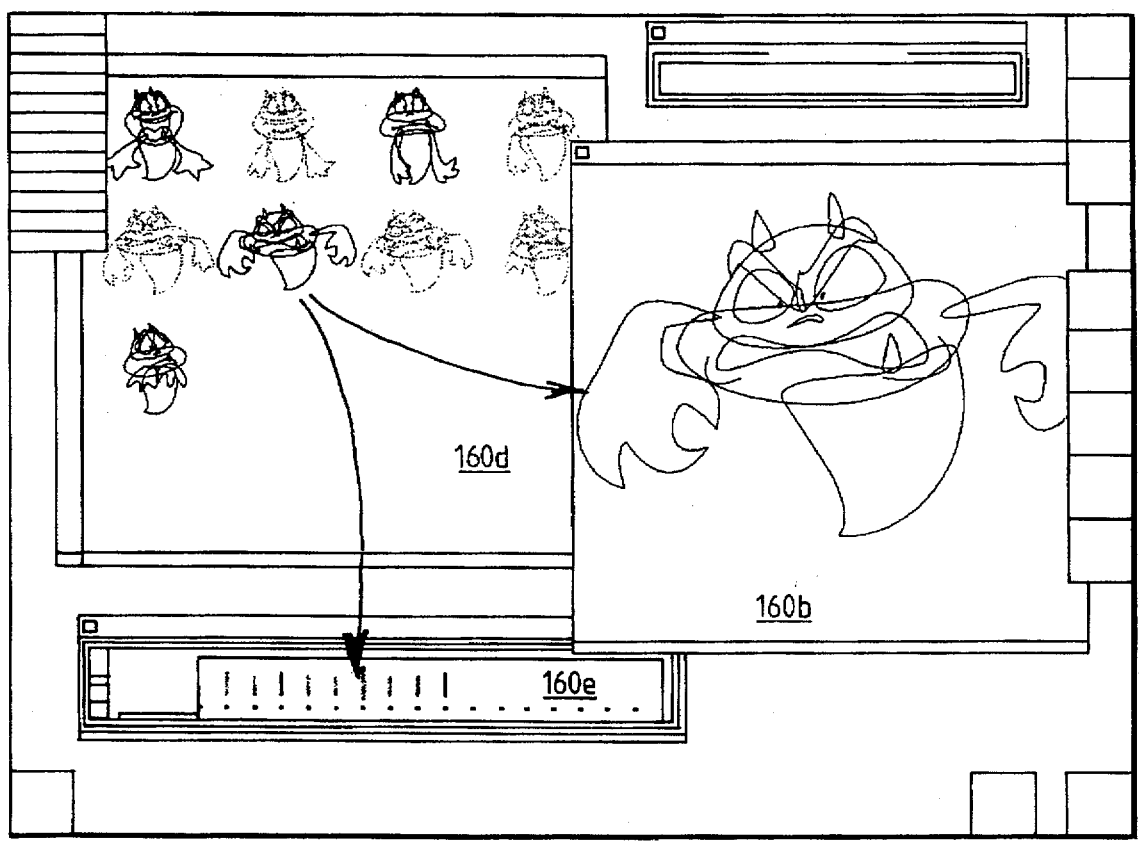
FIG. 18 shows an embodiment of the present invention, and shows the appearance of related displays in the display areas.

The appearance of an exemplary corresponding display is as shown in FIG. 18, in which the dark images correspond to key frames and the grey images correspond to interpolated frames. It will be seen that in this embodiment, a given frame may be represented in three different manners simultaneously; firstly, as an individual display on the display area 160b which corresponds to the contents of the image store 130b; secondly, as part of sequence displayed in the sequence display 160d corresponding to the image store 130d; and thirdly, as a bar of the bar chart representing the timeline in which the image is included, displayed in the display area 160e corresponding to the image buffer 130e.

Figure 19A:
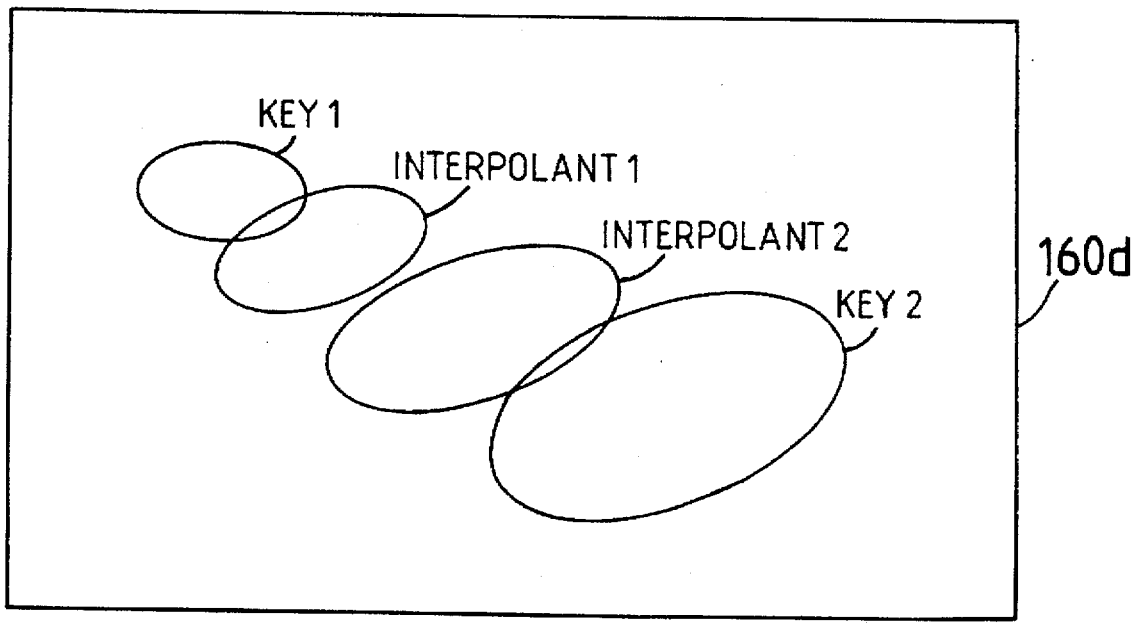
FIGS. 19a–19c show an embodiment of the present invention, and show alternative display formats.
Figure 19B:
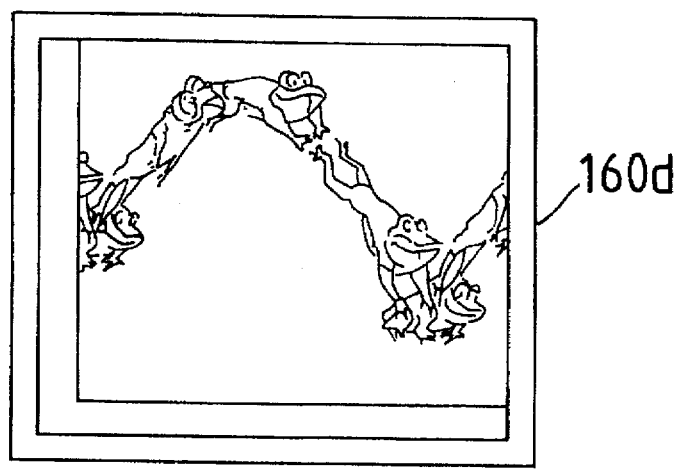
Figure 19C:
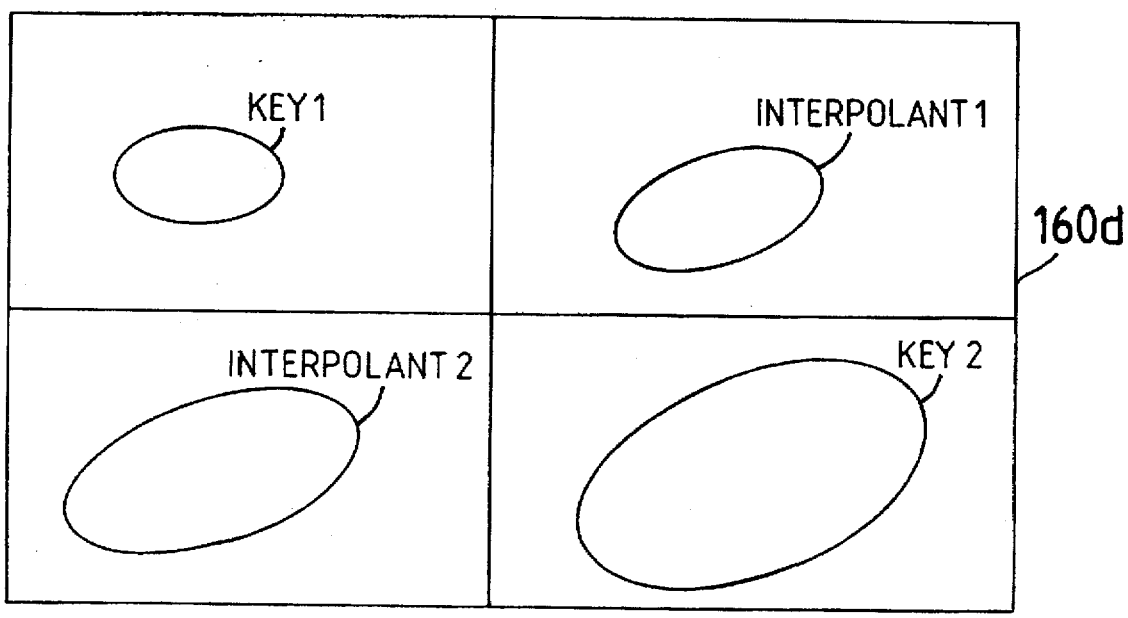

Referring to FIGS. 19a–c, the image held in the sequence buffer 130d may be presented in differing formats. In a first format, shown in FIGS. 19a and 19b, the sequence image is produced by writing into the buffer 130d raster image data corresponding to each of the frames making up the sequence, so as to generate a display 160d in which the frame images are progressively displaced one from the other, but with some overlap so that each frame image partially overwrites its predecessor in the buffer 130d. The frame images could also be provided with no progressive displacement (i.e. superimposed).

FIG. 19c shows an alternative embodiment in which each frame image is written into the buffer 130d into a spatially separate portion thereof, without overlap. This embodiment is also illustrated in FIG. 18. The display format of FIG. 19c is of assistance in viewing motion, since corresponding parts of the object in successive frames are close together. The representation of FIG. 19a, however, enables each frame to be more clearly examined. Advantageously, preferred embodiments of the invention provide means (e.g. the keyboard 170b) for selecting between these modes. It may also permit the displacement between successive frame images in the mode shown in FIG. 19c to be varied.

Figure 20:
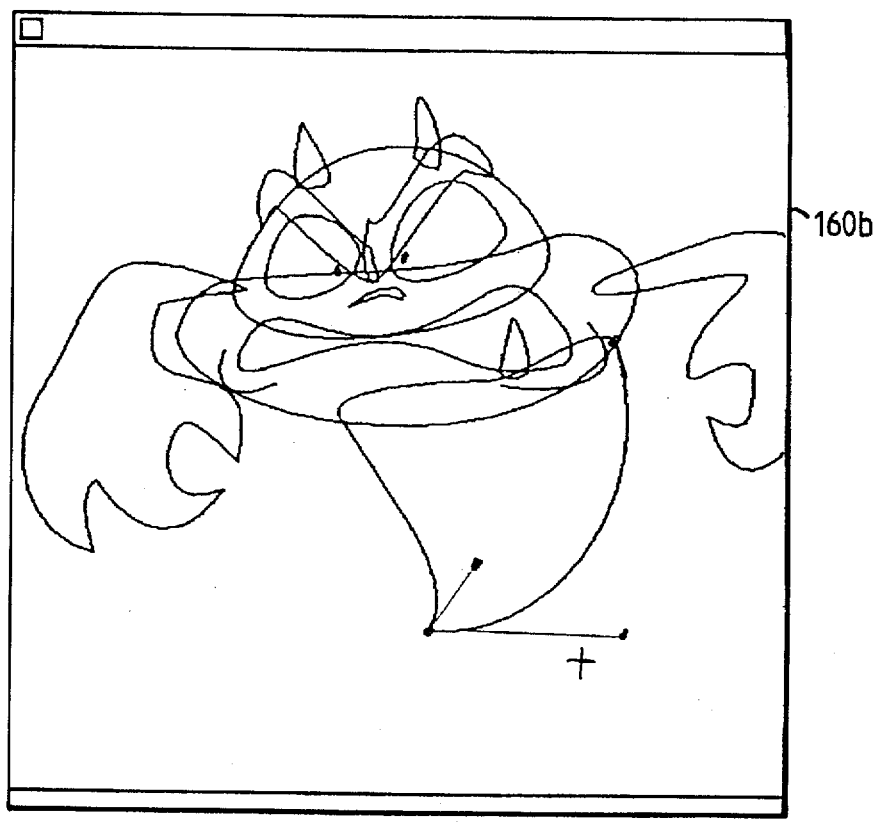
FIG. 20 shows an embodiment of the present invention, and illustrates the appearance of the display during editing.

Referring to FIG. 20, the presentation of a frame in the frame display area 160b when it is desired to edit a frame is shown. When the user indicates a desire to edit a frame by selecting that frame (by manipulating the keyboard 170b or position sensitive input device 170a) the display generator 111 is arranged not only to generate the frame image data in the frame buffer 130b, but also to generate symbols (e.g. dots) at curvature control points. Preferably, the tangent end points and, more preferably, the tangent extent lines are also drawn. Finally, a cursor symbol (shown as a "+") is displayed, to enable a user to edit the frame image as discussed above using the position sensitive input device 170b.

Figure 21:
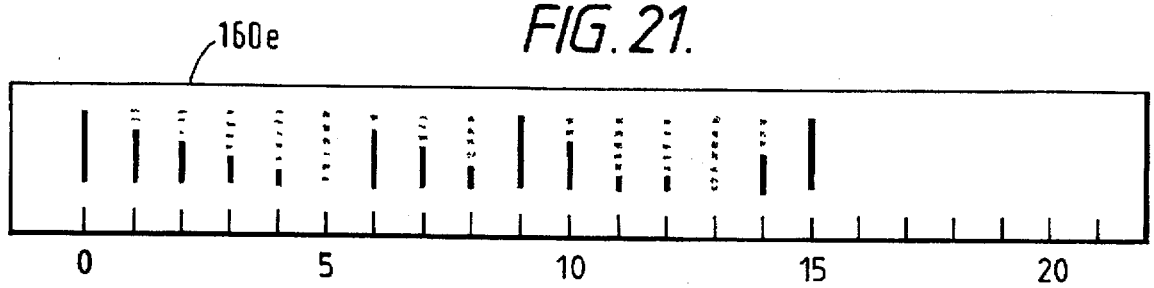
FIG. 21 shows an embodiment of the present invention, and shows schematically the appearance of a further display area.

Referring to FIG. 21, the display area 160e displays the bar chart data display held in the timeline buffer 130e. Each bar relates to a frame (key frame or interpolated frame) within a single timeline. The length of the bar shows the interpolation factor associated with interpolated frames, and since key frames are (by definition) not interpolated, they have either maximum or minimum bar lengths. The usefulness of the timeline display 160e and corresponding buffer 130e is, firstly, in providing the user with a synopsis of the information shown in the sequence image area 160d and, secondly, in providing a particularly simple way of editing the timeline, and seeing the effects on the timeline as a whole, by using the position sensitive input device 170a to position the cursor symbol at selected bars of the display 160e and signalling an appropriate control signal.

One type of such amendment is to alter the interpolation factor of given interpolated frame. In this case, the height of the bar for that frame is varied to follow the cursor position symbol manipulated by the user, and the interpolation value stored in the corresponding frame table 111a is amended accordingly. Initially, the values of the interpolation factor in successive frames follow a progressive sequence which is typically a linear sequence, but could equally follow any predetermined curve (usually monotonic) between the neighbouring key frames. It is advantageous to provide that each bar is displayed in two colours, the height of the bar comprising the interface between the two, and that the colours of key frame bars (determined using the key frame numbers thereof) should alternate, and the height of the interpolant bars should rise with interpolation factor after one key frame, then fall with interpolation factor after the next, so as to present a rising and falling bar height rather than a sawtooth pattern. This is found easier for a user to interpret.

Such a progression gives the user an immediately visible sequence, which is considerably easier to use than having to specify each interpolant value individually, and it is found that in most cases, the same progression (for example, linear interpolation) can be employed. However, it is extremely useful to be able to amend the sequence merely by amending the interpolation value of a given frame (rather than redrawing or editing the frame), and this is particularly advantageously achieved by onscreen manipulation of a bar chart display using the position sensitive input device 170a.

Another type of amendment involves moving a frame or a series of frames in time. The chart display provides a readily visualised means for achieving this; using a position sensitive input device 170a, the user may designate one or a number of frames, and then move the frames along the timeline using the cursor symbol to a desired new position. In this case, the apparatus is arranged to alter the frame numbers of the frames selected by the user, and to generate new intervening frames (or delete old frames) as required. More details will be given below.

DESCRIPTION OF PARTICULAR OPERATIONS

A description of one exemplary method of performance of particular operations will now be described.

Creating a Template Frame

The user signals a desire to create a new template by generating an appropriate signal using the keyboard 170b or position sensitive input device 170a, typically by selecting an option from a menu displayed (possibly permanently) on the monitor 160.

The CPU 110 then creates within the working memory 121 a template table, which comprises a frame table 122 and a datum indicating that the frame is a template frame. Because the template frame is not itself employed in a sequence, no sequence numbers are necessary. The user will typically signal, via the keyboard 170b, a name to be associated with the template, which is stored therewith in the working memory 121. The template display area 160c is generated on the monitor 160. The cursor symbol is displayed within the display area 160c, and the user can proceed to build up a template. To do so, the user selects from the following options:

Creating a new curve—the current cursor position provides the x,y coordinates of the first control point. The length of the tangent at this point is set to 0. These values are written into the frame table 122. The cursor position is continually monitored, and provides the second control point position coordinates, the values in the table 122 being continously updated with movements of the cursor until a control signal is generated by the user to fix the coordinates of the second control point (when the desired location is reached). A line between the first and second control points is continually generated by the line generator 111 within the template buffer 130c, displayed on the template display area 160c, to enable the user to determine the correct position for the second control point. The second control point tangent length is likewise initially set to 0.

Amending a control point—as described above with reference to FIG. 10.

Adding a new control point—a further control point can be inserted within a curve, to increase the complexity of the curve by dividing a segment of the curve into two. Accordingly, the user positions the cursor symbol at a desired point along a curve displayed on the template display area 160c, and initiates a signal via the keyboard 170b, or the position sensitive input device 170a (for example, by "clicking" a mouse device). The current cursor position coordinates are read, and the identity of the two control points which lie to either side of the current position along the line segment are determined. The cubic equation is solved using the current cursor coordinates, to derive the value of the parameter t at the current cursor position. A new control point record 2110 is created within the frame table 122 for the template, including pointers to the records of the two neighbouring control points on the curve. The "next control point" and "previous control point" pointer field in the surrounding control point data records are amended to point to the new control point. The slope and magnitudes of the tangents at the new control point are calculated, and stored in the new control point record. The new control point may then be edited, to change the shape of the curve running through it.

Deleting a control point—on an appropriate signal being generated by the user, the control point at which the cursor is located is looked up in the table 122 using the current cursor position coordinates, and the corresponding control point record is deleted. The "next control point" and "previous control point" fields of the neighbouring control points on the curve segment are amended to point to each other and omit reference to deleted control point.

By adding and editing line segments, the desired line drawing is built up on the template display area 160c, and a corresponding set of curve data is stored in a frame table 122 labelled as corresponding to a template.

In addition to the above described operations, which directly affect the shape of the curve, the user can also add attribute control points to control attributes of the finally rendered image, by positioning the cursor symbol to a desired point along the curve segment represented on the display device 160 and generating an appropriate signal (e.g. by pressing appropriate key on the keyboard 170b). On doing so, the current cursor position is used to find the preceding curvature control point along the curve, to the attribute control point list of which a new attribute control point record is inserted and the pointers of surrounding attribute control points altered accordingly. The value of the parameter t is derived and stored in the attribute control point record, and the user may input data concerning the value of the attribute at that point for later use (as decribed in our above reference copending application Ser. No. 08/311,398.

Having built up a desired template, typically the contents of the template table 122 are stored to the mass storage device 180 so as to be recallable using the name or identification data for the template (e.g. the file name).

Creating a Key Frame

The set of curves comprising the key frame may be edited and stored in a key frame table, corresponding images being displayed in the frame display area 160b derived from the frame buffer 130b, in the same manner as described above with reference to a template. The point in time of occurrence of the key frame in the sequence is also of significance; it is therefore necessary to store data defining the sequence and timeline to which the key frame belongs; the position of the key frame in the sequence relative to other key frames; and the absolute position in the sequence or timeline of the key frame (the frame number).

The user may input these via the keyboard 170b. Alternatively, if the cursor tracker 112 identifies the cursor position as corresponding to that of one of the bars of the bar chart display shown in display area 160e, the key frame may be allocated the corresponding frame number. In the absence of either, the apparatus is preferably arranged to allocate the key frame a frame number equal to the current largest frame number plus one, and a key frame number equal to the current large key frame number plus one, so that the frame is added to the end of the existing timeline.

A new key frame table 122 is then created within the memory 120, and the CPU 110 copies the contents of the template frame table into the new key frame table so that the new key frame is identical to the template. The address within the memory 120 of the new key frame is then inserted into the "next key frame" pointer of the neighbouring key frame or key frames in the timeline, and any other necessary pointers within the memory are set to reflect the addition of the new key frame.

The timeline image buffer 130e is amended to cause the generation of a new bar at the key frame position in the display area 160e, and then the interpolated frames of the preceding key frame, if any, are recalculated (as discussed in greater detail below). If there is a succeeding key frame, a set of interpolated frames to the succeeding key frame are also calculated, and corresponding interpolated frame data tables are set up within the memory 120, as a list pointing to the new key frame. The sequence display buffer is then updated to include the newly interpolated frames, and the display on the monitor 160 in the display area 160d is correspondingly altered, as is the timeline bar chart display area 160e.

Interpolation

Figure 22:
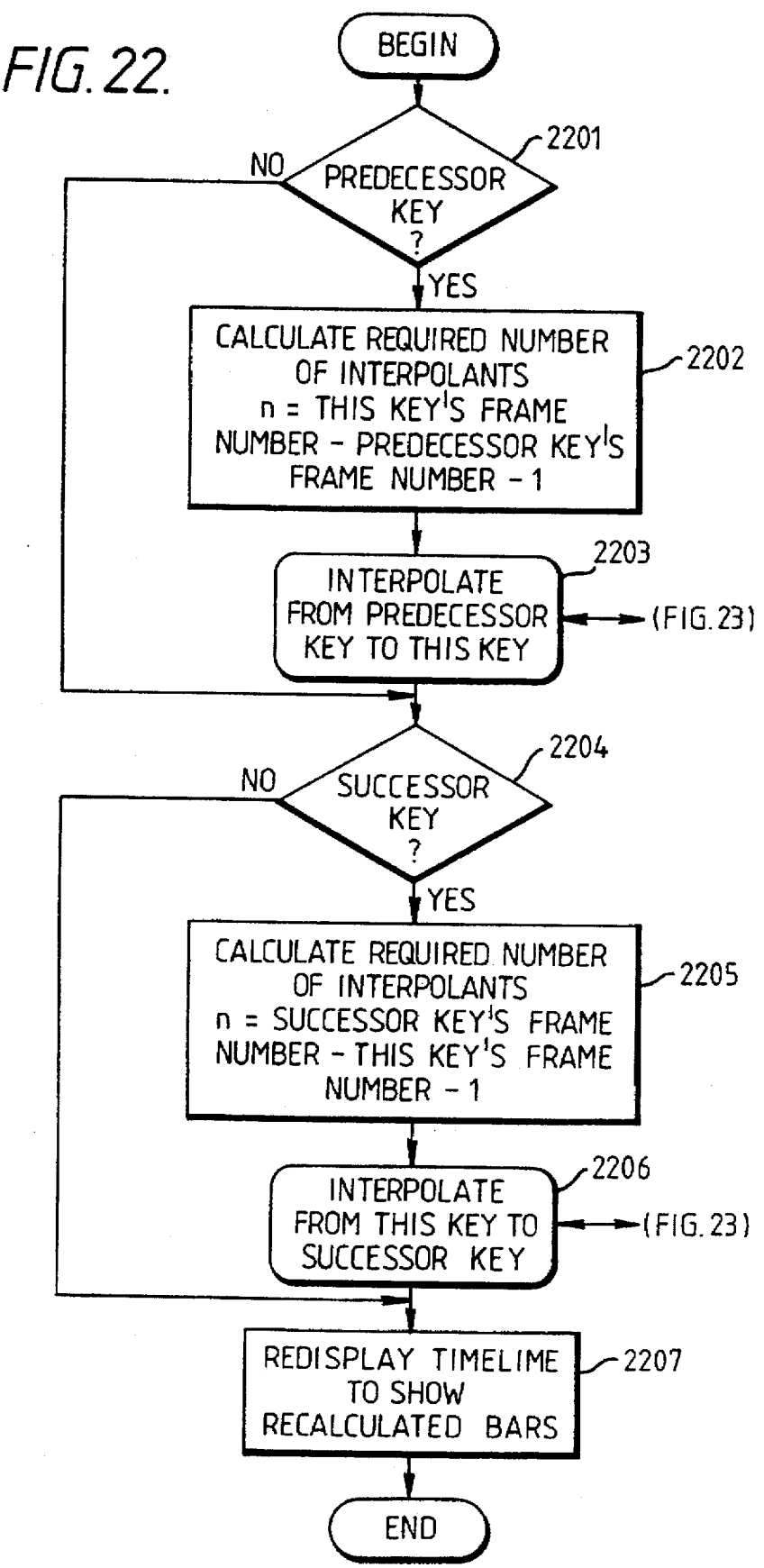
FIG. 22 shows schematically a method of interpolating animate frames in one embodiment of the invention.

When, as above, a key frame is created or amended or deleted or moved in time, it is necessary to recalculate the interpolated frames on either side of the change. Referring to FIG. 22, the CPU 110 first checks (box 2201) whether there is an immediately previous key frame in the timeline. If there is, in other words if the present key frame is not the first frame of the timeline, the separation in frame numbers of the two key frames is found (box 2202) and the number of interpolants is set equal to this. The interpolation routine shown in FIG. 23 is then executed to interpolate from the preceding keyframe (box 2203).

Figure 23:
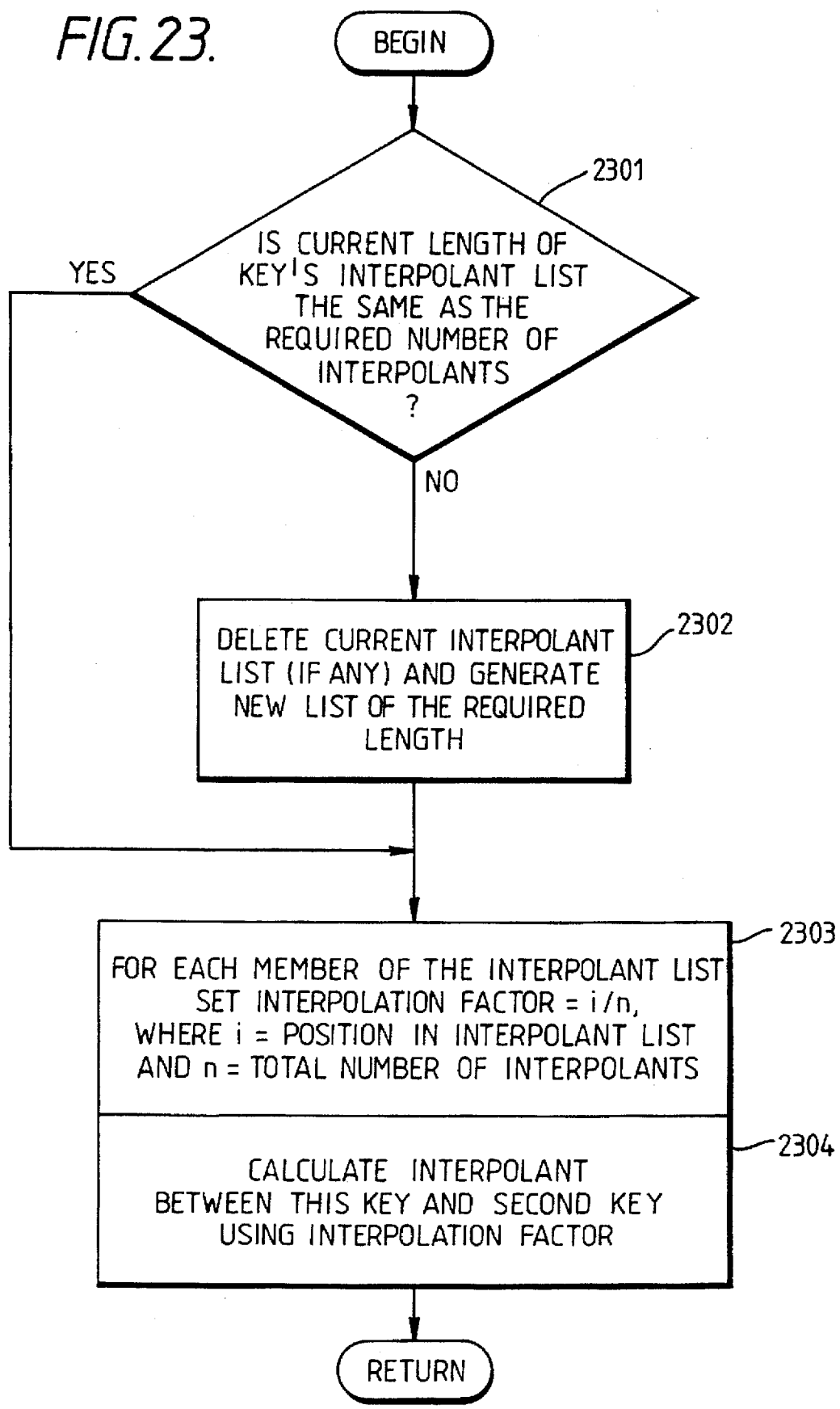
FIG. 23 shows an embodiment of the present invention, and shows schematically a part of the method of FIG. 22.

Referring to FIG. 23, the length of the list of interpolated frames of the earlier key frame is examined (box 2301); if the new number of interpolants required differs from the current number in the list, or if there is no current list, the current list is deleted and a new list of the required length is created (box 2302 in memory). Each interpolant in the list is allocated an interpolation factor (box 2303); for the i'th list member (i.e. the i'th frame after the earlier key frame) in a list comprising n members, the interpolation factor is $L=i/n$ for linear interpolation, or $F(i/n)$ where F is a non-linear function. One non-linear function which may be used is sigmoidal; that is, tends to horizontal at either end and is monotonically rising in between, so as to slow the interpolation rate towards either keyframe, and smooth the transition through the key frame; other functions smoothing the transition are equally possible.

Next (box 2304), the curve data for each interpolated frame is derived and stored in the associated interpolated frame table. Each key frame is derived from the same template, and hence will have the same number of curve control points. For a given interpolated frame having an interpolation factor L, the CPU 110 therefore takes the first curve control point of the earlier key frame and that of the later key frame, and stores for the first curve control point of the interpolated frame a value intermediate between the two. The x,y position of the interpolated point is derived as:

$$x=x_1(1-L)+x_2L,$$

where $x_1$ is the earlier frame (to the list of which the interpolated frame belongs) and $x_2$ is the later frame. The y coordinate is likewise given by:

$$y=y_1(1-L)+y_2L.$$

The coordinates of the tangent extent point at the control point are derived in exactly the same manner.

A preferred embodiment allows values of L greater than unity; this permits a character to "overshoot", which gives a desirable visual effect in cartoon animation. In this case, the (1-L) term may be set to zero. For example, overshoot may be provided by interpolating from L=0 to 1.2 in 8 frames, and 1.2 to 1.0 in two following frames.

The CPU 110 then proceeds to the next control point in the lists of the two key frame, and proceeds until all control points of all curves of the two key frames have been interpolated to produce corresponding control points in the interpolated frame. The CPU 110 then selects the next interpolated frame, with a correspondingly higher interpolation factor, and repeats the process.

Returning to FIG. 22, the CPU 110 next (box 2204) determines whether there is a following key frame occurring in the timeline, (e.g. by referring to the pointers maintained in the timeline table 1110) and, if so (in other words, if the key frame is not the last frame of the time) the process of box 2202 is repeated (box 2205) and the process shown in FIG. 23 is again executed (box 2206) to interpolate frames between the key frame and the following key frame. Once the corresponding interpolated frame tables have been calculated, the CPU 110 amends the data held in the timeline image buffer 130e to reflect the new interpolation factors, and updates the display area 160e (box 2207).

Likewise, a new image is generated in the sequence image store 130d corresponding to the new interpolant values and the sequence display area 160d is updated.

Converting an Interpolated Frame into a Key Frame

Where an interpolated sequence is unsatisfactory (as sometimes occurs when the sequence is to show an object moving in three dimensions, since the interpolation only interpolates in two dimensions) one convenient way of improving the sequences is to convert one of the interpolated frames into a key frame, and then edit the key frame as desired. To signal his intention to do so, the user may for example position the cursor symbol at the bar on the timeline display area 160e and issue an appropriate control signal (for example, by "clicking" a mouse device 170a twice). The CPU 110 then identifies the cursor position and derives the frame number of the corresponding interpolated frame. Next, the CPU 110 reads the frame table for that interpolated frame and locates the key frame in relation to which the interpolated frame from the key frame list is stored (box 2401).

Figure 24:
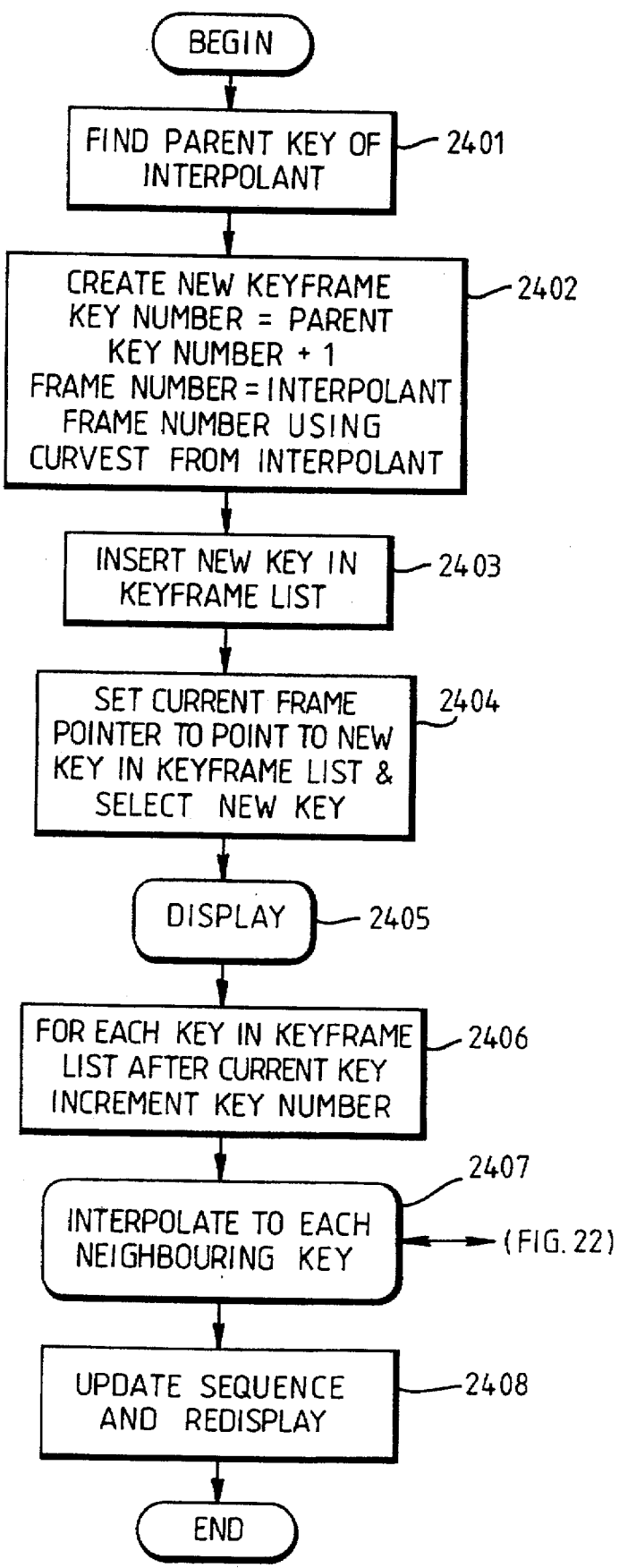
FIG. 24 shows an embodiment of the present invention, and shows schematically a method of converting a key frame to an interpolated frame.

Next, referring to FIG. 24, the CPU 110 creates (box 2402) a new key frame data table, and allocates the key frame the next key frame number after that of the key frame to which the interpolated frame belonged. The frame number is retained. The curve data of the interpolated frame table 122 is then copied into the new key frame table, and the interpolated frame table is deleted.

Reference to the new key frame is inserted into the list of key frames maintained in the time line table after the parent keyframe of the interpolant (box 2403). The new key frame is then selected for display in the frame display area 160b (box 2404), and corresponding image data is generated in the frame image buffer 130d and displayed on monitor 160 (box 2405). The frame is preferably displayed as shown in FIG. 20, with the curve control points and tangents indicated for editing.

Subsequent key frames in the list stored in the timeline table are renumbered, each incremented by one, to take account of the insertion of a new key frame (box 2406). Next, the interpolation process of FIG. 22 is executed (box 2407), and the sequence display frame store 130d is correspondingly modified to generate an updated sequence display in the display area 160d (box 2408). With linear interpolation, the appearance of the other interpolated frames may not change until the new key frame has been edited, but the interpolation factors for each will have changed.

Figure 25:
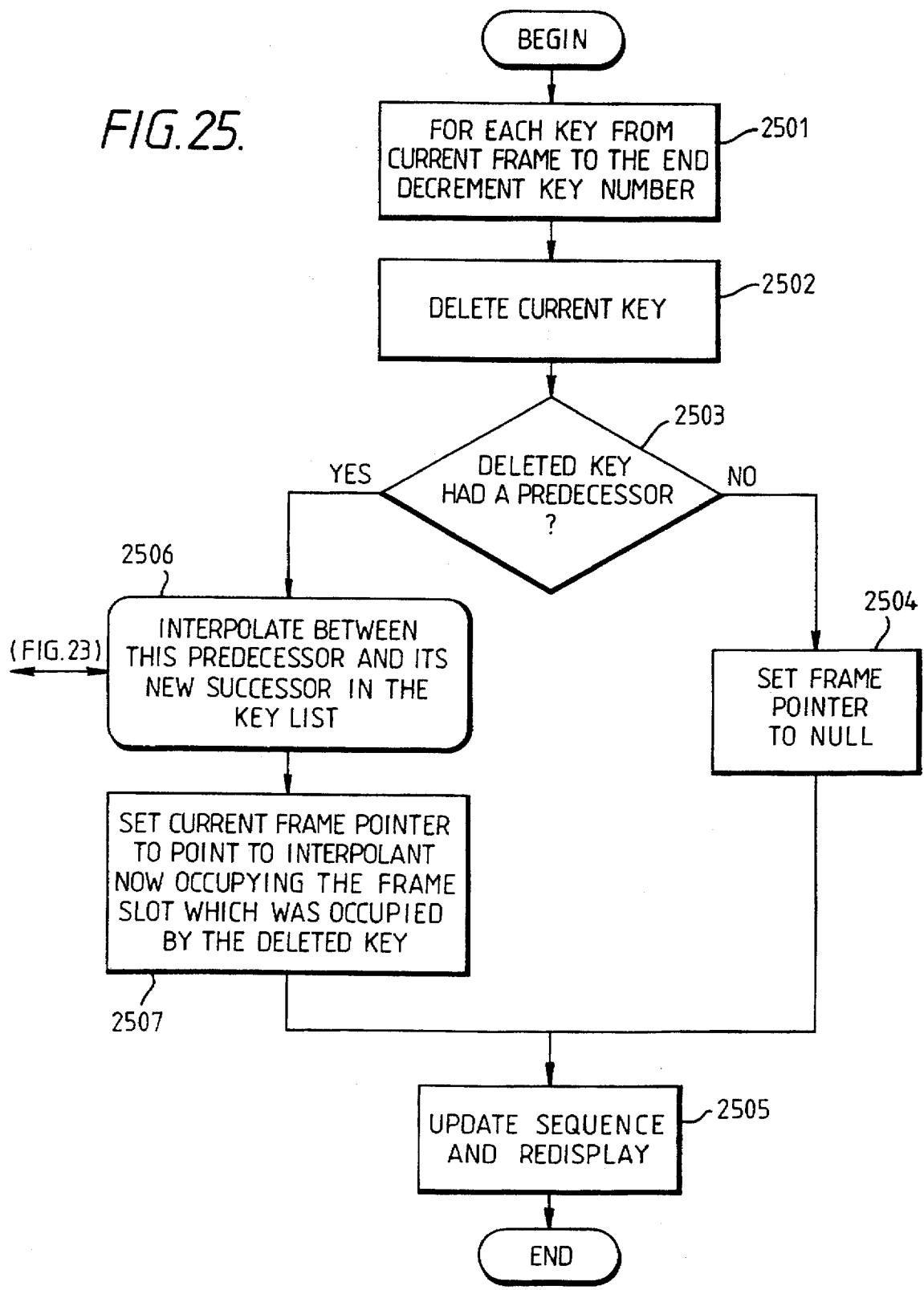
FIG. 25 shows an embodiment of the present invention, and shows schematically a method of deleting a key frame.

Deleting a Key Frame

Where possible, it is desirable to simplify the calculation of the sequence by minimising the number of key frames. Accordingly, it may on occasion be possible to delete a key frame, and correspondingly interpolate frames between the two surrounding key frames. Referring to FIG. 25, when a user signals a desire to delete a key frame (for example, by positioning the cursor symbol at the corresponding bar of the bar chart display area 160e and issuing an appropriate control signal using the position sensitive input device 170a or keyboard 170b), the CPU 110 reads the key frame number of the key frame concerned and accesses the timeline data table. The key frame numbers of succeeding key frames in the list maintained by the timeline table are accordingly decremented by one (box 2501), and then the current key frame table is deleted from the memory 121 (box 2502). All interpolated frame tables, listed within the key frame table are also deleted.

The CPU 110 tests (box 2503) whether there is an earlier key frame in the key frame list. If the key frame is the first key frame of the timeline, the only further action taken is to regenerate the image data in the sequence display buffer 130d and update (box 2505) the sequence display 160d and likewise amend the timeline buffer 130e and display area 160e (box 2504), to remove the references to the deleted keyframe and its interpolated frame. The succeeding frames may also be shifted back in time.

On the other hand, if the deleted key frame occurs later in the sequence, the CPU 110 performs the interpolation process shown in FIG. 23 (box 2506) from the key frame which preceded the deleted frame to its new successor in the timeline.

Since the frame numbers of the following key frames have not been changed, the key frame will be replaced for display by an interpolated frame (box 2507). The sequence image in the sequence image store 130d and the bar chart image in the bar chart image buffer 130e are updated by the CPU 110 (box 2505), and correspondingly redisplayed on the monitor 160.

Moving a Key Frame

To change the length of an interpolated sequence in time, or to rearrange the order of the sequence, the preferred embodiment enables the user to indicate a particular key frame and change its time of occurrence in the sequence (e.g. frame number).

Typically, the user indicates an intention to move the key frame by positioning the cursor symbol at a desired key frame bar on the bar chart display area 160e and inputting an appropriate control signal, via the keyboard 170b or position sensitive input device 170a, and then moving the cursor symbol to the desired new key frame location.

Figure 26:
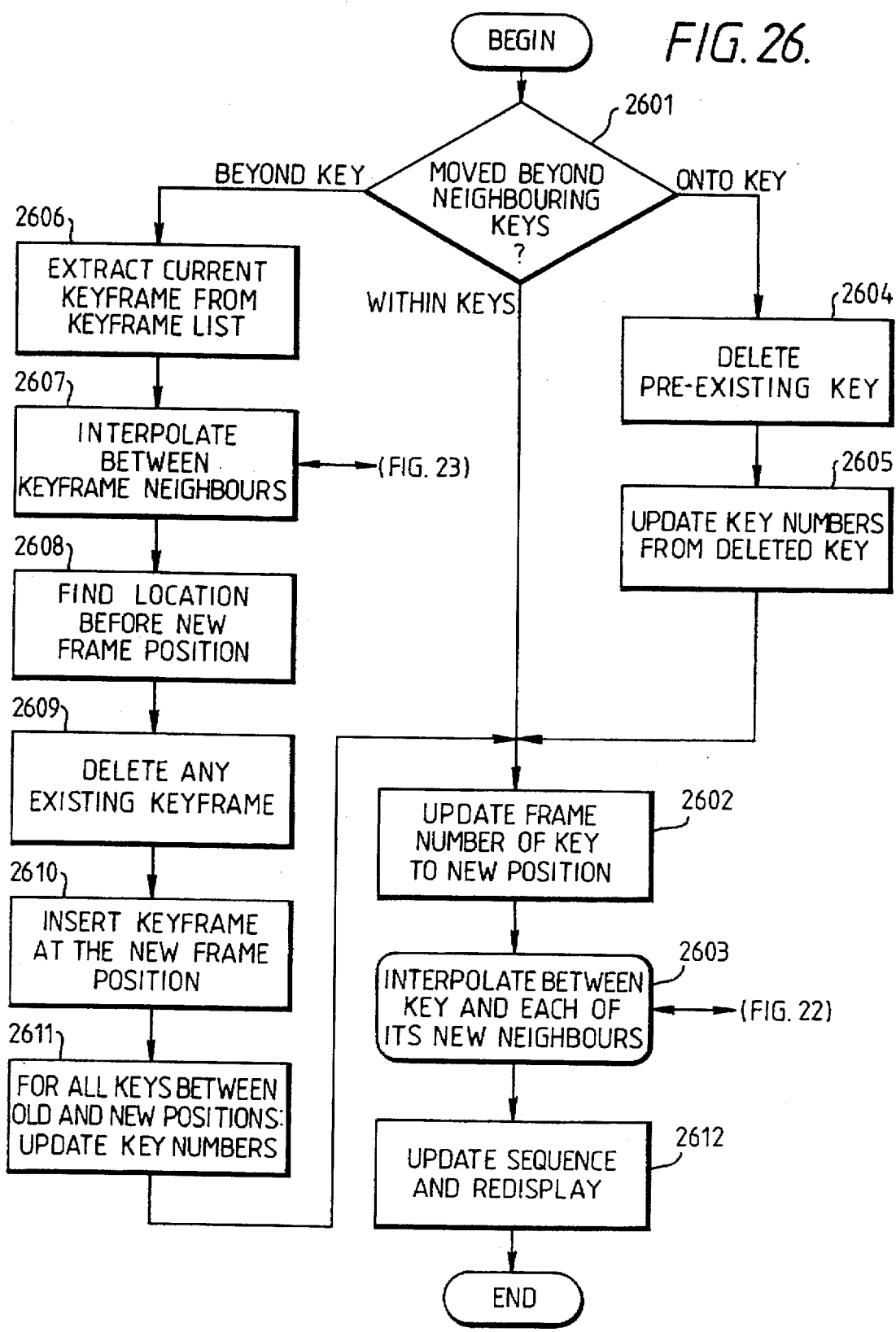
FIG. 26 shows an embodiment of the present invention, and shows schematically a method of moving a key frame.

Referring to FIG. 26, the CPU 110 determines from the cursor symbol position the frame number corresponding to the new location and tests (box 2601) whether it has moved beyond its neighbouring key frame. If the frame has not been moved past either of its neighbouring key frames, the frame number of the key frame is changed to that of the new location (box 2602) and the interpolation routine of FIG. 22 is then executed (box 2603). If the key frame is moved on to the frame number of its neighbouring key frames, the pre-existing key frame is deleted (box 2604) and the key frame list is amended to avoid reference to it. The key frame numbers of all following key frames in the key frame list are then decremented (box 2605). After this, the CPU 110 continues, as above, by allocating the key frame a new frame number and interpolating using the process of FIG. 22 (boxes 2602, 2603).

If the key frame has been moved past either of its neighbours, the CPU 110 first (box 2606) removes the key frame from the key frame list and links the pointers of the neighbouring key frames, and then (box 2607) executes the interpolation routine of FIG. 23 to regenerate the interpolated frames for the key frame preceding the deleted key frame.

Next, in box 2608, the CPU 110 locates the key frame at or immediately preceding in the key frame list the new frame to which the selected key frame is to be moved. If there is already a key frame at the position to which the selected key frame is to be moved, the CPU 110 deletes the record of that key frame (box 2609). The selected key frame is then inserted in the key frame list maintained in the timeline table, just after the previous key frame position, by amending the "previous" and "next" pointers in the key frame tables concerned (box 2610).

The key frame numbers of key frames between the old position and the new position are then decremented (box 2611) to reflect the new key frame order. Furthermore, if the key frame has replaced an existing key frame at its new position, subsequent key frames are also decremented. Thereafter, the CPU 110 proceeds as above to update the key frame frame number (box 2602), generate new interpolated frames between the key frame and its neighbour on either side (box 2603), and regenerate the sequence image buffer 130d and display 160d, and correspondingly the timeline buffer 130e and display area 160e (box 2612).

In a preferred embodiment, the CPU 110 is arranged to be capable of accepting an instruction to move a block of successive frames in time; the above process is in this embodiment essentially repeated for each such frame.

Example Sequence of Operations

Referring to FIGS. 27a–d, and to FIG. 18, the results of the sequence operations described above will be illustrated.

Figure 27A:
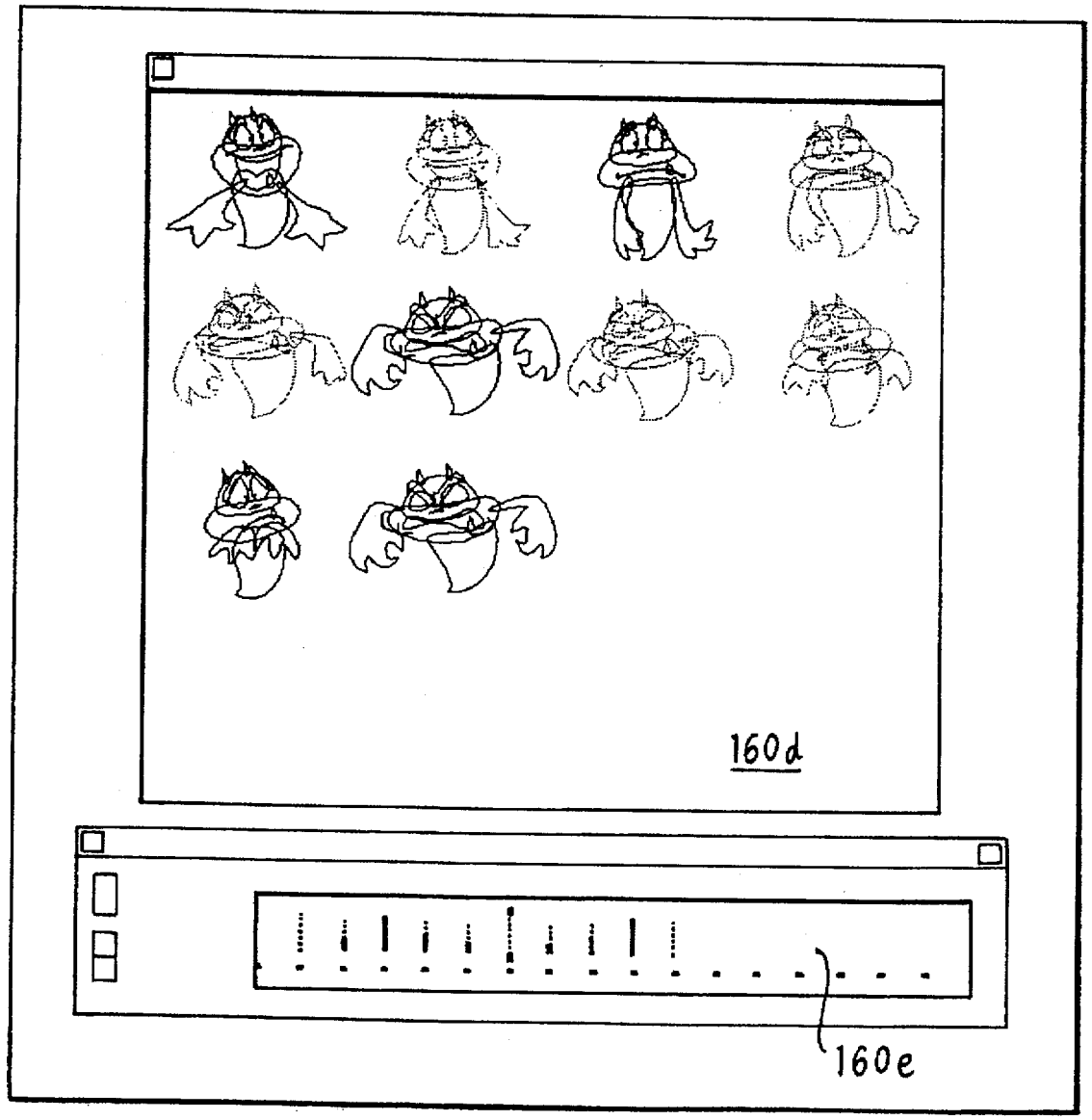
FIGS. 27a–d show an embodiment of the present invention, and show schematically the results displayed on the monitor corresponding to the operations of FIGS. 22–26.

Referring to FIG. 27a, the user positions the position sensitive input device so as to move the cursor symbol to the next vacant point in the bar chart display area 160e on the monitor 160, and initiates a control signal indicating a desire to create a new key frame thereat.

The CPU 110 copies the template (or an existing key frame) to create a new key frame table in the memory1121 as discussed above. The sequence display buffer 130d is regenerated, and the display area 160 consequently displays the new key frame at the end of the sequence. The bar chart display area 160e likewise displays a new key frame bar.

Preferably, the apparatus is arranged also to generate a new key frame which is a copy of an existing key frame; in this case, the user may designate the existing key frame he wishes to copy using the position sensitive input device 170a to position the cursor symbol appropriately, and upon generating an appropriate control signal via an input device the CPU 110 will, rather than copying the template table, copy the designated key frame table curve data to produce the new key frame table curve data.

Figure 27B:
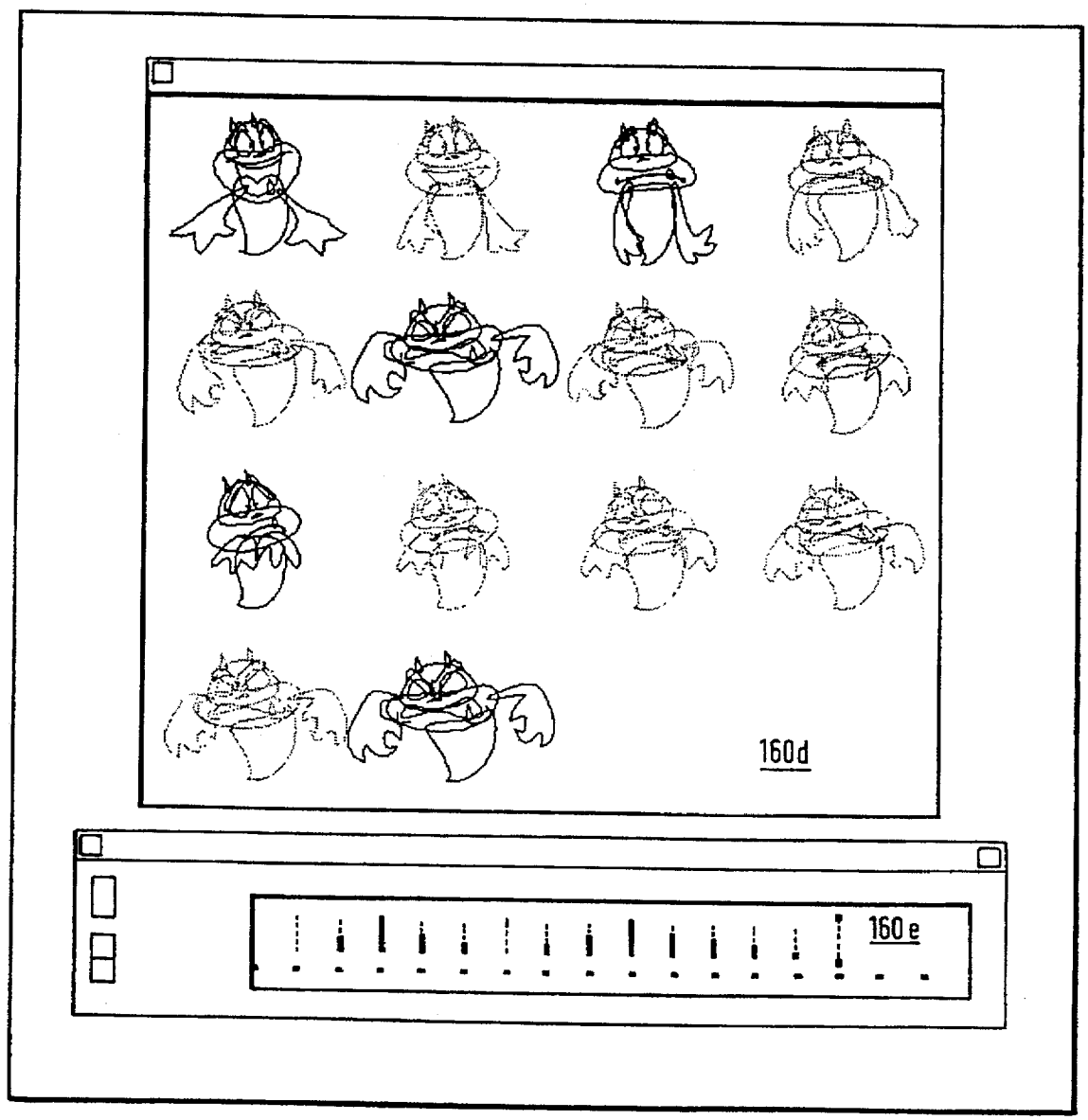

Referring to FIG. 27b, the user then generates an input signal indicating an intention to move the just created key frame four frames later in time. The CPU 110 performs the routine of the centre path of FIG. 26, and four interpolated frames are added to the interpolated frame list of the preceding key frame.

The sequence display and timeline displays 160d, 160e are then updated as above.

Figure 27C:
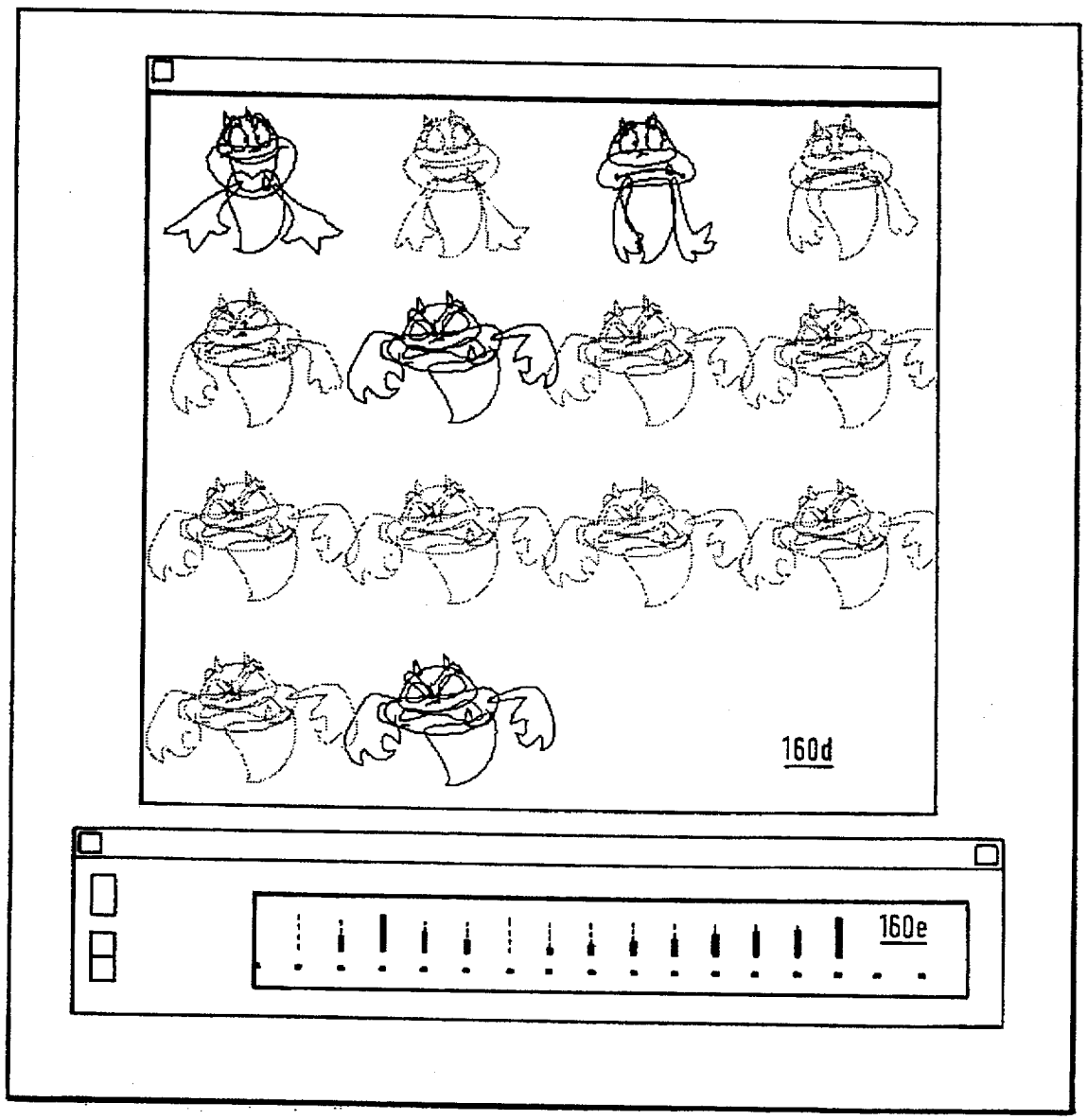

Referring to FIG. 27c, the user signals a desire to delete the preceding key frame and the CPU 110 executes the routine of FIG. 25. Since the last two key frames are now substantially identical, it will be seen that the key frames interpolated therebetween are likewise identical.

Figure 27D:
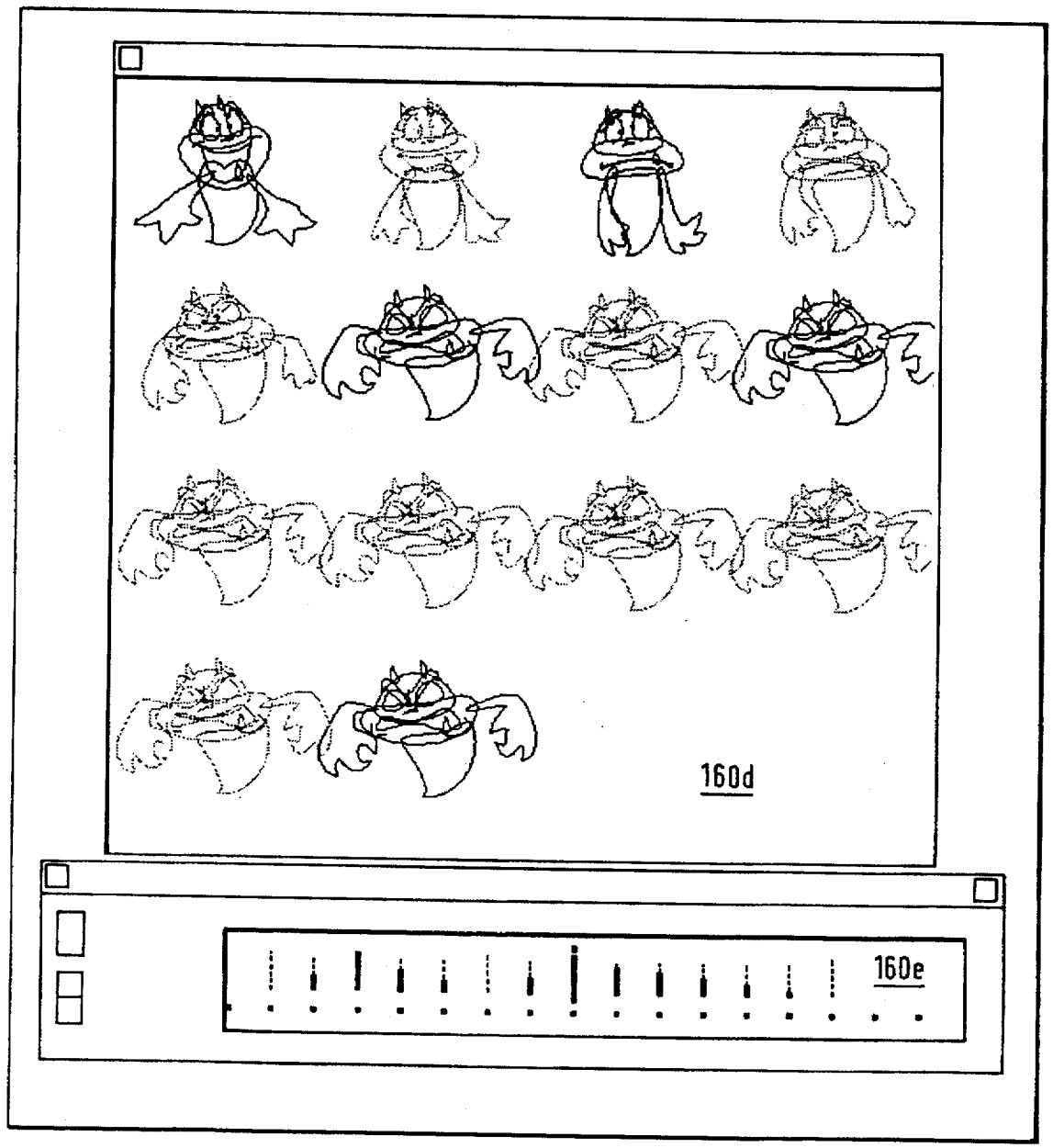

Referring to FIG. 27d, the user next signals an intention to convert one of the intervening interpolated frames into a key frame, to allow for subsequent editing. The CPU 110 follows the routine of FIG. 24, and updates the displays 160d and 160e.

Adding Further Curves to a Frame

In the above described embodiments, each key frame (and consequently each interpolated frame also) includes only those curves defined by curve control points which exist in the template frame. The method of adding control points and new curves to the template has already been discussed above.

Initially, as discussed above, each key frame comprises the same curve data as the template to which it is consequently identical. However, the user will often wish to delete some parts of the template for a given key frame; for instance, when an object is turned, many lines become invisible as they are obscured by other parts of the object. The key frame corresponding to the turned object would therefore not be required to include those lines.

Accordingly, the user can delete some control points (and/or curves from a key frame, and the pointers in the frame table 122 will be correspondingly reset to omit references to the deleted points and curves. In this case, the CPU 110 does not affect any other key frame or the template frame table. However, the repositioning of the pointers within the frame table 122 does not affect the correspondence between the remaining control points and curves and their counterparts in the template set. Each is still uniquely identifiable to the CPU as corresponding to a particular point in the template set.

It is thus possible for different frames to correspond to different subsets of the template set. It may also occur that, whilst preparing a particular key frame, a user wishes to add a further control point or a curve comprising a number of control points. To do so directly would however introduce points which had no counterparts in the template set. It is nonetheless inconvenient to have to edit the template set directly to produce a result in a particular key frame. In preferred embodiments, therefore, the apparatus is arranged to allow a user to add further control points to a key frame, exactly in the manner described for the template frame, but upon his doing so CPU 110 is arranged to add a corresponding point to the template frame table. The template frame table therefore always comprises a super set of the points held in each key frame.

Interpolation between frames, and adding of frames of different timelines to produce composite frames, is still possible even if one frame includes extra curve control points or curves.

The operations of interpolating between the frames and adding to frames both require a one-to-one correspondence between curve control points. Thus, to perform either of these operations, a first step is to make the two frames compatible by equalising the number of points to be interpolated between or to be added together. To illustrate the manner in which this is achieved, reference is made to FIGS. 28 and 29.

Figure 28A:
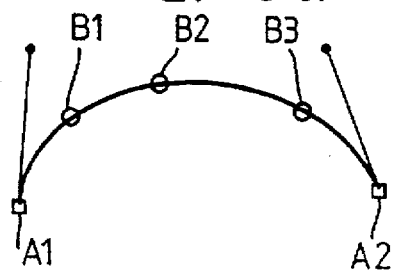
FIG. 28a–d show an embodiments of the present invention, and show schematically the effects on the monitor 160 of converting between a point on a curve and a curve control point.

In FIG. 28a, a curve is shown as it would appear in the frame display area 160b. The shape of the curve is defined by two control points A1, A2, at which the corresponding curve tangents are indicated. Three attribute control points B1, B2, B3 are shown on the curve segment between the two curve control points A1, A2. FIG. 29 shows the corresponding curve table 2100 stored within the working memory 121. The table includes two curve control point records, first corresponding to A1, and pointing to the next record corresponding to A2. The curve control point record corresponding to A1 also points to the list of attribute control point records, the first of which corresponds to B1, which in turn points to that corresponding to B2, which likewise points to that corresponding to B3.

Figure 28B:
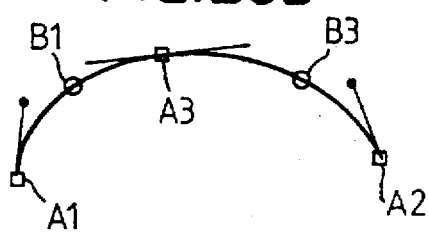
Figure 28C:
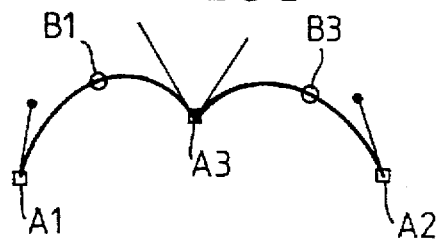

Referring to FIG. 28b, upon the user generating a control signal indicating that a selected attribute control point B2 is to be converted into a curvature control point located at the same position on the curve, the CPU 110 creates a new curve control point record A3 within the curve table 2100. The record corresponding to the point A1 is altered to point to the new record, which in turn points to A2. The attribute control point record corresponding to B2 is deleted from the attribute control point list. The control point data stored for the new control point A3 corresponds to the position at the curve previously occupied by the attribute control point, and tangent extents such that the tangent slope at the new control point is the same as it had been at the attribute control point B2. The lengths of the tangents at three curvature control points A1, A2, A3 are calculated so as to keep the shape of the curve unchanged; it will be observed from FIG. 28b that the length, but not the angles, of the tangent set control points A1 and A2 have altered. Accordingly, new extent point data is written to the records corresponding to A1 and A2 by the CPU 110.

The attribute control point B3 is deleted from the list of the curvature control point record for A1, and added to that for A2.

The position data defining the positions along the curve of the attribute control points B1, B3 are recalculated within the curve segments from A1–A3 and A3–A2, and the new data are stored with the attribute control point records B1, B3.

Having created a new curvature control point A3, the user may employ the apparatus according to this embodiment to amend the curve shape by altering the control point data as described above; in particular, as shown in FIG. 28c, points of inflection may be introduced by setting the tangent extent points to define different tangent angles.

Figure 28D:
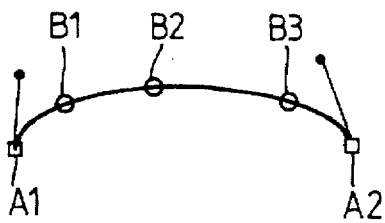
Figure 29A:
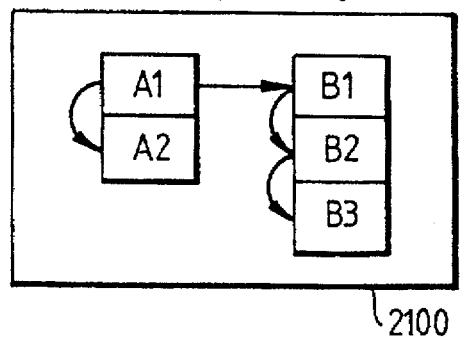
FIGS. 29a–d show and embodiment of the present invention, and show corresponding amendments to the contents of the memory 121.
Figure 29B:
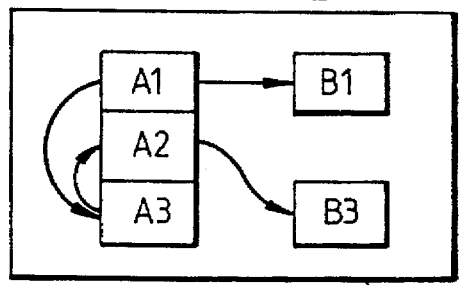
Figure 29C:
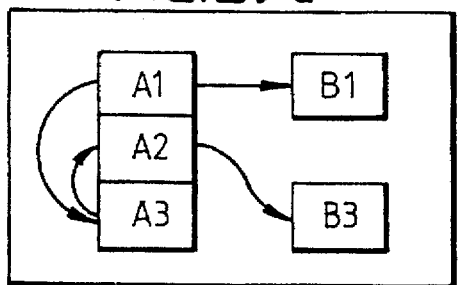
Figure 29D:
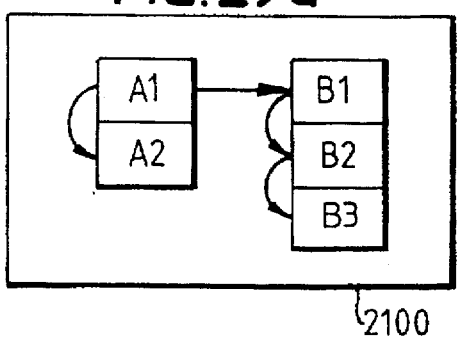

Referring to FIG. 28d, the apparatus of this embodiment is arranged also to convert a control point into an attribute control point if desired; in this case, the control point record A3 is deleted and the pointer stored with the record for A1 is amended to point to the record for A2. A new attribute control point record for new attribute control point B2 is created. The attribute point records for B2 and B3 are added to the list held for the curvature control point record for A1. The curve is recalculated by the CPU 110, and the position data for the three attribute control points are amended.

Figure 30:
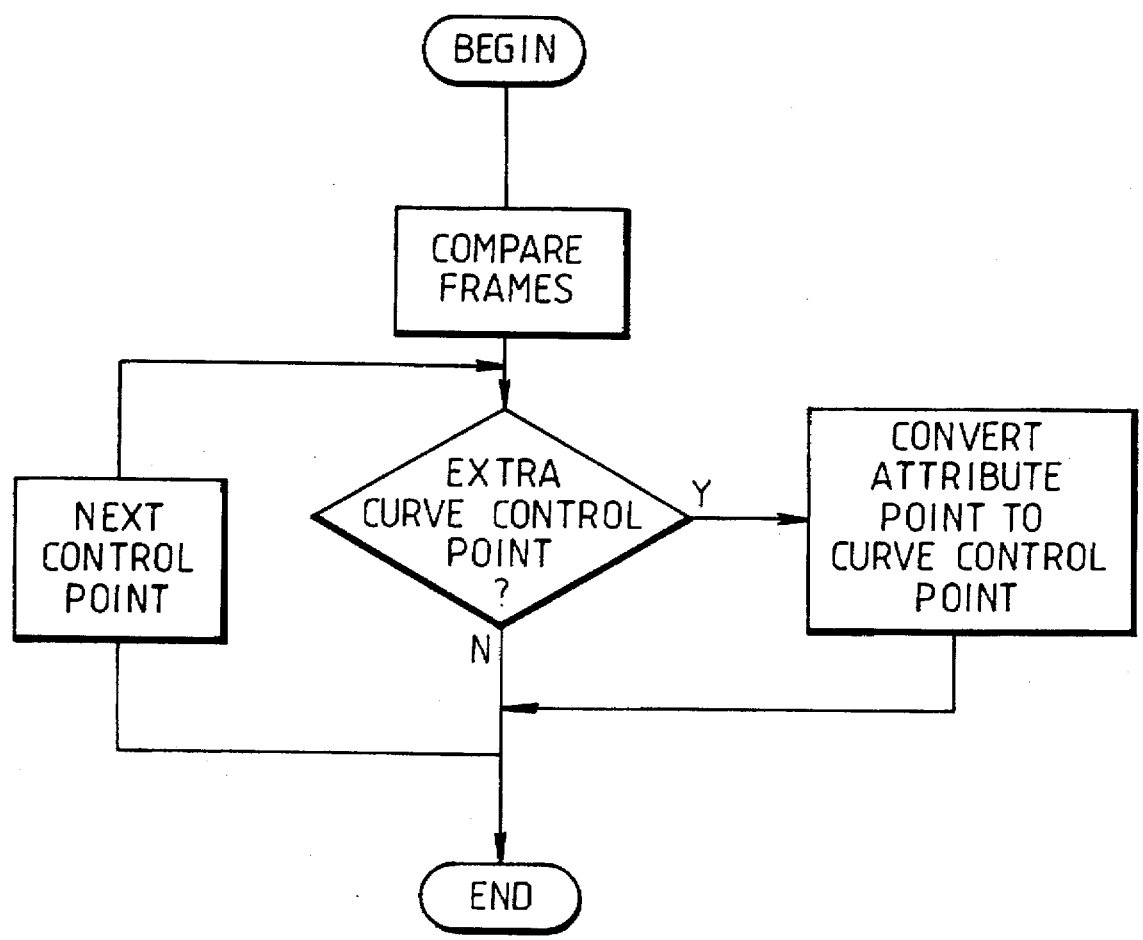
FIG. 30 shows an embodiment of the present invention, and show schematically a method of preparing frames for interpolation or addition.

Key frames in this embodiment of the invention are permitted to include more curvature control points than does the template frame from which they are derived, where a corresponding attribute control point exists in the template frame. Thus, when two frames are to be added or interpolated between, one may include curvature control points not present in the other, but the other will include a corresponding attribute control point, since it is derived from the same template. Referring to FIG. 30, the CPU 110 is therefore arranged, when a curvature control point not having a corresponding curvature control point in another frame is located, to locate the corresponding attribute control point in the other frame and convert that point into a curvature control point as discussed above with reference to FIGS. 28a and 28b and FIGS. 29a and 29b. The two frames will then be in correspondence, and may be added or interpolated between as discussed above.

ADDING FRAMES FROM PARALLEL TIMELINES

As stated above, one advantage of the preferred embodiments is that different parts of an object may be animated separately and the separate sub-sequences (timelines) can be amalgamated together. This is possible because all frames of the different timelines have the same topology, or are all the sub-set of a common template table. The operation of adding frames is similar to that of interpolation, as discussed below, except that whereas in interpolation predetermined proportions of a pair of frames are added, in addition it is generally (although not necessarily) the case that equal proportions of each frame are added.

Essentially, the CPU 110 locates a pair (or, in general, a plurality) of frames of different timelines occurring at the same point in time, and derives a composite frame by taking, for each curve control point of the composite frame, the corresponding curve control points in each of the existing frames. From the coordinates of these, the coordinates of the corresponding point of the template frame is subtracted so as to generate difference coordinates, defining the difference between the control point coordinates of the key frames, and the coordinates of the corresponding points of the template frame to which they correspond.

The difference coordinates for a corresponding control point in each frame are then added together to form summed difference coordinates for that control point of the composite frame, to which the absolute coordinates of the corresponding control point in the template frame table are added to derive the composite control point coordinates.

Thus, each composite control point corresponds to the sum of the corresponding template control point coordinates, and the vector sum of the differences between the corresponding control points of time aligned frames of different timelines and the template.

More generally, it is possible to form the sum of the vector differences weighted by predetermined constants, so that the composite frame depends more upon the frame from one timeline than from another. Equally, the arithmetic can of course be rearranged so that the coordinates of the frames of the timeline are added together first and then predetermined multiples of the template coordinates are subtracted from the sum.

In this way, a composite sequence of frames which correspond to the sums of the deviations from the template of the different timeline of sequence can be formed.

Figure 31:
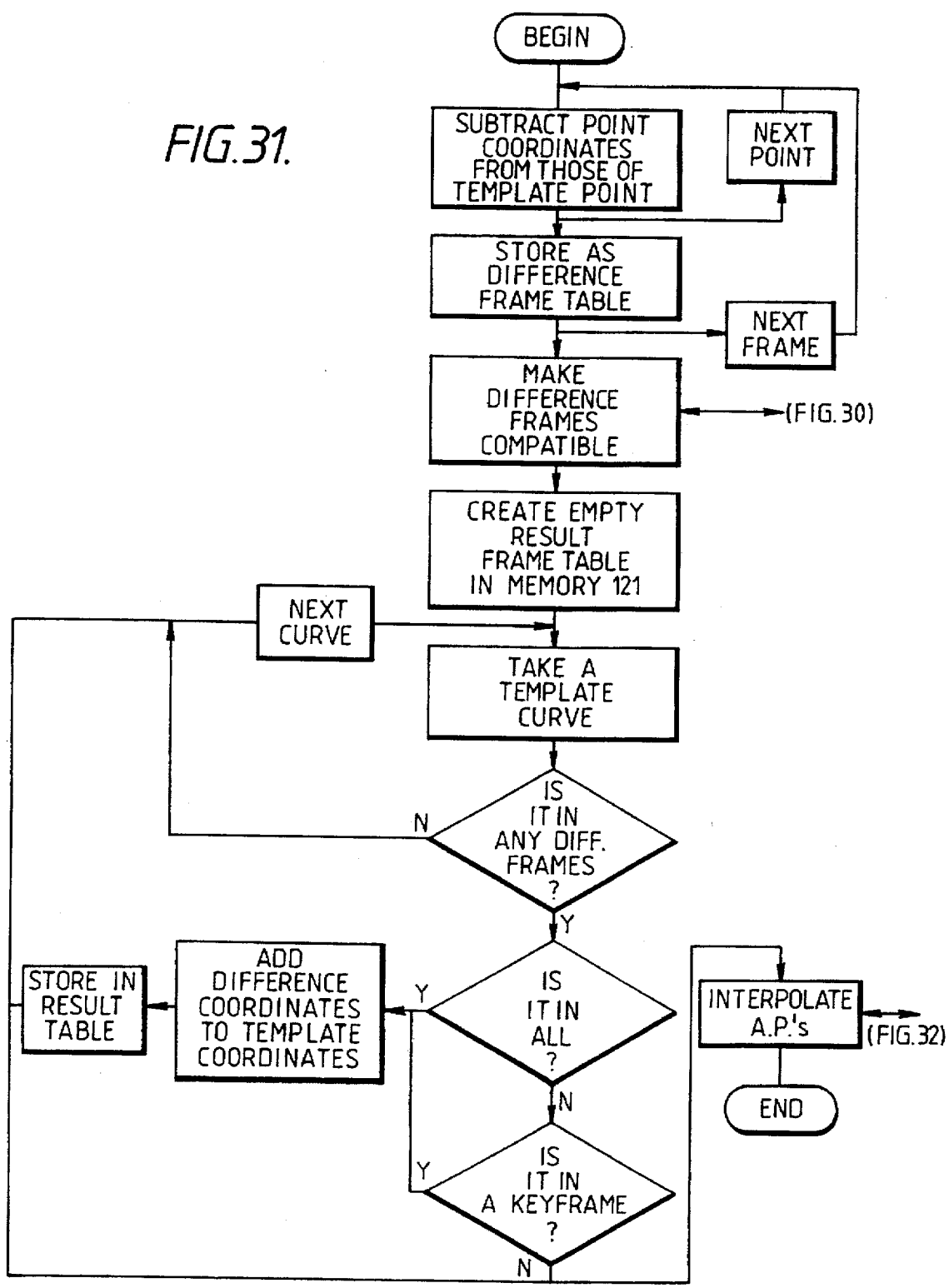
FIG. 31 shows an embodiment of the present invention, and shows schematically a method of adding frames together to produce a composite frame.

Referring to FIG. 31, one way of adding a plurality of frames is as follows. The CPU 110 creates a new frame table hereafter termed a difference table temporarily within the memory 121 for each frame which is to be added. The coordinates of each curve control point of each frame are subtracted from those of the corresponding point stored in the template table, and the difference in coordinates are stored in the difference frame table corresponding to that frame. When difference tables have been set up for all frames to be added, the difference tables are made mutually compatible according to the process of FIG. 30.

The CPU 110 then creates a result frame table in the memory 110. It then reads the template table, and for each curve record, checks whether that curve record is present in any of the difference frames. If the corresponding curve exists in no difference frames, the CPU 110 proceeds to the next curve in the template table. If the corresponding curve exists in all difference frames, for each curve control point in the sequence, the sum of the difference coordinates for the corresponding control points in the difference tables is taken and the result is added to the coordinates of the corresponding point in the template table and stored in the result table. The next curve in the template table is then processed.

If a curve is not in all the frames to be added, the CPU 110 tests whether any of the frames to be added are key frames and, if so, whether the curve in question is in a key frame. If so, the sum of the difference coordinates for the frames in which the curve is present is taken and added to the template coordinates as before. If not, in other words if the curve is present only in an interpolated frame or frames, the curve is omitted from the result frame table.

Figure 32:
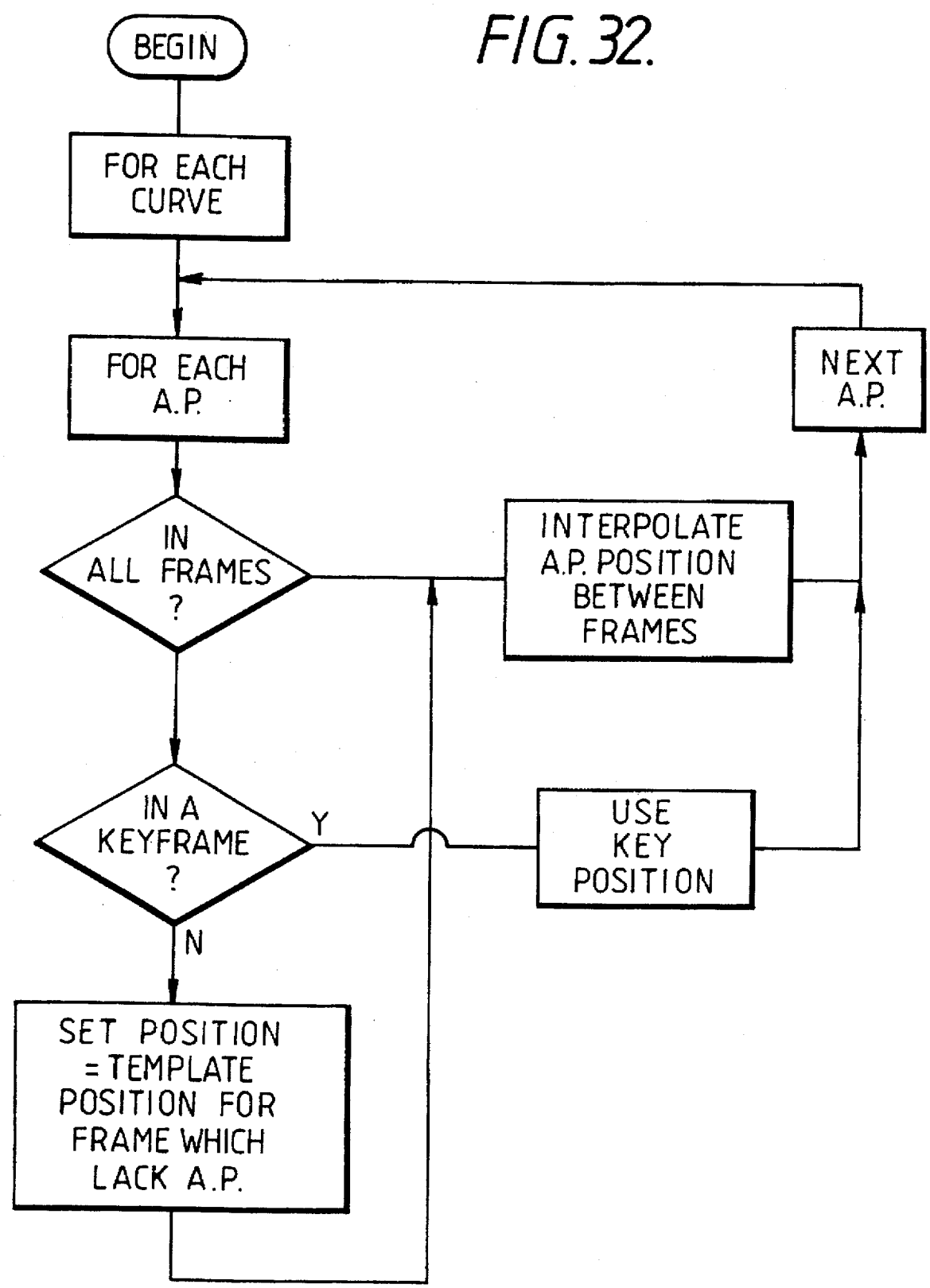
FIG. 32 shows an embodiment of the present invention, and show schematically a method of deriving curve point positions in interpolated or added frames.
Figure 33:
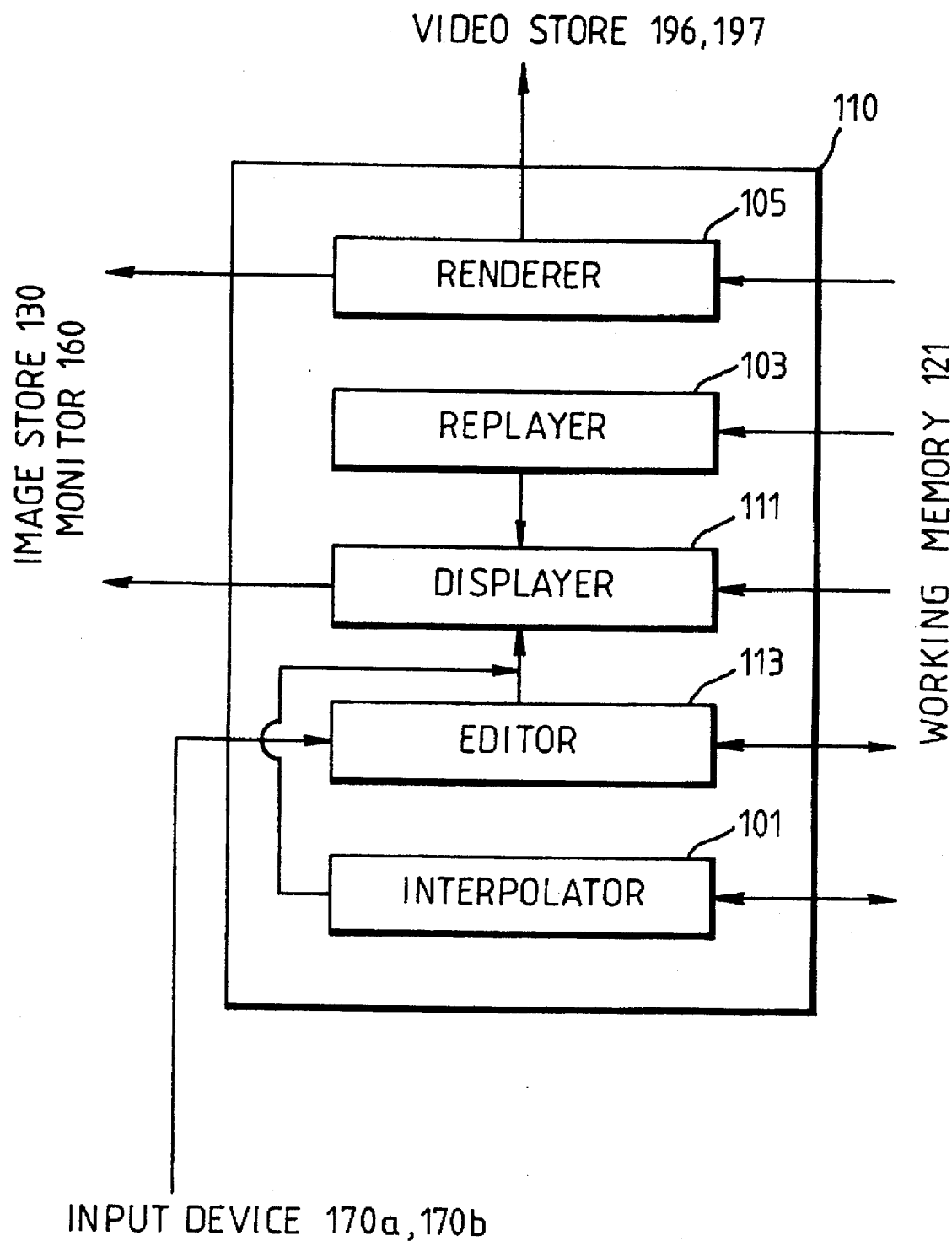
FIG. 33 shows illustratively the functional elements of the invention, provided in this embodiment by a single processor.

Once the CPU 110 has considered all the curves in the template table, the result frame table will include all the curve control points necessary. At this stage, the CPU 110 derives the positions of any attribute points, as shown in FIG. 32, by taking in turn each curve in the results frame table and considering each attribute point in turn. If an attribute point occurs on all the curves to be added, the CPU 110 derives averaged or interpolated values for the attribute point position parameter and, optionally, for any attribute data which may be stored in the attribute point records. The interpolated values (e.g. the average values) are then stored in the results table.

If an attribute point is not present in all the frames to be added, then unless one of the frames in which it occurs is a key frame, the CPU 110 allocates a value equal to the position value in the template for each frame in which the attribute point is absent and interpolates a new position between all frame values as above.

Preferably, the interpolation of the attribute point position is not simply an interpolation between the two parametric position data values in the corresponding pair of frames interpolated between, but is derived by deriving the length of the corresponding curve segment in the interpolated frame, and the actual curve segment length is divided into the required interpolation ratio, the corresponding position on the curve is found, and the corresponding value of the parameter t at that position is derived and stored as the interpolated attribute point position.

If the attribute point is present in a key frame, the key frame attribute point position data is stored in the results table as this is relatively more significant than the position derived from an interpolated frame.

As mentioned above, preferably, for each sequence, a current composite sequence comprising a set of frame tables is maintained together with a corresponding base sequence corresponding a further set of frame tables, the base sequence comprising the composite sum as discussed above of all timelines other than at presently being displayed for editing. After the current timeline has been edited, it is thus merely added to the current basic composite sequence to generate a new composite sequence, thus reducing the amount of computation necessary.

The operations of interpolation and addition will be seen to be closely similar; although in the above described embodiments, for clarity, interpolation between frames and addition of frame differences from the template are described, it is possible on the one hand to interpolate using frame differences (adding the result to the template frame coordinates) and on the other hand to add frames (subtracting the template coordinates or a multiple thereof afterwards); in practice, for convenience, the memory 121 may contain either frame tables stored as absolute point coordinates or frame tables stored as coordinates defining the difference from the corresponding coordinates in the template table. The processes described in FIGS. 30–32 are equally applicable, and are preferably applied, to interpolation, mutatis mutandis.

Replayer 103

The replayer 103 in one embodiment of the invention is provided by the CPU 110 operating under suitable stored program control.

In one embodiment, the replayer is arranged to display the frames at a rate corresponding to the frame repetition rate (24, 25 or 30 Hz) at which the sequence is to be displayed, so that the operator can view the sequence at a realistic rate. Preferably, however, the replayer 103 is arranged also to accept input commands from the keyboard or other input device specifying the speed of replay. This is particularly useful in enabling an operator to view crucial parts of the sequence in slow motion, or to move quickly through a sequence for cursory inspection.

In another preferred embodiment, the replayer 103 is arranged to accept input signals (from the keyboard 170b or more preferably, the position sensitive input device 170a in cooperation with the timeline display) to specify an initial and/or a final frame in the sequence between which the sequence is to be replayed. An operator can thereby designate a particular part of the sequence to be replayed, and the replayer 103 will display in turn each frame between the initial and end frames. It is particularly convenient if the replayer 103 is arranged to constantly cycle between the start and finish frames; this may either be by displaying the sequence repeatedly from the first frame to the last frame, or by displaying the sequence forwardly (from start to finish) and then backwardly (from last to first) repeatedly. This is found particularly useful in enabling the operator to localise a particular frame or series of frames which are incorrect, for subsequent editing.

If the CPU 110 operates sufficiently fast, it would be possible for the replayer 113 to be arranged to access the memory 120, and to cause the display generator 111 to access in turn each frame table 122 corresponding to each frame of a sequence between the first and last frames specified. However, many CPU's available at present are incapable of generating entire frames of data in real time; thus, the replayer 103 is arranged instead to perform an initial operation of creating, for each frame to be displayed, a raster image by causing the display generator 111 to access in turn each frame table 122 and generate an image in the image store 130, and after each image is created the replayer 103 is arranged to cause the image to be stored on the mass storage device (e.g. hard disk) 180. In this context, a computer which includes image compression means for compression encoding the image for storage on hard disk is preferred, since otherwise the volume of image data stored corresponding to the frames of even a relatively short sequence is extremely large. Once image data or a plurality of frames has been stored on the mass storage device 180, the replayer 103 is arranged to display the sequence by accessing the image data corresponding to each frame in turn to refresh the image store 130 at the desired frame repetition rate. Once the operator signals a desire to cease replaying, the image data files corresponding to the frames in the replayed sequence may be deleted from the mass storage device 180, to reduce the memory used.

In a preferred embodiment, the replayer 103 is also arranged during the initial phase of preparing the sequence of images to cause the renderer 105 to render each frame as discussed below, so that the replayed sequence can be seen in colour and/or against the background.

Having viewed the replayed sequence or part thereof, it will often be desired to edit the sequence and in this case, the operator instructs the CPU 110 to cease replaying and commence editing.

Renderer 105

The renderer 105 may again comprise the CPU 110 operating under stored program control, or may be provided by different computer 100. In either case, the operation of the renderer, as is conventional, is to colour the image and/or to mix the picture with a background picture. The renderer 105 therefore reads the data stored in a table 122 corresponding to a frame to be rendered, and processes the frame in accordance with predetermined stored colour and/or background information. In particular, the attribute control points stored, as described above, may include colour and other attribute information (for example transparency), the manner of rendering which is described in our above referenced copending application Ser. No. 08/311,398.

Modifications and Other Embodiments

In the foregoing, it will be noted that attribute control points are employed for several purposes; firstly, to set the values of attributes which will subsequently be used during rendering, so that a considerable amount of rendering information need be specified only for individual key frames and is automatically inserted into frames interpolated therebetween at correct positions; secondly, as a means for providing the possibility of extra curve control points, to increase the complexity where necessary without doing so otherwise, whilst maintaining topological similarity between the frames.

However, apparatus allowing the definition of lines in terms of a limited number of control points controlling the path of the lines and also allowing the specification of attribute or feature properties at predetermined points along the lines, may be useful for other purposes; for instance, as described in our above referenced U.S. Pat. No. 5,611,036 such points may mark the points at which further curves or structures of curves are to be connected to a line, which is particularly useful in heirarchical definition of objects, useful in two or three-dimensional animation. Other applications are likewise not precluded. Likewise, attribute values need not be set at separate points to those used to define curvature, but may be provided at curvature control points; although it is very much preferred to provide the flexibility to define attributes at points along the curve segment as well.

Matte Sequences

One particular other application of the invention in one aspect comprises its use to provide a system for automated production of a sequence of image masks or mattes used in the compositing or combining of images in film, video or similar visual productions. Image compositing is combining two or more images, which is usually performed by defining masks or mattes which specify which parts of the various images are to be retained in a final sequence. For example, one common use of the technique is to take a character from one sequence of images and superimpose the character on another sequence of images in place of the existing picture. A matte or mask in traditional film production is a stencil through which parts of an image are visible; in electronic image processing, the matte or mask is a transparency map which assigns transparency values to parts of the image to determine which are visible when the image is composited with others.

In film and television production, sequences are combined together using a technique known as "chromakey", in which live characters are videotaped against a blue background, the characters not incorporating blue, so that in subsequent video processing, blue portions of the image are ignored and a different background is substituted. A similar technique, incorporating optical filters, is used for film production. The blue portion of the image creates the mask through which the character is visible.

However, there are many situations where the parts of the image to be selected cannot be simply distinguished on the basis of a colour difference. In these cases, an operator or artist must hand draw a corresponding mask frame for each frame of the sequence, by drawing an outline around the part of the image to be separated. In traditional film production, for each frame of the sequence that requires a matte or mask, the artist projects the frame onto a clear background on which the required mask is drawn. It is also known to provide electronic systems in which the artist creates the appropriate matte or mask by using a stylus and digitising tablet to create a line drawing around parts of each image.

However, in either case, the artist has to create a separate mask for each frame. This is time consuming. Further, because each frame is created completely independently, any inaccuracies or differences introduced by the artist are manifested as a highly visible phenomenon known as "jitter" or "boil", a motion or busyness on the edges of the image. Further, in electronic systems, the matte is created on a pixel by pixel basis, and so the higher the image resolution, the more work which must be performed by both the artist and the electronic image processing apparatus in creating an accurate matte.

Accordingly, the present invention provides in one aspect a system for compositing sequences, in which the portions of a sequence to be composited are defined at frames spaced apart in time (key frames) and those for intervening frames are interpolated therebetween. This reduces the amount of work to be performed by the artist, and guarantees that the edges of successive frames, since interpolated, will not include the random jitter associated with current techniques. Very preferably, the mattes are created as line drawings using, as in the above described embodiments, a limited number of control points to create and edit smooth curves;

this provides practical and efficient interpolation and, further, provides reduced dependence upon image resolution.

Further, by employing attribute control points as described above and in our copending above referenced U.S. Pat. No. 5,611,036 to control the transparency of the matte, it is possible to smoothly vary the transparency of the matte in time, or along the matte, or both. This provides a vastly increased flexibility and sophistication in specifying the properties of the matte and hence in controlling the image compositing. Again, the use of interpolation over time makes changes in the matte over time appear smooth and without temporal irregularity.

The mattes created in this way therefore comprise a sequence of electronic images including outline drawings surrounding portions of the image to be separated, with attribute data specifying the transparency associated with those portions. These matte images may be separately printed for subsequent optical combining, or may be employed directly, electronically, by providing that the image buffer 130 is of the type including a transparency plane and three colour planes, and by multiplying each pixel of the frame with which the matte is associated with the corresponding transparency value of the matte, and each pixel at the frame with which it is to be combined by the inverse of that transparency value, for example.

More particularly, where each pixel of each image comprises a red value (R plane), a blue value (B plane), and a green value (G plane), the process of compositing the two comprises multiplying each of the R, G and B pixel values of a first image by the transparency values of the corresponding pixels of the matte image, and multiplying each of the R, G and B values of the second image by unity less the transparency values of the corresponding pixels of the matte.

Next, each colour value of each pixel in the image buffer is set equal to:

$$C = C_1 + (1 - A_1)C_2$$

Where $A_1$ is the transparency value (derived from the matte at that pixel) and $C_1, C_2$ are the colour values multiplied by the transparency values as described above. If each pixel in the final image is required to have a transparency value, then this too can be derived from the transparency values of the original images added in a proportion determined by the transparency value of the matte at each point.

Still Image Composition

Exactly the same principles may be used to create masks for compositing together still images, with the advantages of increased flexibility and reduced dependence upon resolution. Still image compositing finds application in, for example, electronic illustration systems, desktop publishing systems, illustration and design systems generally, business presentation graphics, audio visual systems and the like.

Automated Reprocessing of Film and Video Images

Film and video sequences often include blemishes, or other flaws, or occasional images or sequences of images which are unsatisfactory for some reason. It has long been known to repaint, by hand, parts of such images to repair such blemishes. Further, there has recently been interest in adding colour to images filmed originally in black and white.

It is also known to apply electronic graphics apparatus to this process, to electronically provide a coloured image on a pixel by pixel basis.

According to another aspect of the present invention, the rendering and painting techniques described in our above referenced copending U.S. Pat. No. 5,611,036 are employed to paint parts or the whole of an image, by displaying the image on a screen, and creating an overlying painted image which is merged with the underlying image to add colour by specifying colour values at spaced apart attribute control points. If it is desired to colour or retouch the sequence of image frames, this process is employed to specify the colour at key frames and the above described embodiments are employed to generate interpolated frames between the key frames.

THREE DIMENSIONAL MODELLING

Although the invention has thus far been described with reference to animation of two-dimensional objects, the general principles of the invention are applicable equally to animation of three-dimensional subjects or objects represented, similarly, by parametric control points. In particular, the invention may also be adapted to cooperate with a three-dimensional interpolation and animation system. In this case, all key frames are provided as two-dimensional projections of three-dimensional models, and no two-dimensional template is employed; instead, a three-dimensional template equivalent is maintained by the three-dimensional system, but all two-dimensional projections correspond one to another as all are derived therefrom.

GENERAL DESCRIPTION OF APPARATUS

The apparatus employed for three dimensional posing, editing and animation may be realised using the elements of FIG. 3. Particularly preferably, the apparatus shown in FIGS. 3–5 provides both two dimensional animation as described above and three dimensional character modelling, different stored routines being executable to perform each function, and the computer 100 or each workstation 100a–c being arranged to enable an operator to leave one routine temporarily retaining all current data, and call another.

The format of data defining two dimensional projections produced by the three dimensional modelling routine is preferably compatible with that of FIG. 14, so that each routine can read file tables prepared using the other and held in memory 120 or mass storage 180.

The rendering routine described in our copending above referenced U.S. Pat. No. 5,611,036 is preferably also present as a further routine using compatible curve data files.

Figure 34:
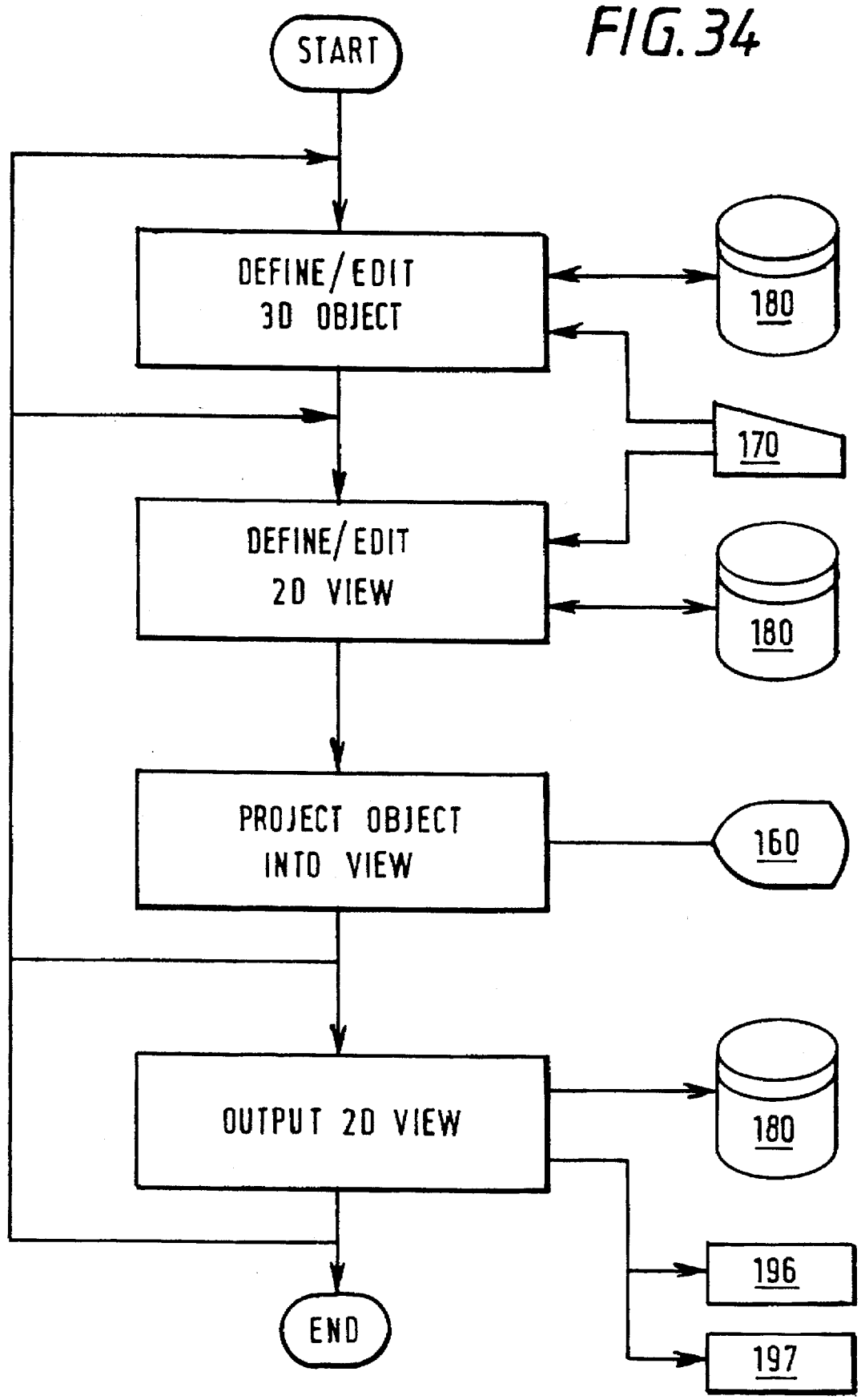
FIG. 34 is a flow diagram showing schematically the sequence of operations undertaken by a user of the apparatus of second aspects of the invention.

The general flow of operation of 3D modelling is shown schematically in FIG. 34. Data defining a three dimensional object is initially input; for example, by reading stored data from a mass storage device 180 or input device 170. The data defining the three dimensional object represents the object in space, in a way which is independent of the view from which the object is seen.

Data defining a particular view from which it is desired to see the object is then defined; typically input via an input device 170, or calculated with reference to data defining a moving view.

Finally, the three dimensional object coordinates are projected into the plane of the particular desired two dimensional view (which corresponds to the plane of the output device or monitor 160 on to which the view would eventually be output or displayed). The result is visible to the operator, who may then amend either the three dimensional object (shape or position) or the two dimensional view direction or plane. When the desired projection is achieved, the projection is either printed or stored on mass storage device 180 or film or video recorder 196, 197.

Figure 35:
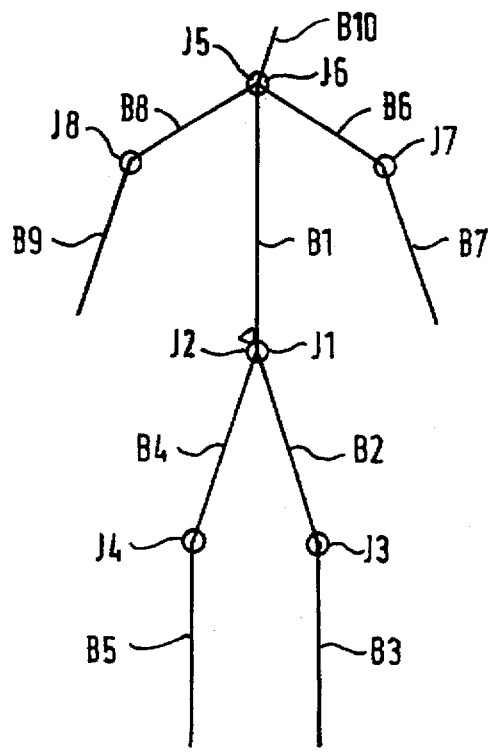
FIG. 35 shows an embodiment of the present invention, and shows schematically a three dimensional model employed in the second aspect.

Referring to FIG. 35, the manner in which a three dimensional object (e.g. a cartoon character) is defined will now be explained. FIG. 35 shows a skeletal figure. The figure comprises a plurality of bones B1–B10. The bones are interconnected at joints J1–J8. For a human figure, many joints are ball and socket joints, which can be freely pivoted in two axes, and rotated about their own axis, as shown in FIG. 36.

Figure 36:
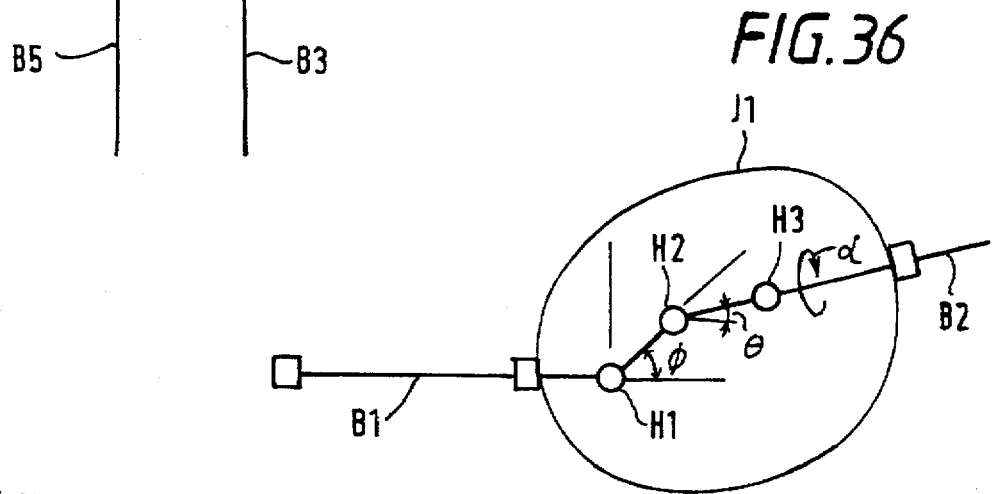
FIG. 36 shows an embodiment of the present invention, and explains diagramatically a joint in the model of FIG. 35.
Figure 37:
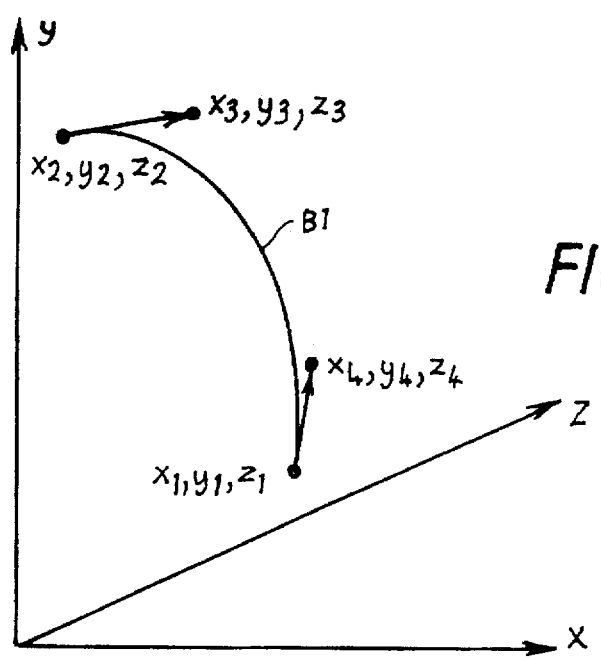
FIG. 37 shows an embodiment of the present invention, and shows in greater detail the data describing a segment of the model.

In the preferred embodiment, the invention also provides this flexibility at each joint, by permitting each joint to be defined by three independent rotation data shown as hinges H1–H3 in FIG. 36. A similar system for a description of three dimensional articulated figures is disclosed in "Computational Modeling for the Computer Animation of Legged Figures", Computer Graphics 19, No. 3, 1985, Girard and Maciejewski. Additionally, to give flexibility to the animator in designing and manipulating a character or object, each bone B1–B10 is not defined by a straight line (as in U.S. Pat. No. 3,600,619, for example) but is defined by a three dimensional parametric curve (e.g. a cubic spline), preferably a three dimensional Bezier curve. Accordingly, each bone is defined by a pair of (three dimensional) end point coordinates and a pair of (three dimensional) corresponding tangent end point coordinates, as shown in FIG. 37. The three dimensional path followed by the bone B1 can be reconstructed in straightforward manner from the coordinates of the two end points and tangent end points. In FIG. 35, a human skeleton was used for an example, and in many cases a cartoon object to be animated will in fact be a human, humanoid or animal figure, in which the articulation is defined in principle by bones. However, this aspect of the invention is applicable to three dimensional modelling and animation of other objects and consequently, in the following, the term "armature" will be used to encompass bones.

Figure 38:
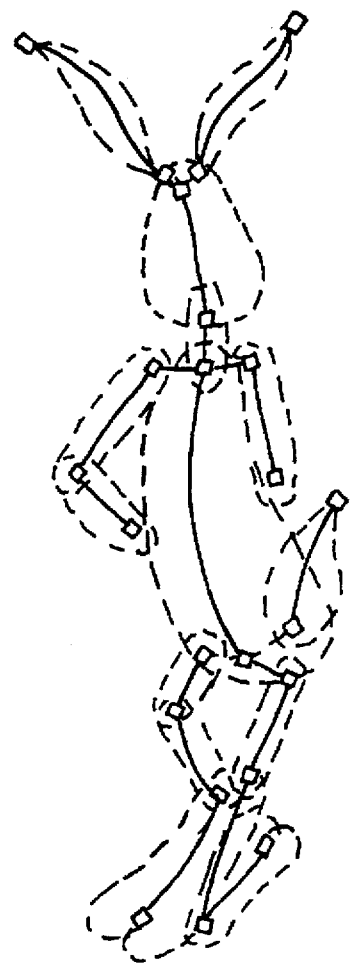
FIG. 38 shows an embodiment of the present invention, and shows diagramatically how an envelope is provided about the skeletal model of FIG. 35.

Referring to FIG. 38, the shape of a complex humanoid figure can be represented (and corresponds in principle) to a series of armatures (shown as solid lines) joined at joints about which they may be articulated, surrounded by a three dimensional envelope (shown, in outline, as dashed lines). The shape of the envelope is fixed in three dimensions, but its outline naturally varies as the object is seen from different view points. Although there is no absolute division of the envelope at the joints, it will be seen that in fact the portion of the envelope surrounding each armatural bone is relatively separate and divisible from its neighbours.

Accordingly, in the present invention, we provide data defining the envelope by providing data defining one or more envelope components for each bone (typically one component of the envelope per bone or armature).

Figure 39A:
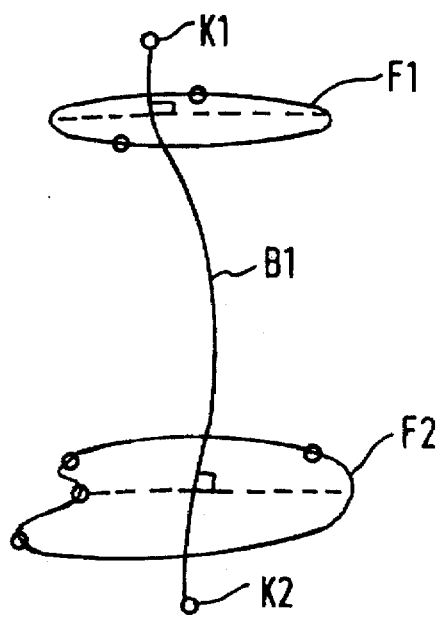
FIG. 39a shows an embodiment of the present invention, and shows diagramatically the manner in which a component of the envelope of FIG. 38 is represented by sections.
Figure 39B:
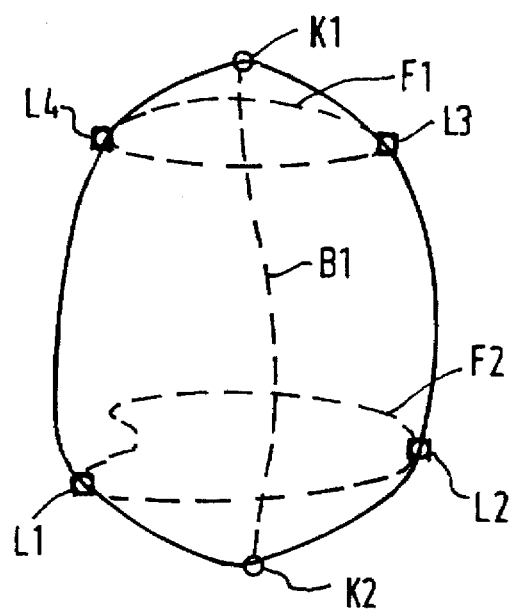

Referring to FIGS. 39a and 39b, each envelope component is represented by data defining one or more cross sections F1, F2 through the component at a predetermined angle (e.g. normal) to the armature B1. Conveniently, the components may also be defined by end points K1, K2 located along the bone; these could be, but are usually not, at the curve control points defining the ends of the armature B1.

To derive the outline of a component of a three dimensional object, according to the invention, the cross sections are first projected into the desired two dimensional reference view and then the lateral extremity points L1–L4 of the projected sections are linked by a smooth curve passing also through the end points K1, K2.

The two dimensional outline, from a given desired view point, of a figure shown in FIG. 39a can therefore be derived by projecting each of the components, and drawing the outline curve around each.

Preferably, the cross sections F1, F2 are represented by a (typically) two dimensional curve defining the perimeter of the cross section; it is particularly advantageous to store and manipulate this curve by storing two dimensional curve control point data defining, as described above in detail, control points for the curve and, typically, tangent end points defining the tangents thereat. This is advantageous in that cartoon animations generally conventionally employ smooth, rounded tubular characters or other objects; the cubic spline representation enables complex but smooth curves readily to be manipulated, independently of image resolution and with storage and manipulation of a relatively small number of data.

The two dimensional control points defining each cross section perimeter curve are calculated and stored in a plane normal to the armature, as positional coordinates relative to the armature. Thus, referring to FIGS. 40a and 40b, if the shape or disposition of an armature B1 is changed (for example, as shown by changing the tangent end points to increase the curvature) the cross sections are retained located at the same position along the armature, and normal to the armature, without requiring recalculation of the curve control point data defining the cross sections. It is thus possible to distort a cartoon character by bending, stretching or moving without needing to recalculate the three dimensional data relating to its shape.

Having explained the structure by which a three dimensional object is represented, the manner in which the structure is implemented will now be described in greater detail.

Figure 41:
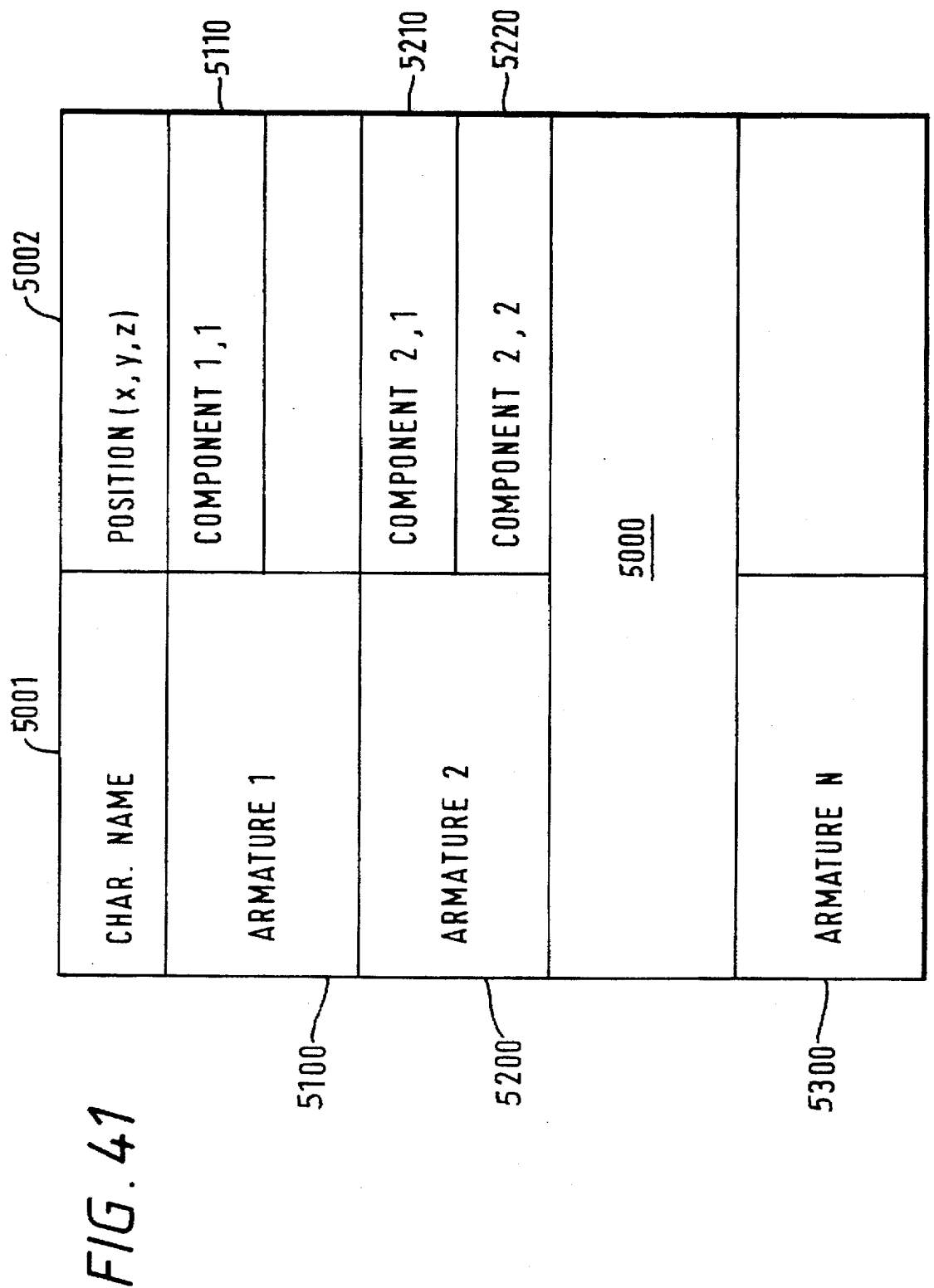
FIG. 41 shows an embodiment of the present invention, and shows schematically a table held in the memory of FIG. 3 to represent the model of FIG. 38.

Referring to FIG. 41, within the working memory 121 is provided a character table 5000 for each object or character to be three dimensionally processed.

The table 5000 includes a field 5001 designating the identity or name of the object or character, and a field 5002 indicating a three dimensional position within space of the character (for example, as X, Y, Z coordinates). A single reference point on the character is taken to identify its spatial position.

The data held in the table 5000 for each character further includes entries 5100, 5200, 5300 for the armatures defining the arrangement of the character in space about its position, and, in relation to each armature, component data fields 5110, 5210, 5220 holding data defining the envelope component or components surrounding that armature.

Figure 42:
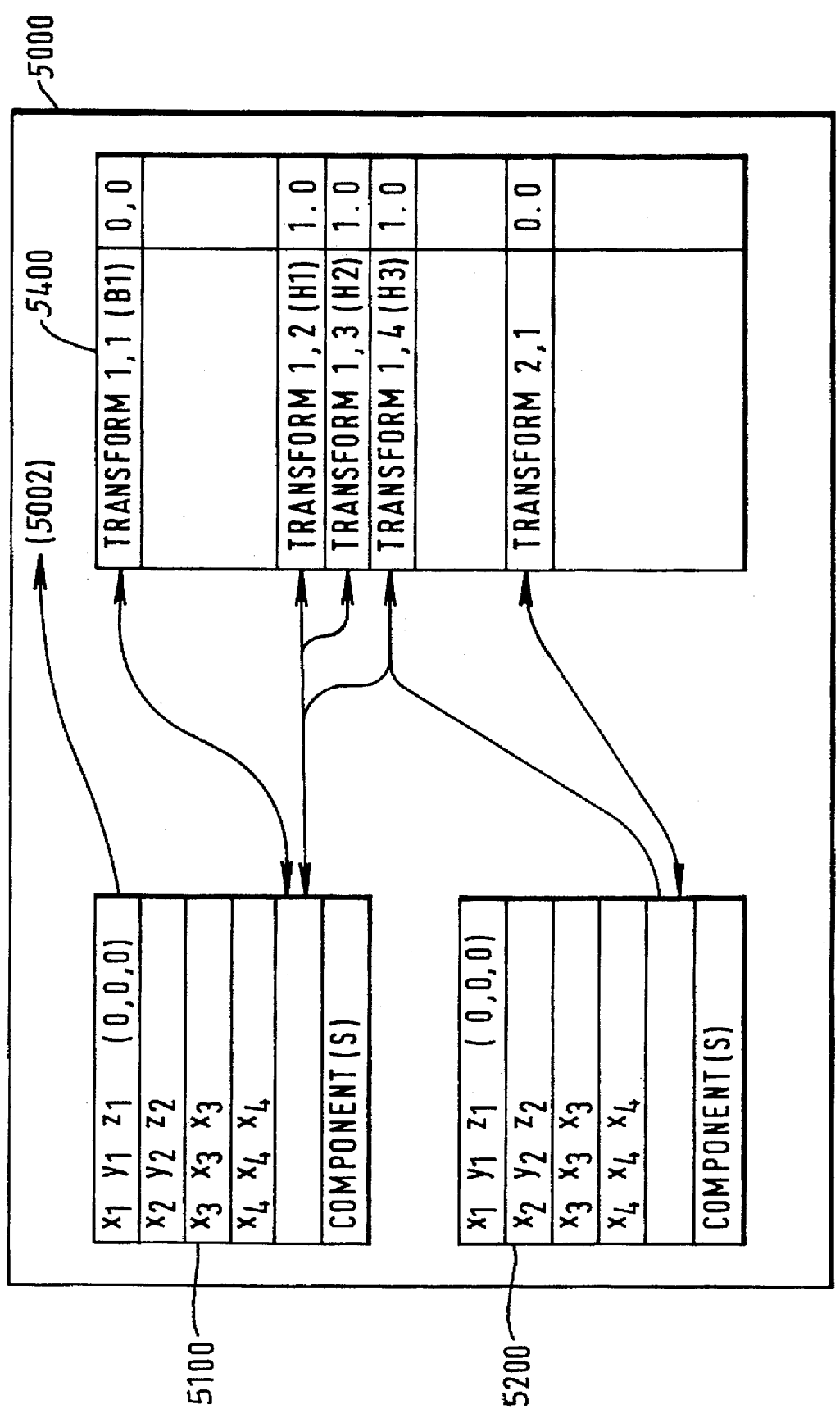
FIG. 42 shows an embodiment of the present invention, and shows in greater detail the contents of the table of FIG. 41.

Referring to FIG. 42, in which greater detail of the table 5000 of FIG. 41 is shown, the data relating to each armature comprises the coordinates of the two curve end points and tangent points (or, if a different spline representation is used, the corresponding curve control data). For ease of manipulation, and reasons which will be discussed later, the coordinates are not defined in the same three dimensional spatial reference frame as those 5002 of the character, but are defined in a space relative to the armature itself; for example, the coordinates of the first end point may be taken as 0,0,0 (and need not be stored) and the direction of the first tangent may be taken as the X axis, so that only one datum need be stored for that tangent.

This has the advantage that, if the position of the character is changed by a user, the data defining each armature need not be recalculated. In fact, this principle is extended by arranging the armatures hierarchically, as will be described below, so that a change in an armature having a higher hierarchical position (for example, one representing a thigh bone) does not require data relating to armatures lower in the hierarchy (for example, representing toe bones) to be amended.

The data defining the disposition of a given armature (rotation and/or translation) relative to the stored position 5002 of the character is therefore not available from the armature control points. Instead, it is held as the coefficients of a three dimensional affine transformation by which points in the armature spatial frame can be converted to points in the common spatial frame in which the character is defined, as will later be discussed.

Referring once more to FIG. 36, in which the curvature control points of two linked armatures B1, B2 are shown as squares, the transformation necessary to transform a point in the coordinates space of the first armature B1 into that of the second armature B2, or vice versa, is defined by the translation and rotation undergone by moving between corresponding control points of those armatures (for example, the left hand square in each). This comprises two elements; the translation from the left hand control point of B1 to the joint J1 at which the two are connected (together with any attendant roation of the tangent axis), and the rotation (in space and about its axis) through the joint J1. As noted above, this rotation is resolvable into three components.

The data defining the transformation between the spatial frames of the joints B1, B2 is represented as 4 separate transformations; a first defining the spatial translation along the armature B1 to the joint J1, and three following, one defining each of three separate rotations shown within the joint J1 as H1, H2, H3. To draw the armature B2, and points defined in the same space, in the space defined for B1, its control points are each multiplied by each of the transformation matrices in turn.

Referring back to FIG. 35, the armature B7 may be drawn in a two dimensional viewing plane by transforming the control points of B7 into the spatial frame of B6, as just described above, and then transforming the points thus calculated into the spatial frame of B1, in exactly the same manner.

Referring once more to FIG. 42, a table 5400 of transformations is maintained within the object table 5000; each entry comprises a set of stored coefficients of a transformation matrix (e.g. 16, 4×4, components), and a parametric position along the armature (usually between the end points, and hence having a normal value between 0 and 1). In the table 5400, there are shown an entry 1,1 for the transformation between the left hand end of the armature B1 in FIG. 36 and the joint J1 therein; the second transformation (1,2) relates to the rotation in a first sense (shown as hinge H1); the third transformation 1,3 describes the rotation in a second sense (shown as hinge H2); and the fourth transformation 1,4 shows the rotation about a third axis (shown as hinge H3).

The record for each armature 5100, 5200 stored in the table 5000 includes reference or pointers to the transforms associated with joints on that armature, and with translations along that armature to each joint. The group of four transformations relating to the joint (the first, which maps the coordinate space of the joint to that of the armature to which it is connected and the further three which define the joint) also have an associated distance value defining the parametric distance along the armature, between its two end points, at which the joint occurs. Thus, for each armature table 5100, the pointer to each group of four transforms in the transformation table 5400 is associated with a parametric distance along the armature of which those transforms occur. Thus, each joint acts as an attribute setting control point along the armature, in exactly the manner described in the two dimensional first aspect above, the attribute being the joining point of the joint and the transformations at the joint. During interpolation operations, described later, the joint position is interpolated in exactly the same manner as attribute control points in the first aspect. Additionally, the records 5100, 5200 for each armature include identification of the immediately preceding transformation; thus, the record 5200 for an armature B2 includes a pointer to the record for the last transformation preceding that armature in the joint J1, and the record 5100 for a first armature includes pointer to the character position field 5002.

Finally, each armature table 5100, 5200 includes a pointer to the component data table 5110 relating to the component(s) on that armature; referring to FIG. 43, each component table 5110 comprises entries 5111, 5112 defining the positions along the armature of the end or peak points K1, K2 shown in FIGS. 39a and 39b, and entries 5113, 5114 . . . 5115 for each of the sections F1, F2 shown in FIGS. 39a and 39b. Each section entry 5113–5115 comprises data representing the position along the curve, relative to the end points thereof, of the section; and position data $(X_1, Y_1; X_2, Y_2)$ of at least one control point on the perimeter curve of the section; and curve control data $(X_{e1}, Y_{e1}, X_{f1}, Y_{f1})$ defining the end points of the two tangents in the plane of the section, associated with the or each such curve control point. All of the coordinates are within the plane of the section itself, and enable the perimeter curve of the section to be drawn.

Finally, if the component information is stored in a separate table 5110 to the armature information 5100, pointer information to the armature with which the component is associated may be provided (5116).

DISPLAYS ON MONITOR 160

As described above with reference to two dimensional interpolation, the manner in which data is presented to the user through the monitor 160, and in which it may be amended by the user, is of considerable importance in enabling the user to use the invention efficiently.

Figure 44:
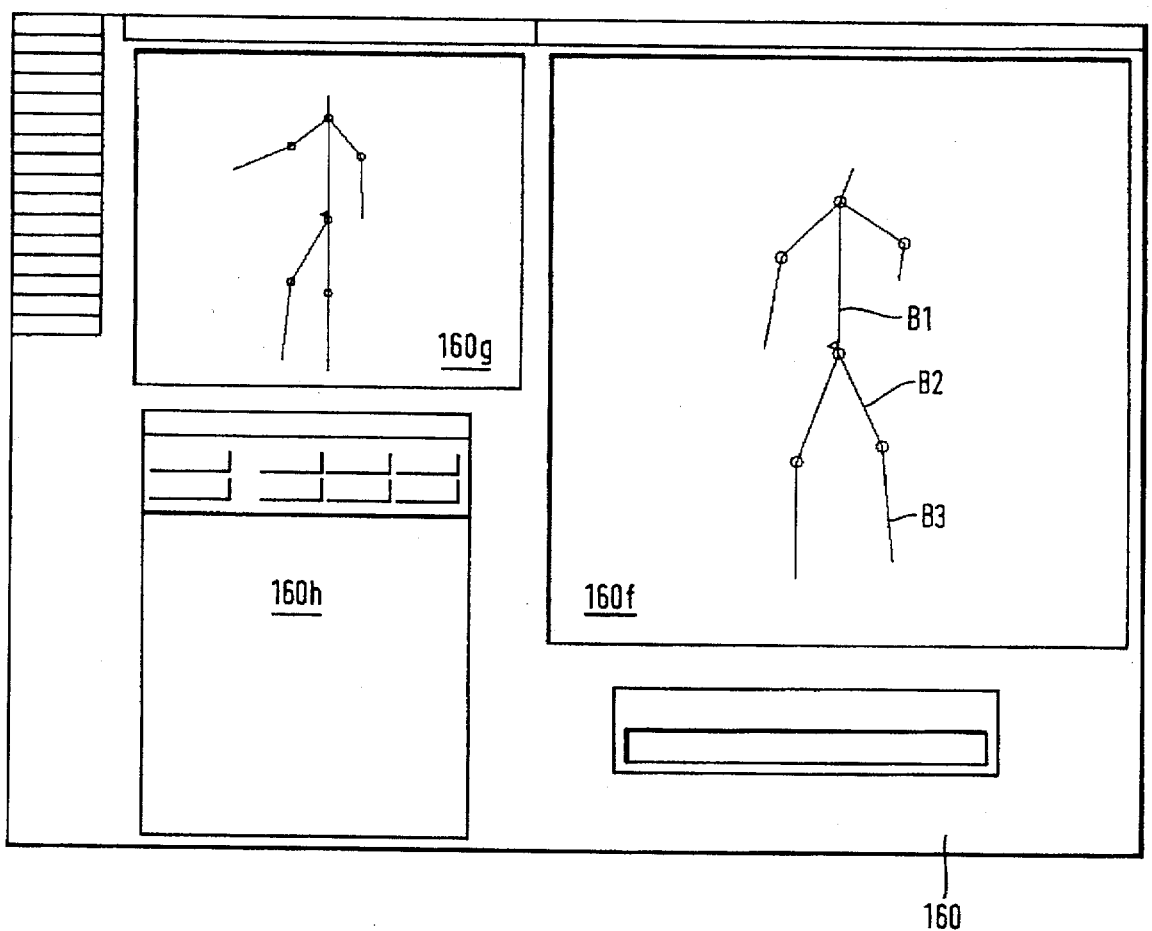
FIG. 44 shows an embodiment of the present invention, and shows the representation on the monitor 160 of the model of FIG. 35.

Referring to FIG. 44, during manipulation of a three dimensional object, the display on the monitor 160 comprises one or more (preferably at least two) projection view areas 160f, 160g showing different projections of the figure from specified viewing directions, which are preferably maintained normal one to another, and a display area 160h in which selected sections are displayable.

In the display areas 160f, 160g, the armatures are shown, in one mode, as lines defined by their curve control points, and the joints are shown as circles.

In the example shown in FIG. 44, the display areas 160f, 160g provide a pair of orthogonal, orthographic projections of an object.

Figure 45:
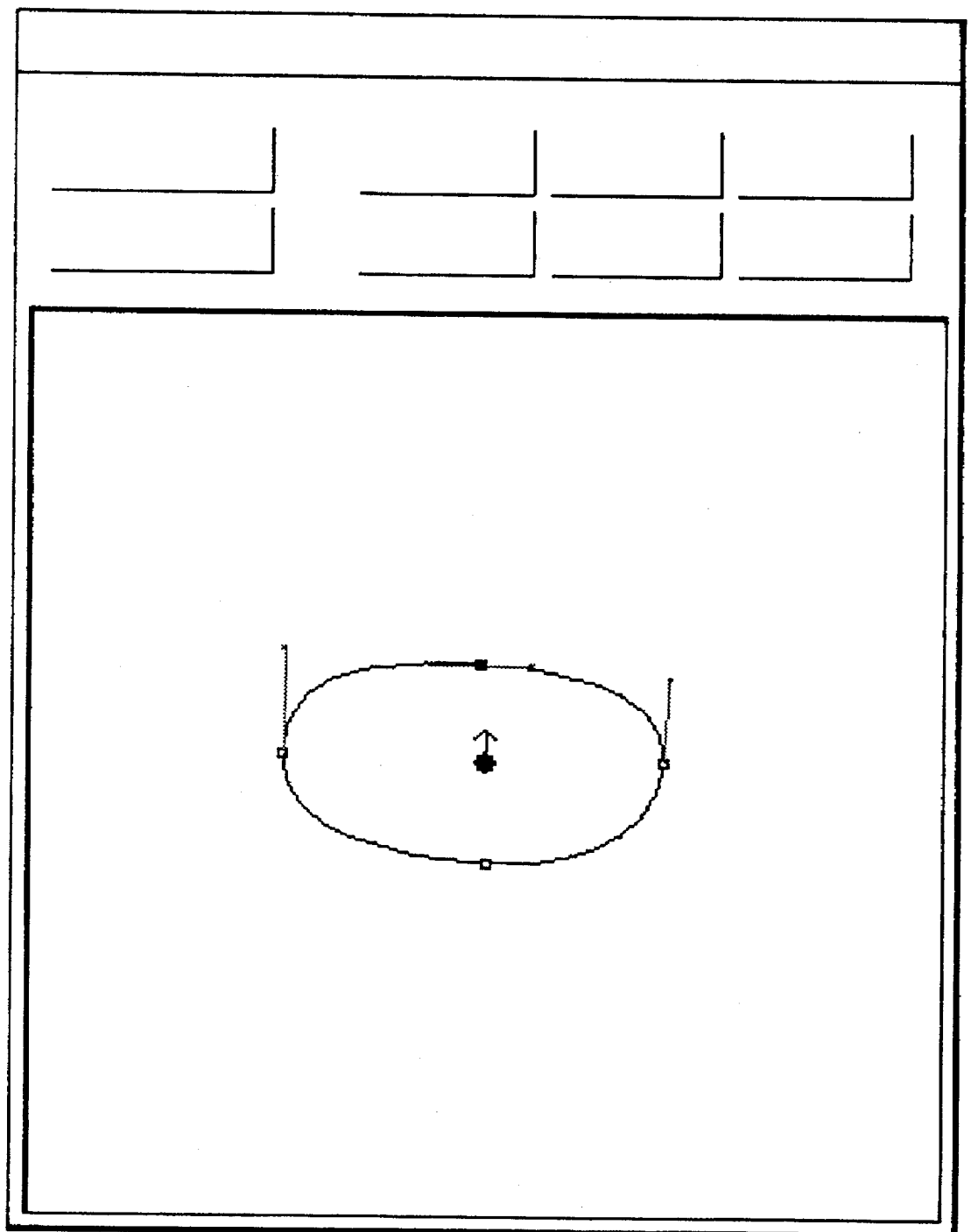
FIG. 45 shows an embodiment of the present invention, and shows the representation of a section of FIG. 39a on the monitor 160 of FIG. 44.

Referring to FIG. 45, in the section display area 160h, the perimeter curve of a desired section is displayed in the plane of the section. The point at which the armature crosses that plane is also indicated.

In FIG. 45, the tangents to the perimeter curve at the control points thereof are also displayed. Additionally, an arrow at the point of intersection of the armature and the plane of the section indicates the direction of view corresponding to one of the viewing areas 160f, 160g.

Figure 46:
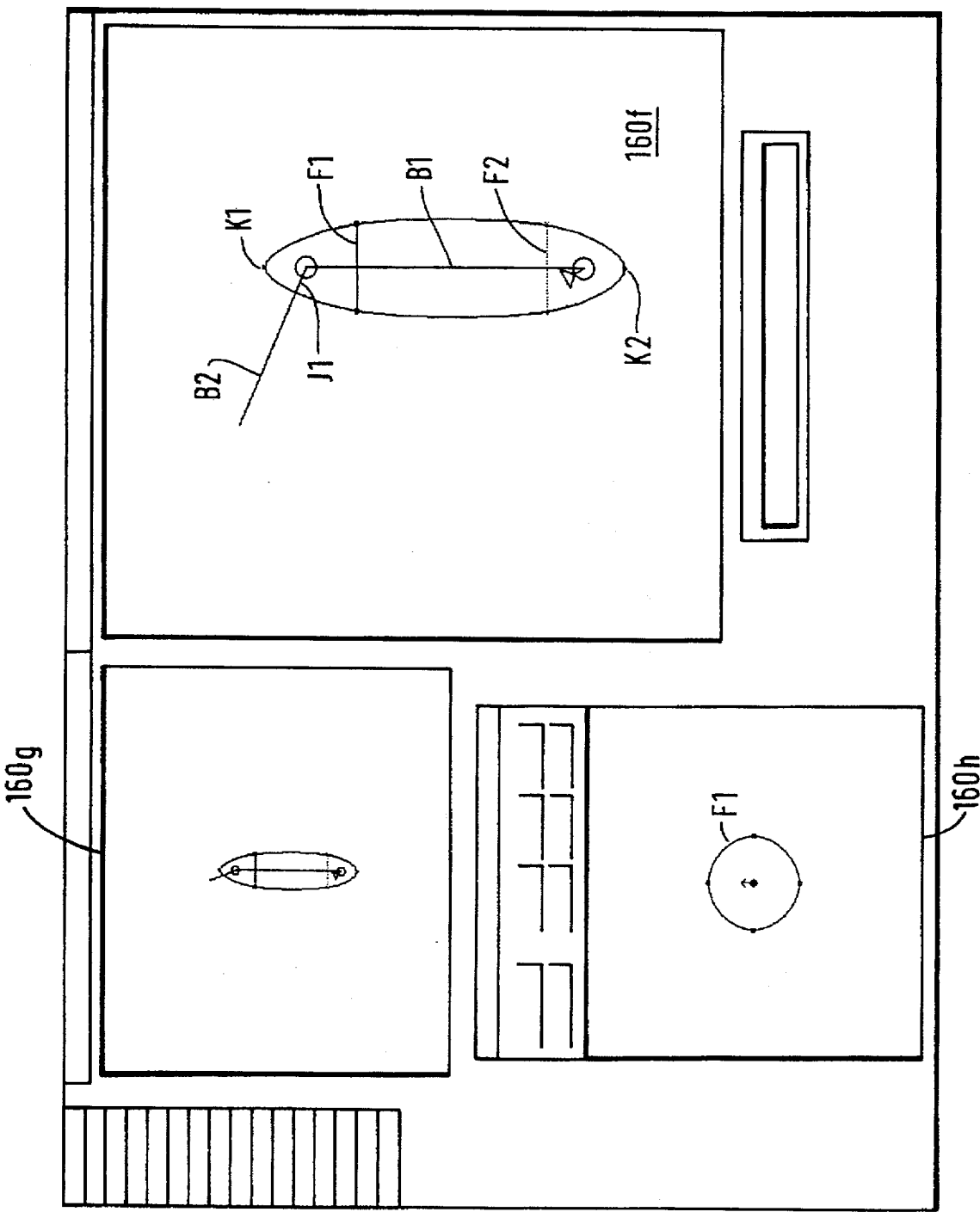
FIG. 46 shows an embodiment of the present invention, and shows in greater detail the representation of a section of FIG. 39b on the monitor 160 of FIG. 44.

Referring to FIG. 46, where a component is associated with an armature, the component is shown in the display areas 160f, 160g as an outline curve surrounding the armature; additionally, to aid editing, the sections (F1, F2) defining the outline curve are also shown, together with the top and bottom points K1, K2. A selected first section F1 is also displayed, in its own plane, in the display area 160h. To inform the user which of the sections shown in the displays 160f, 160g is being displayed in the section display area 160h, that section is shown dark in the display area 160f, 160g whereas the undisplayed sections are shown light, or in some other visually distinctive way such as in a different colour or in a dashed line display format.

Figure 47:
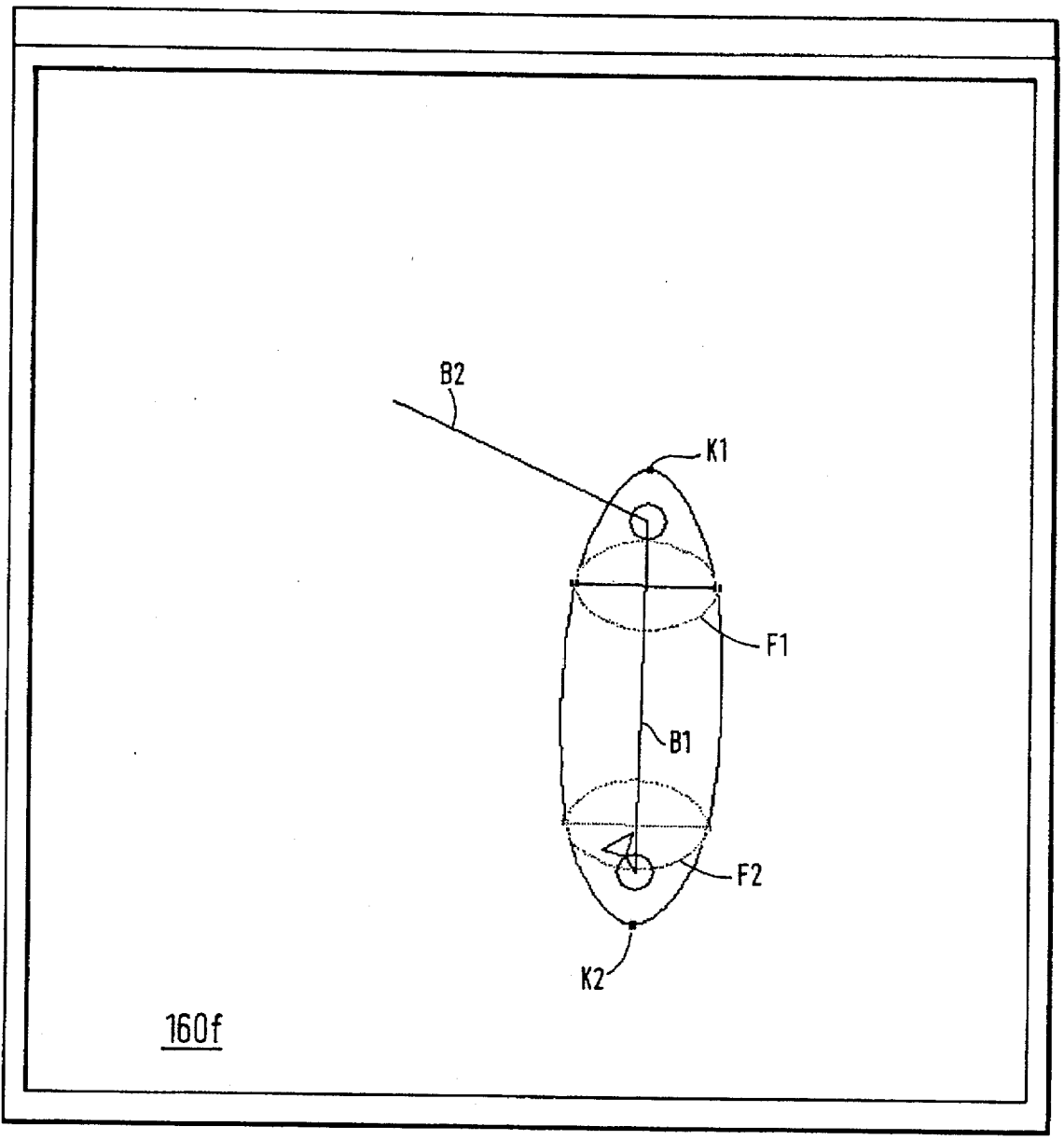
FIG. 47 shows an embodiment of the present invention, and shows in greater detail a portion of the display of FIG. 46.

Referring to FIG. 47, if the view direction of the display area 160f is redefined to be rotated so that the armature is tilted towards the viewing plane, the section perimeter curves (shown in dashed lines) are visible as projected curves, and the outline curve becomes foreshortened.

The operations of generating and modifying the displays shown in the display areas 160f–h will now be described in greater detail.

The following operations are provided:
1. Posing the Object
   (a) Moving the object
   (b) Swivelling part of the object about a joint relative to another part
2. Editing the Object
   (a) Editing an armature
   (b) Editing an envelope component In each case, it is greatly preferred that the user should be able to instruct the performance of the operations of manipulating and editing the object by use of the position sensitive input device (for example a "mouse") 170a, and in particular that he can amend the position of points within the display areas, and correspondingly the data held in the memory 121, by moving the position sensitive input device 170a so as to cause a corresponding movement of a cursor symbol on the screen of the monitor 160, with which cursor movement of the stored data held in the memory 121 relating to the point in question is varied so as to move the point with the cursor symbol.

The general method by which the cursor symbol position is read and corresponding data in the memory 121 is amended has already been given in relation to FIGS. 9 and 10, and will consequently not be repeated at length; only the points at which the procedure differs from that described above will be discussed in detail.

Likewise, the method by which the table 5000 is used to generate the displays shown in the display areas 160f14 160h corresponds to that described above in relation to FIGS. 7 and 8. Corresponding areas of the image store 130 are likewise provided, one for each of the three display areas or "windows" 160f–h. In the case of the display 160h, to display a section in the display area, for example, the line display generator 111 reads the control point data held in the entry 5113 for that section and generates the corresponding curves as described above in relation to FIG. 7.

In the case of the display areas 160f, 160g, referring to FIG. 34, the same process is followed except that an additional step of projecting the three dimensional point data into a two dimensional view for each of the two display areas is performed prior to generating the line display. This step will be described in greater detail below.

DISPLAYING THE OBJECT

Upon receiving an instruction to display a given object, the computer 100 locates the corresponding table 5000 within the memory 121, and reads the position field 5002.

Figures 48A, 48B:
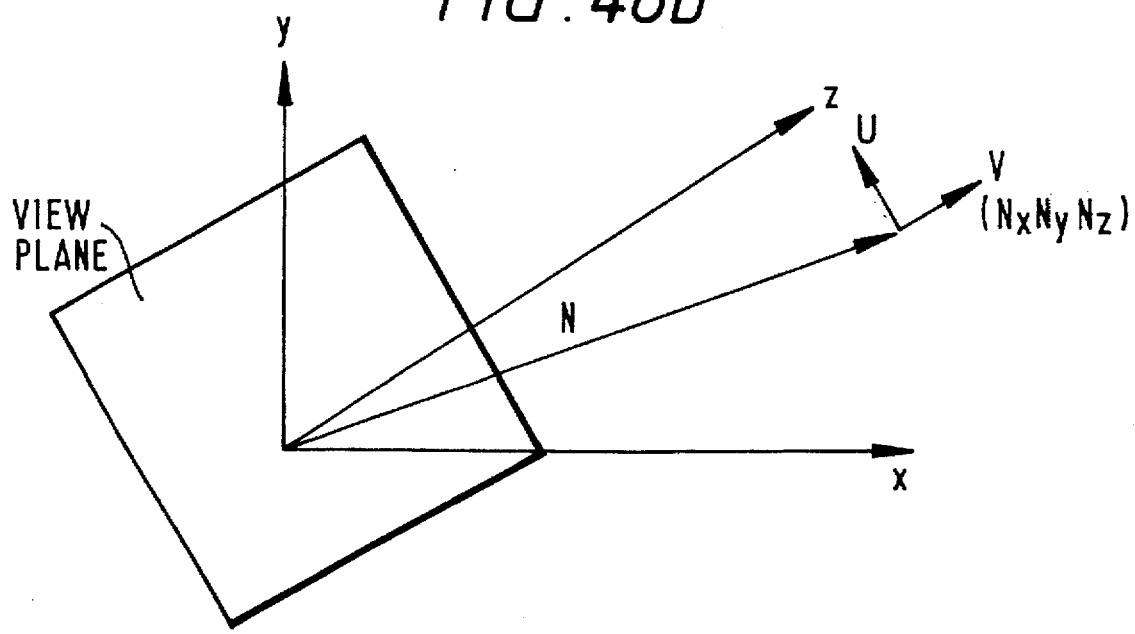

Referring to FIG. 48, also stored within the working memory 121 is a view definition table 3000. For each of the view display areas 160f, 160g, data defining the view direction (e.g. as X, Y, Z coordinates of a vector, shown in FIG. 48b, of a vector N normal to the plane of view corresponding to the display area 160f, 160g). Also stored are the X, Y, Z coordinates of two further normal vectors U, V which indicate the directions of the X and Y axis of the view plane and hence the twist of the view plane about the normal axis N.

Also preferably included, to allow perspective displays, is a measure of the distance between the view point corresponding to the display area and the object. A zoom or magnification datum M may be provided for the same purpose.

One such table 3000 is provided for each of the display areas 160f, 160g in the preferred embodiment.

Figure 49:
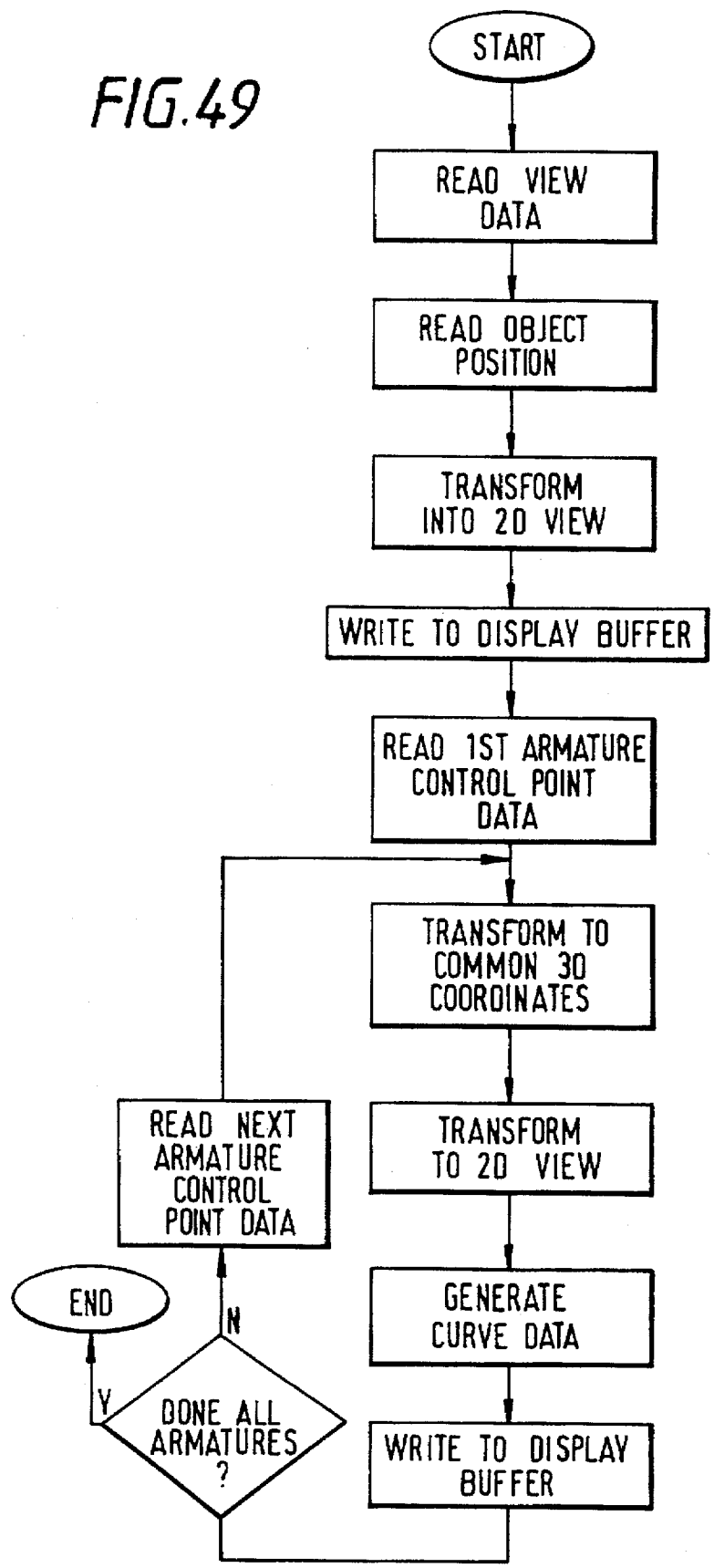
FIG. 49 shows an embodiment of the present invention, and is a flow diagram showing the process of generating the display of FIG. 44 from the table of FIG. 42.

Referring to FIG. 49, to generate a display in the display areas 160f, 160g of an object (for simplicity, orthographic projections will thus be discussed), the computer 100 reads the table 3000 in the memory 121 corresponding to a first of the display areas 160f, and reads the view direction coordinate data defining the orientation of the object relative to the corresponding viewing plane.

Next, the computer 100 reads the three dimensional position of the object from the entry 5002 in the corresponding table 5000 in memory 121.

Next, the global position of the object is transformed into the two dimensional coordinates of the viewing plane corresponding to the display area 160f by multiplying the coordinates by a transformation matrix as follows:

$$(x\ y\ z\ 1) \begin{bmatrix} Ux & Vx & Nx & 0 \\ Uy & Vy & Ny & 0 \\ Uz & Vz & Nz & 0 \\ Tx & Ty & Tz & 1 \end{bmatrix} = (X\ Y\ Z\ W)$$

(where Tx, Ty, Tz indicates an optional translation between the object and the view plane).

For an orthographic projection, the X Y values are then employed to draw a corresponding symbols (shown as a triangle in FIG. 44, for instance) into the image buffer 130f corresponding to the display area 160f, at a memory location defined by the X, Y projected values thus derived.

To perform perspective, rather than orthographic, projection, the Z value generated by the two dimensional transformation is divided into the X and Y coordinates.

Further details of transformation from three to two dimensions will be found in, for example, "Computer Graphics", Hearn and Baker, Prentice-Hall, ISBN: 0-13-165598-1.

Next, the table 5100 for the armature which is connected to that position (shown as B1 in FIG. 44 and FIG. 35) is read by the computer 100. The coordinates of the control points and tangent end points, which are defined in their own reference coordinates, are then transformed into the common three dimensional coordinate system, by adding to each the X, Y, Z position of the character. Conveniently, this addition is in fact performed by a matrix multiplication as follows:

$$(x\ y\ z\ 1) \begin{bmatrix} 1 & 0 & 0 & 0 \\ 0 & 1 & 0 & 0 \\ 0 & 0 & 1 & 0 \\ Tx & Ty & Tz & 1 \end{bmatrix}$$

where $T_X$, $T_Y$ and $T_Z$ in this case correspond to the X, Y, Z position values derived from the entry 5002 in the table 5000.

Figure 50:
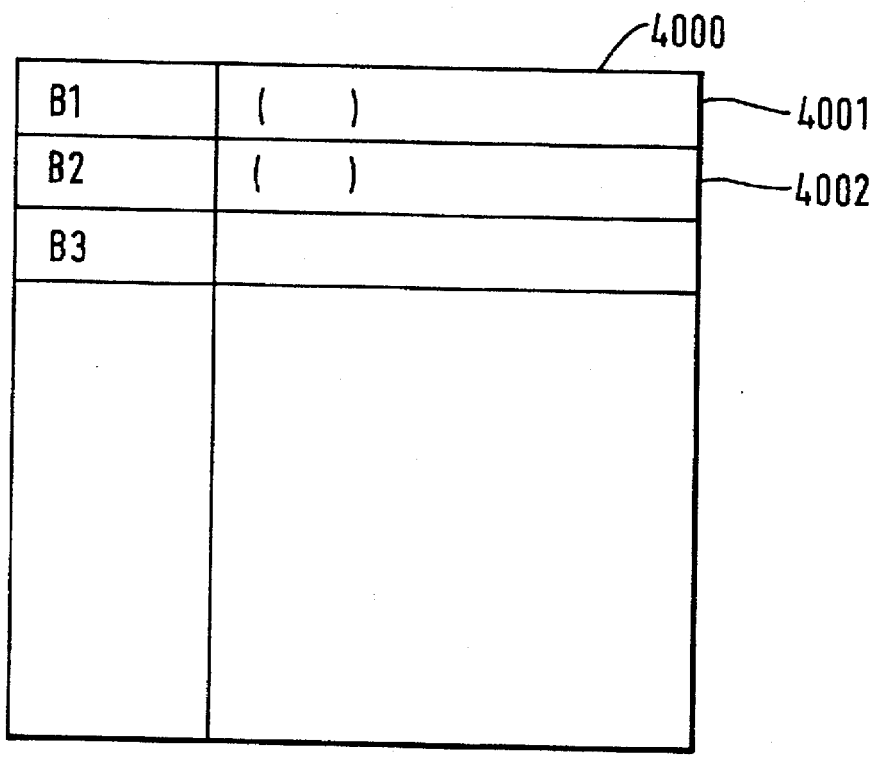
FIG. 50 shows an embodiment of the present invention, and illustrates data held in the memory of FIG. 3 as a table of spatial transformations used in the process of FIG. 49.

Referring to FIG. 50, the computer 100 creates a cumulative transformation table 4000 for the object data table 5000, and the sixteen values defining this 4×4 transformation matrix are stored in an entry 4001 in the table 4000, the entry for 4001 corresponding to the armature B1.

Next, the X, Y, Z coordinates generated by the transform specified in the entry 4001 in the table 4000 are, as above, transformed into the view plane using the data defining the view direction, held in the table 3000. The X and Y coordinates of each of the control points and tangent end points thus projected are supplied to the display generator 111 which correspondingly generates a two dimensional cubic spline curve by setting pixel values within the image buffer 130f, so as to cause the display of that armature on the display 160f.

Next, the computer 100 reads the entry 5200 corresponding to a second armature B2. The entry 5200 refers to the transformations in the table 5400 defining the joint connecting the armature B2 to the armature B1. The transformation matrix corresponding to the data held in the table 5400 for each of the three rotations in the joint is multiplied by the transformation matrix stored in the entry 4001 for the preceding armature B1 and by the transformation from end to end of the preceding armature, also stored in the table 5400. The resulting cumulative transformation matrix is stored in entry 4002 corresponding to the armature B2, and corresponds to the transformation for mapping a point described in the reference space for the armature B2 into the common three dimensional reference space in which the object position is defined.

Accordingly, the coordinates of each of the curve control points and tangent end points stored in the table 5200 for the second armature B2 are multiplied by the transformation matrix stored in the entry 4002 in the table 4000 corresponding to that armature, and the resulting three dimensional coordinates are then transformed into the two dimensional viewdinates in the view plane corresponding to the display area 160f of interest as above. From the two dimensional projected curve control points, the display generator 111 as before generates a two dimensional cubic spline by setting pixel values in the display 160f.

If the next armature to be drawn is that labelled B3 on FIG. 44, the computer 100 reads the corresponding armature record in the table 5000; locates those transformations in the tranformation table 5400 which define the shift in coordinate space from its predecessor armature B2 (i.e. the transformations due to rotations about the joint between B2 and B3, and the translation along B2), and multiplies these transformations by the transformation stored for B2 in the entry 4002 in the cumulative transformation table 4000, to generate an entry for the armature B3.

The process of FIG. 49 continues in this manner until all armatures have been, firstly, transformed into the common three dimensional space in which the object position is defined and, secondly, transformed into the two dimensional viewing plane and displayed. The table 4000 therefore contains, at this time, an entry storing transformation matrix coefficients for each armature, and the transformation defined by each entry corresponds to that defined by the entry for the next armature inwards towards the object reference position, multiplied by the transformations corresponding to the joint between the two armatures and the translation along the inner armature.

Subsequently, to generate a corresponding display from a different view direction on the display area 160g, the process of FIG. 49 is repeated but using the entry 3200 in the table 3000 for the display area 160g; further, the entries in the table 4000 are not derived or amended, but merely employed directly to transform the control points and tangent end points of the armature to which each entry relates.

Likewise, if the viewing direction is altered, by inputting amended data into the table 3000, the process of FIG. 49 is repeated using the stored transformations for each armature in the table 4000 rather than rederiving the table.

On the other hand, if the object is moved or edited the table 4000, or portions thereof, needs to be updated as described in greater detail below.

To allow the animator to treat the viewing direction as if it were a camera, movable in the three dimensional space in which the object is defined, and to allow the animator to use the camera manipulation techniques available to the film maker, readily manipulable view control is provided using either dedicated position sensitive input devices, such as faders for the zoom and magnification and a tracker ball for the camera position and/or angle, or by the use of a cursor controlling position sensitive input device 170a and providing display areas on the screen corresponding to pictures of sliders for the zoom and magnification, and a picture of a trackerball, and by sensing the cursor position so as to simulate manipulation thereof. The method of implementing a tracker ball simulation of this type is described in "Graphics Gems", Glasner, Academic Press, ISBN: 0-12-286165-5 at page 462.

Conveniently, two such virtual trackerballs are provided; a first, which acts to swivel the viewing axis about its origin in the view plane corresponding to the display (as if the camera was swivelling on its own tripod), and a second which acts to rotate the viewing axis around the positional reference point of the object.

Conveniently, a plurality of predetermined viewing directions (for example along the X=0, Y=0, Z=0 axes) are provided so that reference views of the object may be generated by pressing a button for each view.

The raster image from the frame buffer 160e, 160f may also be output to storage 180 or film or video recorders 196, 197.

MOVING THE OBJECT

To move the object as a whole in space, the user signals an intention to initiate a "move" (e.g. by pressing a button labelled "MOVE" on keyboard 170b or using the position sensitive input device 170a to indicate a corresponding area of the monitor screen 160). The computer 100 then accesses the table 5000, and monitors the position of the cursor symbol manipulated by the position sensitive input device 170a in the display areas 160f or 160g. Because the display 160f, 160g relate to different views (preferably normal to each other), the user can move the object in any direction in three dimensions, by a combinations of motions in one or the other view. For example, to move the object forward and to the right, referring to FIG. 44, the forward motion is accomplished with reference to the display area 160g, and the rightward motion with reference to the display area 160f.

The two dimensional offset between the cursor position and the object position in the view plane is transformed into a three dimensional change for the object by deriving the inverse transformation from the table 3000 for the corresponding viewing direction, and transforming the difference between the cursor position (derived from the cursor tracker 112) and the projected two dimensional object position. The resulting positional shift coordinates are added to the present contents of the position field 5002. The process of FIG. 49 is then executed, and each of the entries in the cumulative transformation table 4000 is recalculated.

Figure 51:
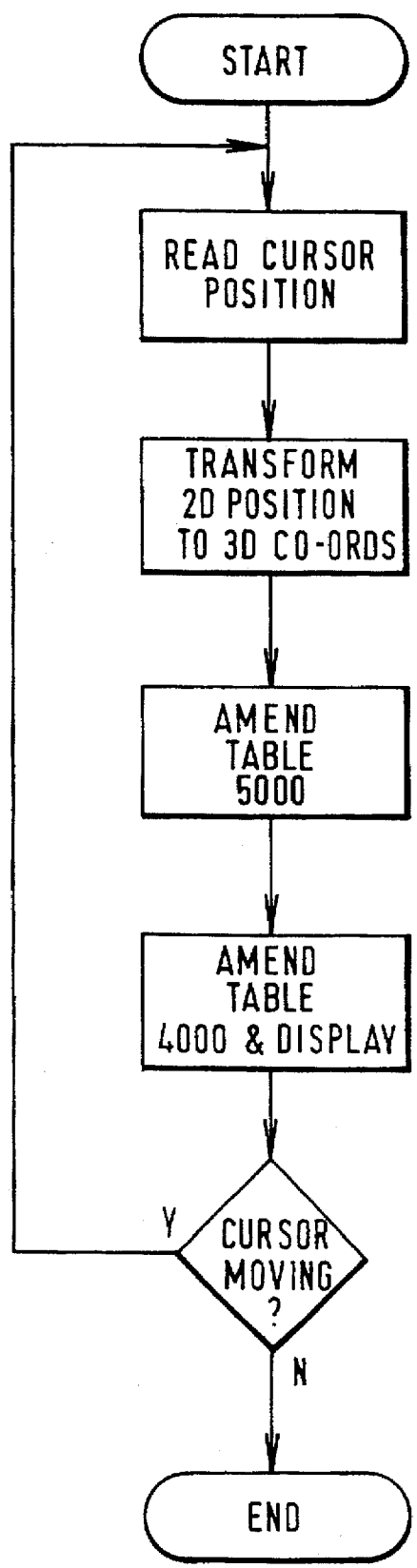
FIG. 51 illustrates the variation of a portion of FIG. 10 for utilising a position sensitive input device in the second aspect of the invention.

The process is then repeated, as shown FIG. 51, until the cursor movement has finished.

POSING THE OBJECT

The position of armatures of the three dimensional object may be manipulated, relative to others, about the joints therebetween. Upon signalling intention to pose the object, and selecting an armature by positioning the cursor symbol thereat and issuing a control signal (e.g. clicking a mouse 170a), subsequent motions of the cursor symbol are arranged to cause corresponding rotations, in the viewing plane corresponding to the display area selected, of the armature about the joint which connects it to the next armature inwardly towards the object positional reference point. The other end of the armature from the joint therefore describes the surface of the sphere centred up at the joint in three dimensional space. Accordingly, in this mode, in FIG. 51, the cursor position derived from the cursor tracker 112 is treated as the projection of the free end of the armature into the view plane, and transformed into three dimensional coordinates, to derive solution angles defined at the joint about which the armature is rotated, using simple spherical geometrical calculations.

Accordingly, the transformation data relating to a hinge in the table 5400 within the table 5000 is amended, and the entry in the table 4000 for the armature which has been rotated, and all armatures connected to it are recalculated by referring to the preceding entry in the table 4000, and using the newly derived entries in the table 5400.

Again, by effecting rotation of the armature using a position sensitive input device with reference to different projected views, it is found possible to simply and quickly position the armature in any desired rotational orientation.

Twisting an Armature

When the user signalled an intention to manipulate the armature in this mode, any subsequent cursor movements are interpreted as specifying a twist of the armature about its own axis, and the corresponding transformation relating to the twist angle in the table 5400 is amended in FIG. 51, and the entries in the cumulative transformation table 4000 for the twisted armature and all others connected to it are likewise amended as above.

Generating the Envelope

A projection of the outer surface of the object, surrounding the armature B1, is shown. The method of generating this projection will now be described.

As already described, the data defining the envelope is stored as control points defining the perimeter curve of at least one cross section defined relative to the armature, and conveniently a pair of end points on the armature (or on the projected tangents beyond the ends of the armature).

Referring to FIGS. 39b and 47, the outline curve of the envelope component in a given derived viewing plane is constructed by, firstly, deriving the maximum lateral extent points of the projection into the viewing plane of interest of the cross sections F1, F2 and the top and bottom points K1, K2, and secondly using these as curve control points to generate a smooth two dimensional curve as the outline.

This process does not in fact generate an accurate geometrical projection, but satisfactorily generates a smooth outline curve for a relatively small amount of calculation. There is, however, a circumstance in which this simple method gives results which may be unsatisfactory; this is when the armature is viewed virtually end on, so that the top and bottom points lie close to or actually inside the projected sections. Accordingly, the method of generating the outline curve is modified at this condition.

Figure 52:
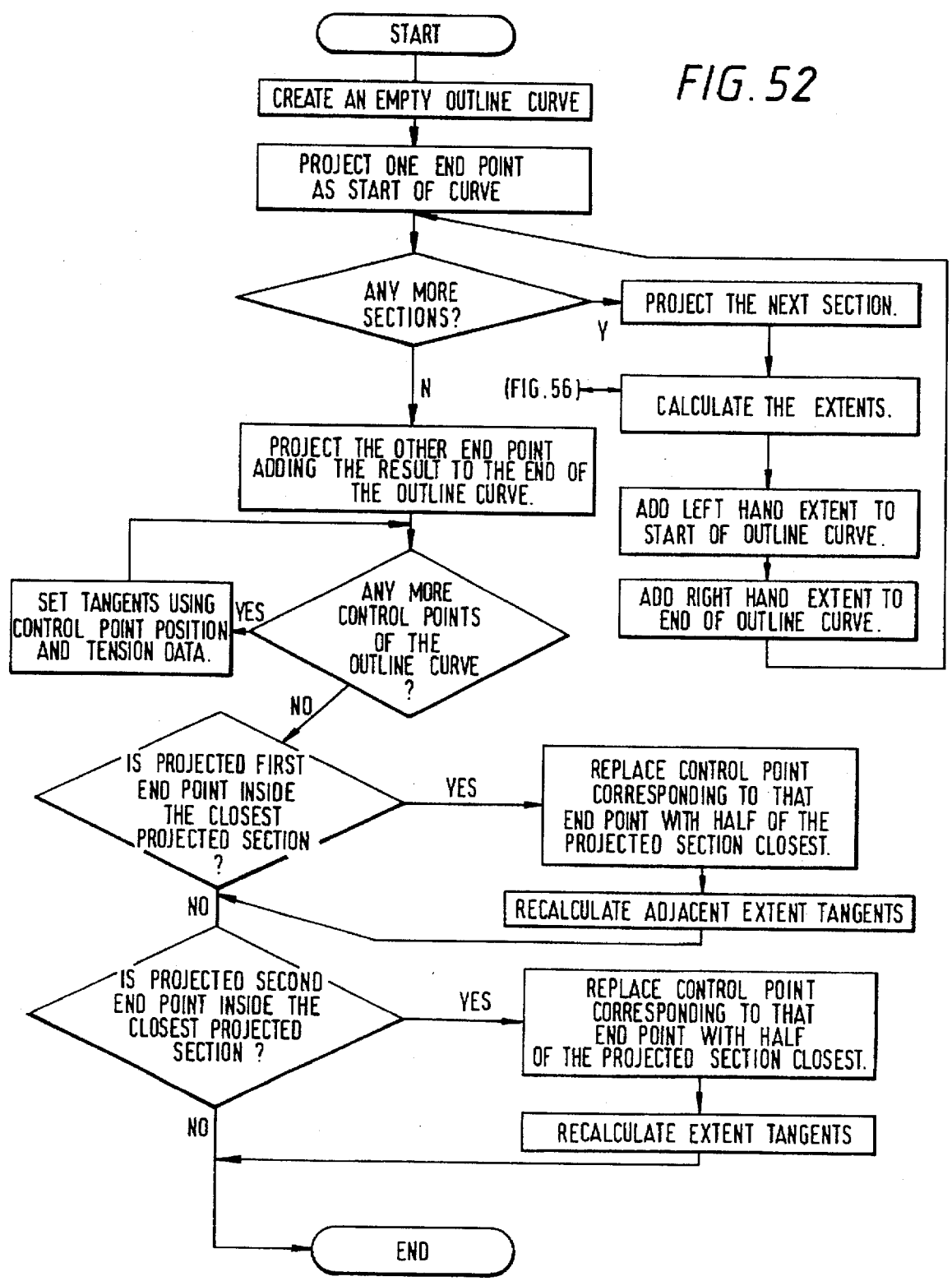
FIG. 52 shows an embodiment of the present invention, and shows schematically the process for generating the outline shown in FIG. 39b from the table shown in FIG. 43.

Referring to FIG. 52, the process of generating a component outline curve will now be discussed in greater detail.

To create an outline curve for a given component, the computer 100 creates an outline curve record 2117 in the component 2110, as shown in FIG. 53.

The table 2117 contains fields for a number of curve control points, each comprising a point position and a pair of tangent end points, each defined by X, Y coordinates (in two dimensions). The number of control point fields in the table 2117 is set initially to twice the number of sections in the component plus two. The coordinates of the first control point are derived by taking the parametric position of a first end point along the armature (stored in the field 5111), reading the curve control points from the corresponding armature table 5110, solving the corresponding three dimensional parametric equations in x, y, and z to find the three dimensional coordinates of the end point (in the reference space of the armature), and then transforming these three dimensional coordinates into the view plane by firstly applying the transformation specified for that armature in the table 4000 (to transform the three dimensional coordinates into the common three dimensional coordinate system or "world space"), and then applying the transformation specified by the table 3000 to project these into the view plane.

The projected two dimensional coordinates are then entered in the first position entry in the table 2117.

Next, the section with the nearest parametric position to the end point, along the armature, is located within the component table 5110. As above, the control points stored in the corresponding armature table 5100 are read by the computer 100, which derives the position at which the armature crosses the plane of the section, and the direction of the tangent to the armature at that point, which is normal to the plane of the section. From these data, the computer 100 calculates the positions, in the spatial reference frame of the armature, of the control points of the perimeter curve of the section, stored in the corresponding entry 5113 (for example) in the component table 5110.

Each of these points is then transformed into the common three dimensional coordinate system, using the transformation stored in the table 4000 for the armature to which the component corresponds, and then to the two dimensional viewing plane coordinate system by reference to the data stored in table 3000.

Figure 54:
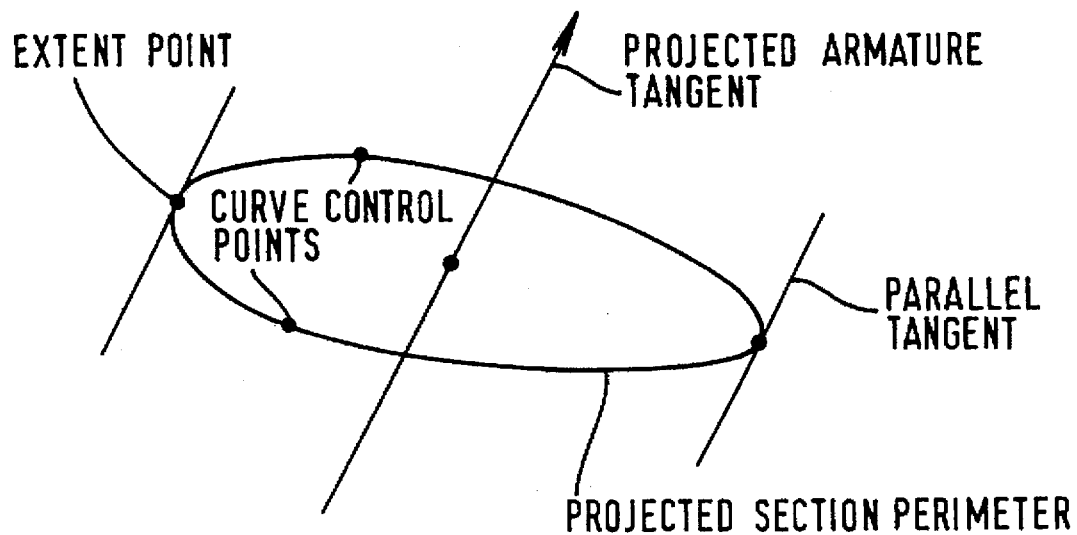
FIG. 54 shows an embodiment of the present invention, and illustrates diagramatically a part of the process of FIG. 52.

Referring to FIG. 54, the next step is to find the two points on the section, projected into the viewing plane, between which the extent of the section is greatest (the "extent points"). Referring to FIG. 54, the tangents to the projected boundary curve of the section will be parallel to the projected armature tangent (although if the boundary of the section includes concave portions, there may be other points also for which this is true).

Figure 55A:
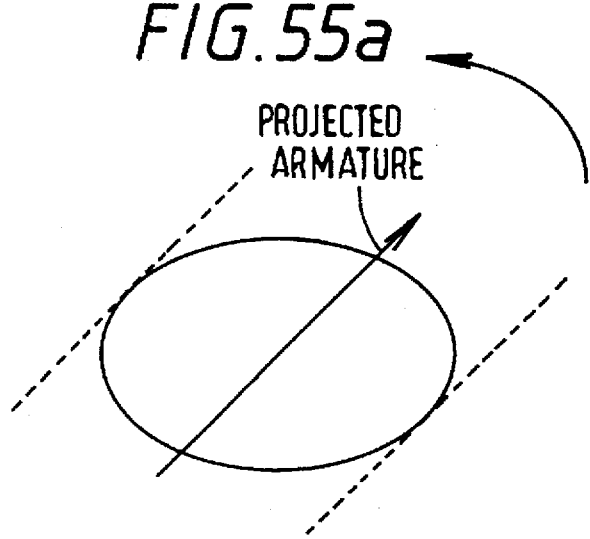
FIGS. 55a and 55b show an embodiment of the present invention, and illustrate diagramatically a further part of the process of FIG. 52.
Figure 55B:
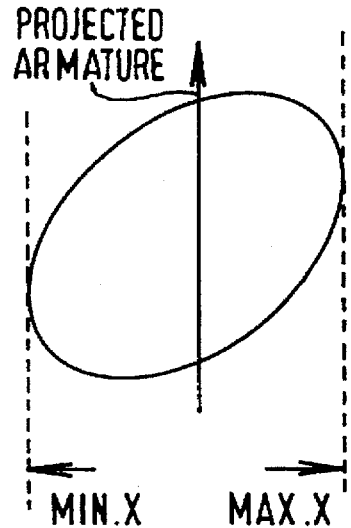
Figure 56:
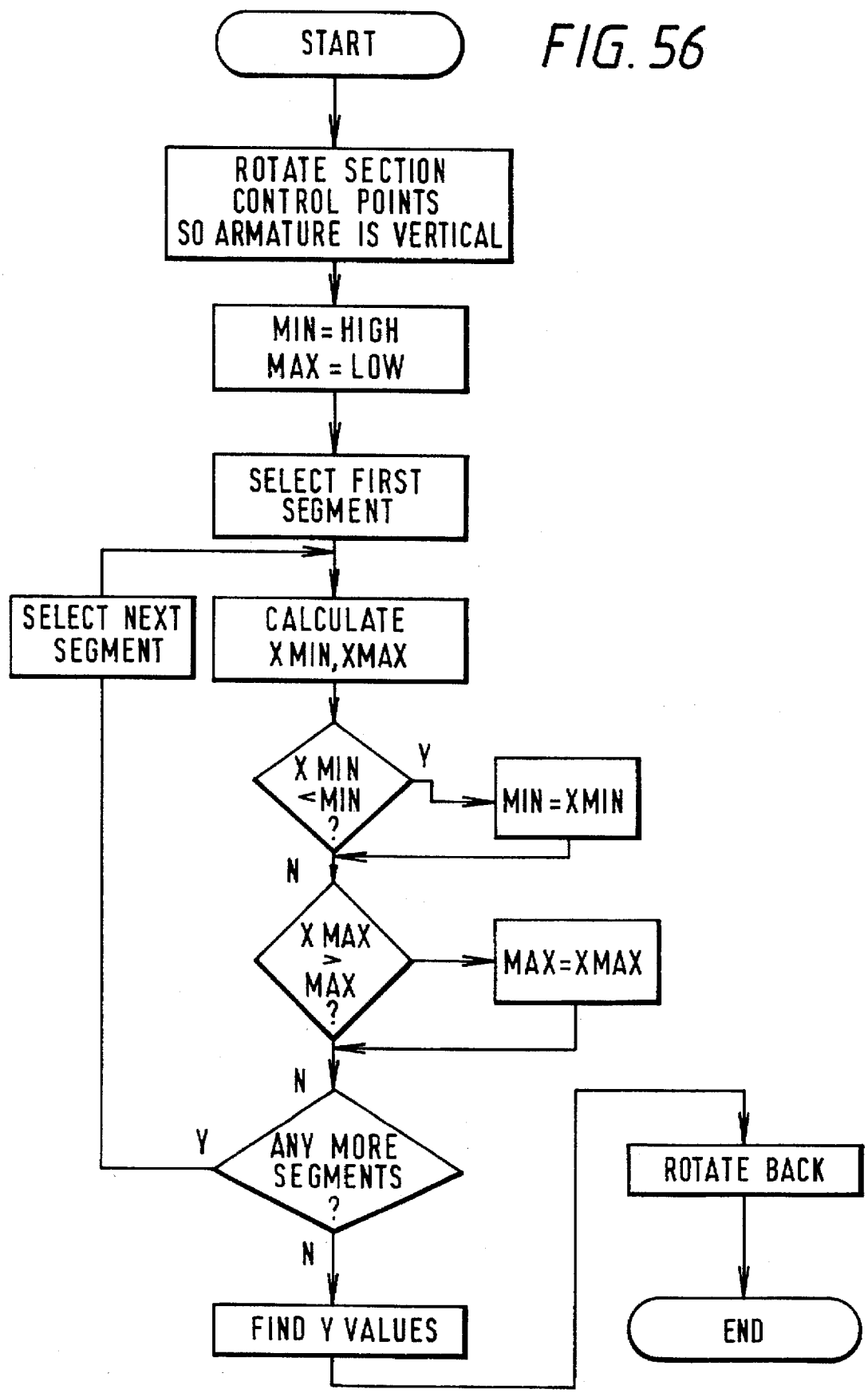
FIG. 56 shows an embodiment of the present invention, and is a flow diagram showing in greater detail the portion of the part of FIG. 52.

Accordingly, referring to FIGS. 55a and 55b and 56, the complexity of the calculation is reduced by calculating the rotational angle between the projected armature tangent end and the Y axis of the viewing plane; transforming the projected curve control points by rotating them by this angle in the other direction (so as to align the projected armature tangent with the Y axis), and then looking for the minimum and maximum X coordinate values for points where the tangent to the curve is parallel to the Y axis. By effecting this rotational transformation, the complexity of the problem is reduced since it is only necessary to consider the X coordinate.

Referring to FIG. 56, in greater detail, the process of finding the two extent points for each section therefore comprises the steps of calculating the rotation matrix; multiplying each of the curve control points and tangent end points of the section by the calculated rotation matrix so as to align them as shown in FIG. 55b; setting initial minimum and maximum X coordinate values (the minimum to a suitably high value and the maximum to a suitably low value), selecting a first curve segment lying between a first and a second curve control point; and calculating the minimum and maximum values of X coordinate of the curve within that segment.

This calculation is achieved by deriving the cubic equation of the X coordinate, and the differential thereof, and solving to find the points at which the differential is zero, and comparing the solutions for the largest and smallest value of X over the curve segment.

The largest value is compared with the stored maximum, and the smallest value is compared with the stored minimum; if the maximum exceeds the stored maximum, or the minimum is less than a stored minimum, the newly calculated value is stored to replace the previous maximum or minimum value.

These steps are repeated until all segments of the projected boundary curve have been tested for minimum and maximum X values. The stored minimum and maximum X values are then taken as the X coordinates of the extent points in FIG. 55b.

The corresponding Y coordinates of these extent points are found by using the cubic equation in Y associated with the curve segments within which the X coordinates lie, and the X, Y coordinates of the extent points are then rotated back into the two dimensional coordinate space of the view plane associated with the display area 160f by applying the inverse rotational transformation to that used above.

In the above process, the number of calculations may somewhat be reduced if an additional test of the maximum and minimum coordinates x of the "bounding box" (i.e. the control points and tangent end points) of each curved sector is performed prior to finding the minima and maxima of the curves themselves, since the path of the Bezier curve lies within this boundary box.

When the process of FIG. 56 is complete, therefore, the two desired extent points at the edges of the first section have been found. Referring once more to FIG. 52, the minimum value extent is added to the next vacant field after the start in the table 2117, and the maximum value extent is added to the last vacant field before the end of the table 2117.

The process of deriving the extent points is then repeated for any further sections, in the same way, adding the minimum value X coordinate extent point into the initial part of the table 2117 from the start and the maximum X value extent point to the latter part of the table 2117 from the end. After extent points have been calculated for all such segments, the second end point is projected into the viewing plane in exactly the same way as was the first and added into the middle of the table 2117.

Figure 57A:
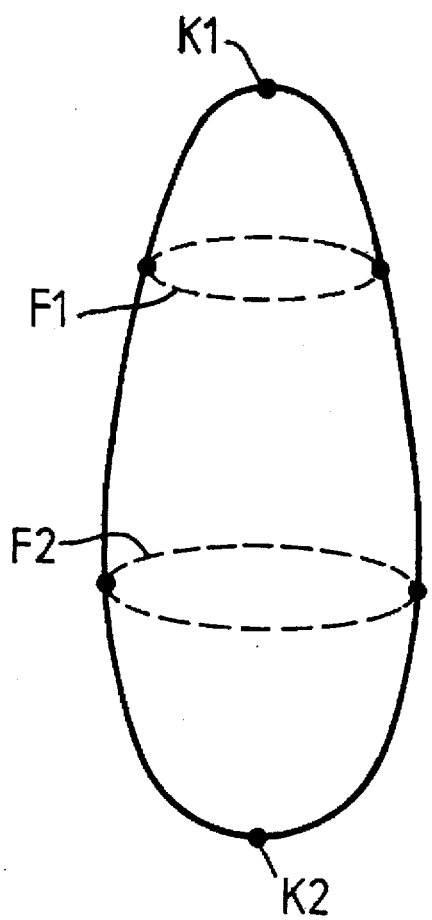
FIGS. 57a–d show an embodiment of the present invention, and illustrates schematically a potential problem in the process of FIG. 52.

Referring to FIG. 57, in FIG. 57a, a component is viewed along a viewing axis almost normal to the armature defining the component. The component outline is, as discussed above, satisfactorily defined by the top and bottom points and the two extent points of each of the two sections.

Figure 57B:
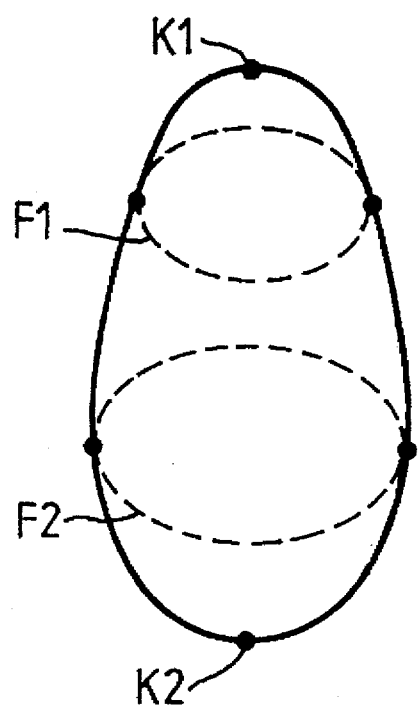

Referring to FIG. 57b, when the viewing axis tilts more towards the axis of the armature, the outline curve generated using the extent points of the two sections F1, F2 and the two end points K1, K2 remains satisfactory, until the two end points K1, K2 approach the projected boundary curves (in the viewing direction) of the sections F1, F2. However, when the boundary curves are closely approached, the outline curve defined using the end points K1, K2 may clip portions of the projected sections, so that the outline curve ceases to be fully representative of the shape of the component.

Figure 57C:
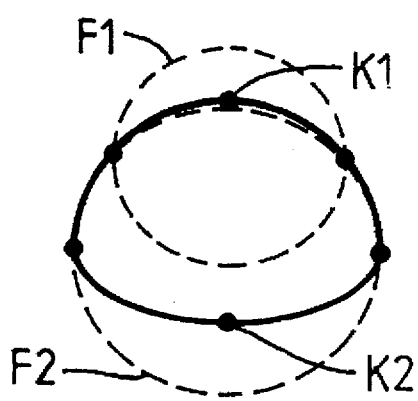

In FIG. 57c, it will be apparent that when the end points K1 or K2 move inside the projected perimeter curves of one of the sections F1 or F2, the outline curve derived using the above method would fall within the projected perimeter curve of the section, and hence the outline curve generated would be too forshortened.

Figure 57D:
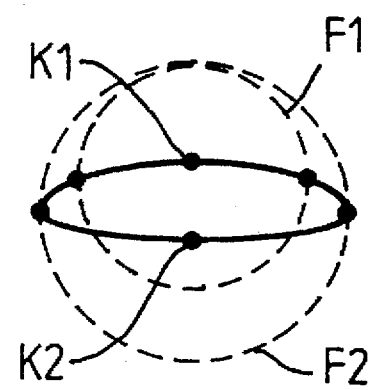

Referring to FIG. 57d, as the viewing axis is moved more parallel to the axis of the armature, this effect becomes more and more pronounced; the outline curve when viewing the component nearly end on should at least surround the projected perimeter curves of the sections F1, F2, rather than tending to shrink within them as in FIG. 57d.

Figure 57E:
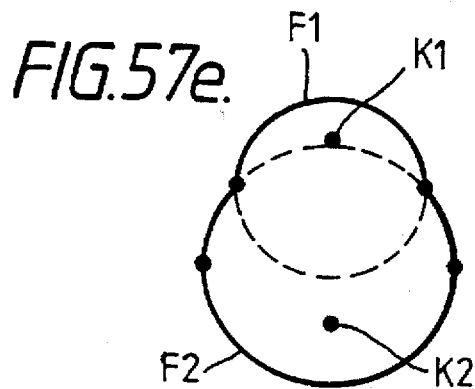
FIGS. 57e and 57f illustrate diagramatically the effects of a solution thereto according to an embodiment of the invention.
Figure 57F:
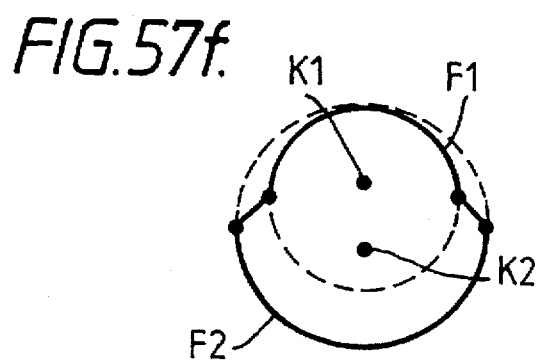

Accordingly, referring to FIGS. 57e and 57f, and FIG. 52, the computer 100 performs a test to determine whether either end point K1, K2 lies within the projection of the nearest section to that end point. If it does, then the corresponding half of the projected section lying between its two extent points is substituted, and the end point is not used in generating the outline curve, as shown in FIGS. 57e and 57f (which correspond to FIGS. 57c and 57d).

If the component has a rapidly increasing cross section, along the line of the armature, it is possible that the end point might intersect another projected section before intersecting that closest to it; accordingly, the computer 100 may test whether the end point lies within all projected sections and not merely that closest to it.

To test whether the end point lies within the projected section, a straight line passing through the end point is solved with the cubic equations defining the projected sections; the number of solutions indicates whether the point lies inside or outside, since a straight line eminating from a point lying within a closed curve will intersect the curve an odd number of times (at least once), whereas a line from a point outside will intersect a curve an even number of times.

To determine the tangent end point entries for the component outline curve table 2117, the computer 100 reads the point positions already stored in the table 2117 and calculates, for each point, the two tangent end points in dependence upon the positions of the neighbouring (i.e. preceding and succeeding in the table 2117) control points as follows:

$$TAN1_i = K_i - T1_i(K_{i+1} - K_{i-1})/6$$

$$TAN2_i = K_i + T2_i(K_{i+1} - K_{i-1})/6$$

where $K_i$=coordinates of control point i $T_i$=tension value for each tangent (e.g.1)

In general, a different "tension" value could be set for each point, but a smooth curve is obtained if the tension values $T_i$ are all set to unity.

If, in FIG. 52, an end point has been found to lie within a projected section, the entry in the table 2117 for the end point is deleted and replaced by entries for the control point (or points) of the section in question which lie between its two extent points, in the sector in which the end point lies.

In this case, the tangent end points for each point in the table 2117 which lies well away from that section are calculated as before. However, the tangent end points for the control points which lie on the projected section are the projections into the viewing plane of the tangent values stored in the table 5110.

Figure 58:
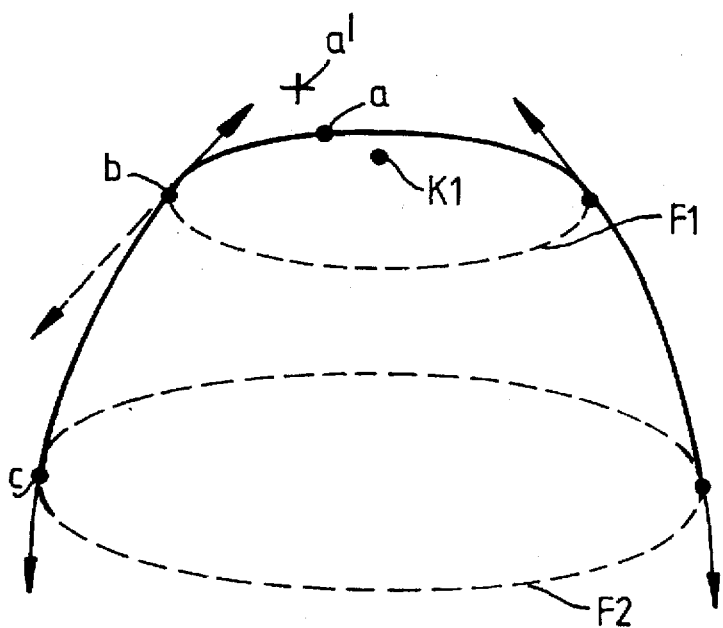
FIG. 58 shows an embodiment of the present invention, and illustrates diagramatically a further stage of the process of FIG. 52.

Referring to FIG. 58, however, it is desirable to recalculate the tangent end points corresponding to the extent points of the replacing section and its nearest neighbour so as to provide a smooth transition. For each extent point, the tangent which points away from its nearest neighbour need not be recalculated; thus, on the section F1 shown in FIG. 58 the two tangents pointing outwardly of the centre of the component have values calculated by projecting the control points of the section stored in the table 5110 into two dimensions, and solving at the extent points. The tangents at the extent points of the section F2 are derived, as described above, from the neighbouring point position data in the table 2117. The remaining tangent at each extent point of the section F1, which points towards the section F2, is derived by the same method, except that instead of using the neighbouring point data in the table 2117 which corresponds to the next control point on the section F1, labelled as "a" on FIG. 58, a substitute point position a' is calculated as follows:

$$a = 6(TAN1 - b) + c$$

where b and c are the two extent points shown in FIG. 58.

The above described technique provides a good visual representation of a three dimensional object in the case where the sections are fairly smooth and of a similar shape and size. This is found to be the case with humanoid figures, so that the above described method is of acceptable quality in animating most cartoons. Equally, however, for more geometrically accurate results, it would be possible to provide instead of FIG. 52, a method which generated as the outline curve the union of the outermost sectors of each section, linked by curve portions so as to eliminate sharp intersections.

The process of FIG. 52 is repeated for each component held in the table 5000, so as to generate a two dimensional outline of the envelope of the object in each viewing area 160f, 160g. The two dimensional outline is thus represented by a set of tables 2117, one for each component, each defining a closed curve.

A separate table 2117 is also required, for each component for each display area 160f or 160g.

Figure 59:
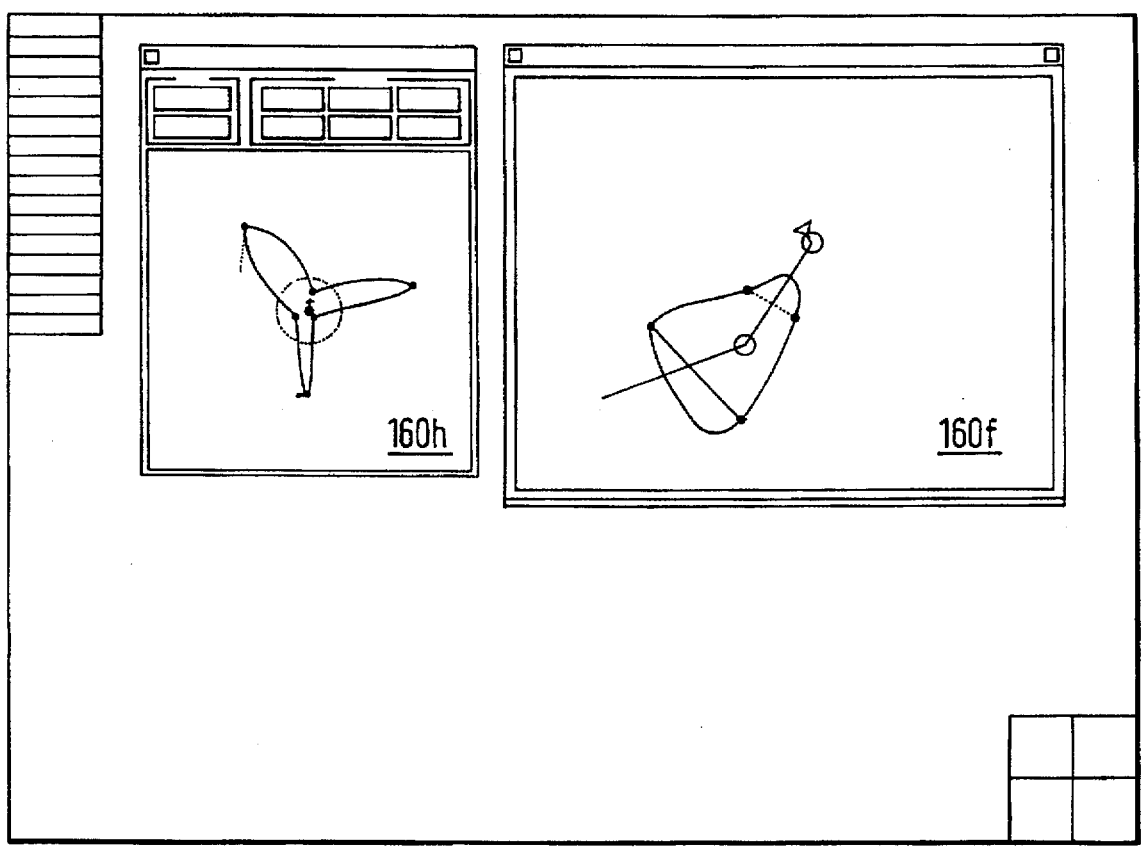
FIG. 59 shows an embodiment of the present invention, and shows the appearance on the monitor 160 of a more complex cross section than that of FIG. 46.

FIG. 59 illustrates that the sections need not be smoothly convex, but may take up complex shapes defined by a relatively small number of control points.

Figure 60:
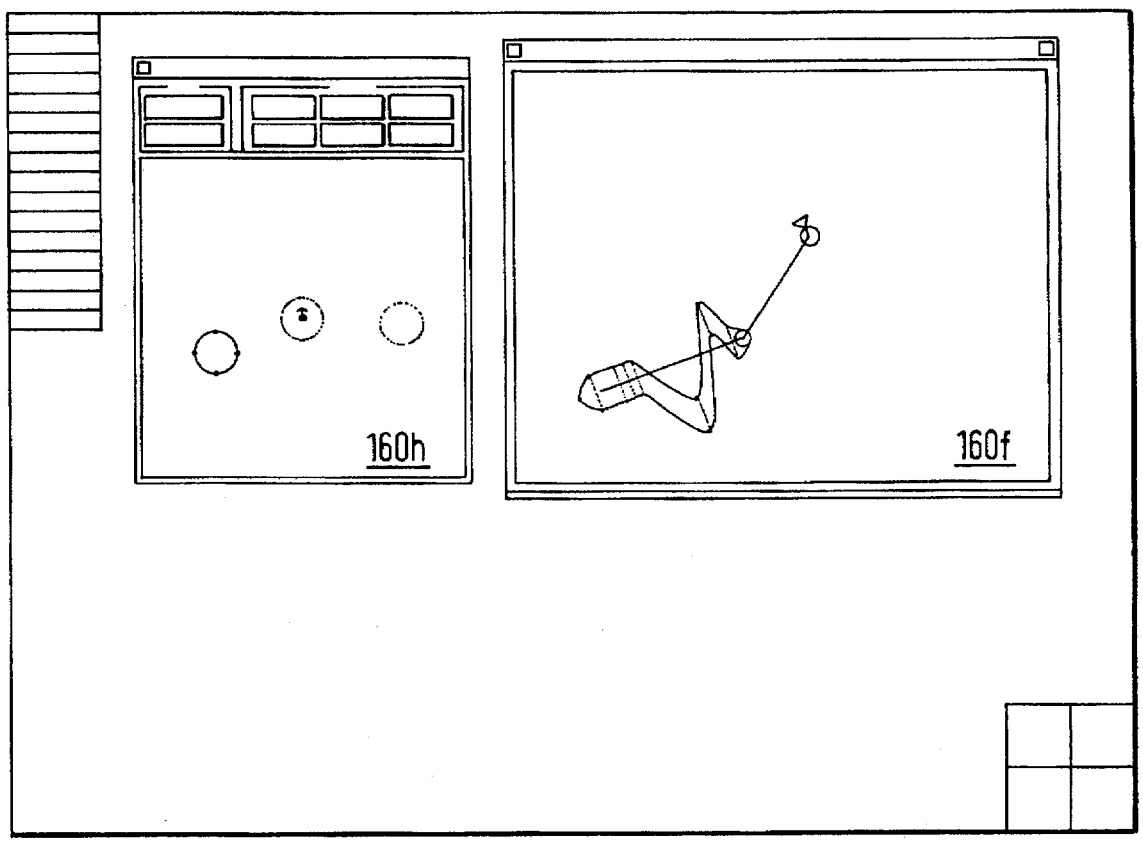
FIG. 60 shows an embodiment of the present invention, and shows the appearance on the monitor 160 of cross sections which do not intersect the armature by which they are defined.

FIG. 60 illustrates that whilst the sections are defined in a plane perpendicular to the armature, the perimeter curve defined by the control points of the section need not itself surround the armature. Thus, the position of the section is dictated by the armature but it need not surround the armature.

EDITING THE OBJECT

In order to change the shape of the object, the data held in the table 5000 can be edited in a number of ways, described below. For each, the user signifies a desire to initiate that editing mode by typing a command on a key board 170b or positioning the position sensitive input devive 170a so as to move a cursor symbol over an appropriate command area ("soft button") of the monitor screen 160, and the computer 100 proceeds to amend the data held in the table 5000. If necessary, after each amendment, the data held in the transformation table 4000 is likewise amended. After each amendment, the process of FIG. 49 is reexecuted and, if components are or have been defined, the process of FIG. 52 is reexecuted for each.

The user is therefore presented, on the display areas 160f, 160g, 160h with an updated display taking into account the editing, so that rapid interactive editing is possible.

Adding an Armature

After a user has signalled an intention to add a new armature, he manipulates the position sensitive input device 170a to move the cursor symbol to a point on an existing armature. The coordinates are derived from the cursor tracker, and the parametric position (i.e. the scale of value representing the length along the armature) is derived. The position and tangent at the joining point, in the coordinate reference system of that armature, is derived and from this, the transformation matrix describing the translation between the coordinate systems of the armature and the new armature is derived, and stored in a new entry in the table 5400, to which a reference is inserted in the table 5100 for the existing armature.

Three further records in the transformation table 5400 are opened, to correspond to the joint between the existing armature and the new armature to be added, and references to these are also inserted into the table 5100 for the existing armature.

Four further entries in the table 4000 are created, one for each of the extra transformations.

A new armature table 5200 is created within the table 5000, with default values for the end point positions and tangent end point positions (e.g. all zero or all unity).

The new armature has now been added, and may be moved (see above) or edited (see below).

Deleting an Armature

The user positions the cursor symbol at the armature to be deleted. The computer 100 reads the table 5200 relating to that armature, and deletes each transformation to which that table refers. This deletes the joints to which the armature is connected, and any joints by which further armatures are connected to it.

The computer 100 also deletes any other armatures which refer to those transformations, and any transformations to which those other armatures refer; in this way, when an armature is deleted, all further armatures which are connected to it, further away from the positional reference point of the object, are deleted. For instance, referring to FIG. 44, if the user deletes the thigh armature B2, the shin armature connected below it is likewise deleted together with any foot or toe armatures connected below that.

The corresponding entries in the accumulative transformation table 4000 for each deleted transformation are likewise deleted, as are any component tables to which a deleted armature refers.

Armature Stretching

Referring to FIG. 37, it is possible to increase (or decrease) the length of an armature, whilst retaining its general curvature intact, by changing the position of its second control point. Conveniently, this may be achieved by the user positioning the cursor symbol at the second control point, and using the two different views in the display areas 160f, 160g to move the end point in three dimensions; the computer 100 therefore reads the cursor position in each display area, as previously, and derives from the two dimensional cursor position a movement for the end point in three dimensions; this movement is then transformed into the coordinate system of the armature using the reverse transformation to that specified in the table 4000 for the armature, and the amended end position thus derived is stored in the armature table 5100; the value of the translation or transformation to which the armature refers in the table 5400 is then amended, and all subsequent transformations in the cumulative transformation table 4000 are likewise amended by dividing by the old transformation value and multiplying by the new.

This stretching of armatures is particularly useful in cartoon animation, where the limbs of a character often stretch in an unlifelike or exaggerated way.

It should be noted that, because the positions of the sections defining the component of the object envelopes surrounding the armature are defined as proportions of the whole distance along the armature, when the length of the armature is changed it is unnecessary to amend the data stored in the component table; the user can thus stretch a portion of the three dimensional figure whilst retaining its profile section unchanged, and causing a proportionate stretching in the envelope surrounding the object.

Bending Armatures

Referring to FIG. 37, when a user signals a desire to bend (i.e. change the curvature of) the armature, the computer 100 is arranged to read the coordinates of the tangent end point positions from the table 5100 for that armature, project these into the two dimensional viewing coordinates for each of the display areas 160f, 160g and display lines from the armature end points to the tangent end points, so as to represent the three dimensional tangents to the armature. The user then positions the cursor over a desired one of the tangent end points, and as described above, by moving the cursor in each of the two display areas 160f, 160g, the computer 100 causes the tangent end point data held in the table 5100 to be rewritten so that the two dimensional projections thereof in the corresponding display area track the cursor motion. After each amendment to the tangent end point data in the table 5100, the same steps are taken as on stretching the tangent (described above).

Preferably, a selectable planar bending mode is provided in which the tangent at the end point of an armature connected to a joint is constrained to be movable only within the plane in which the angle of the joint (defined by the first two transformations shown in FIG. 36) lies (and preferably, the tangent of the other armature to which that armature is connected via the joint is likewise constrained). This mode is useful in realistically simulating bending at planar joints such as the human elbow or knee joints.

Another bending mode preferably provided enables the transition between armatures at a joint to appear smooth, by controlling the tangent end points of the two armatures interconnected by the joint so that the tangents defined thereby are colinear.

Inverse Kinematics

The paper "Interactive Real Time Articulated Figure Manipulation Using Multiple Kinematic Constraints" by Philips, Zhao and Badler, Siggraph 1990 Course Notes, and the paper "Real Time Inverse Kinematics with Joint Limits and Spatial Constraints" by Zhao and Badler, University of Pennysylvania, MS-C1S-89-90, both incorporated herein by reference, describe a method of articulating chains of joints connecting rigid segments towards a "goal". In these papers, and especially Appendix A of the latter, the algorithm for inverse kinematic convergence on the "goal" in space uses a function expressing the distance of the skeleton to the goal in space (more particularly, the distance from the "end effector" of the skeleton). The vector to the goal is calculated using the spatial transformations between the connection sites of the segments, and the distances calculated from this vector. The algorithm then iteratively produces a set of joint angles for the joints between the segments which minimise the distance of the goal.

An embodiment of the invention uses this technique to calculate the transformations in the table 2400 relating to the joints in the object as it moves towards a point in space determined by the user.

Particularly preferably, since the armatures described above are of variable length and curvature, the prior art technique is extended to allow for the stretching of the armatures in the direction of the "goal", by altering the evaluation of the function g(0) in the above referenced Appendix A.

Thus, when a chain of armatures is extended towards a goal by inverse kinematics, the armatures are allowed to lengthen in the direction of the goal, the amount of extension being determined by an adjustable parameter settable by the user, and the distance to the goal. Conversely, when a chain is articulated to contract towards a closer goal, the length of the armatures is contractable accordingly.

This embodiment is designed to produce the type of motion often observed in cartoon characters.

EDITING THE ENVELOPE

Creating a New Component

To create a new component, a new component table 5110 is created in the table 5000, and the user positions the cursor at the position of a desired armature in the display area 160ƒ or 160g. A reference to the new component table is then entered in the armature table, and vice versa. By default, the two end point position entries 5111, 5112 are set to zero and 1.0, so as to correspond to the end points of the armature.

A default section record is created, for example, having a position datum of 0.5 (i.e. halfway along the armature).

The process of FIG. 52 is then executed to create a new boundary table 2117 and the outline of the component is displayed in at least one of the display area 160ƒ, 160g.

The control points and tangents of the section may be set to any convenient predetermined value, and the computer 100 generates a display of the section in the display area 160h in the same manner as the two dimensional curves described above. The section may then be edited by the user to the desired shape (see below).

The computer 100 deletes the corresponding component table 5110 adjacent to which the cursor is positioned, and its corresponding boundary table 2117.

Editing a Section

Figure 61:
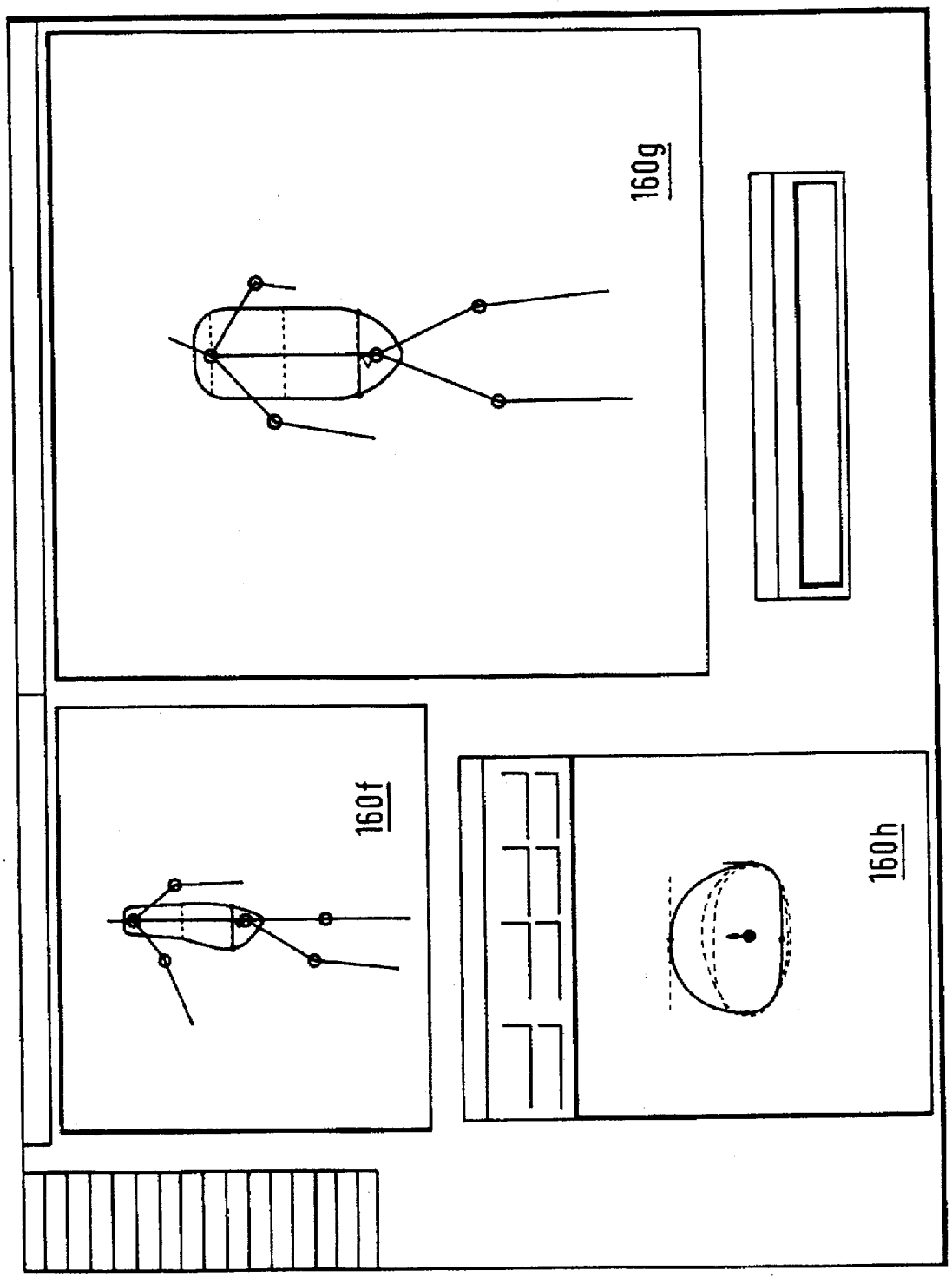
FIG. 61 shows an embodiment of the present invention, and shows the display on the monitor 160 when a section is edited.

Referring to FIG. 61, the section to be edited is selected by the user positioning the cursor device at a section in one of the views 160ƒ, 160g. The selected section is then displayed in the display area 160h, and symbols are displayed representing the control points and tangent end points held in the entry 5113 in the table 5110. By positioning the cursor at a desired point or tangent end point and then moving the cursor, the user causes the computer 100 to track the cursor position and amend the point position data held in the entry 5113 in the table 5110 to follow the cursor, exactly as described above, so as to alter the shape of the section.

After each amendment to the table 5110, the process of FIG. 52 is reexecuted for each of the display areas 160ƒ, 160g by constructing a separate outline table 2117a, 2117b for each view.

The effects upon the three dimensional object of changing a section are thus rapidly visualised, and in this interactive fashion the user can quickly design a desired three dimensional envelope for the object.

Adding a New Section

To increase the complexity, lengthways along the armature, the user may add a new section. The computer 100 reads the cursor position along the armature at which the user desires the new section, and derives a corresponding parametric distance between the end points of the armature. A new section record is opened in the table 5110 between the sections, or section and end point, where the new section is to be positioned.

In a first embodiment, the section control points and end points are created by copying those of the neighbouring section.

In a second embodiment, the control points are created by interpolating between the extent points of the neighbouring sections, in the outline table 2117 corresponding to each of the two viewing directions 160ƒ, 160g, or between a neighbouring section and a neighbouring end point.

The new section can then be edited, as above, to a desired shape.

Moving a Section Along the Armature

The user moves the cursor along the armature, and the position of the cursor is tracked and the section position corresponding incremented or decremented to follow the cursor. No change for the control point data defining the perimeter curve of the section is made.

Moving a Component

Exactly the same process is performed, but all the position values for each section and the end points in the table 5110 are amended. If the end point or sections are moved beyond the armature end points, motion continues along the projected tangents.

As before, the outline tables 2117 are updated at each change to the table 5110, so that the user can view the effects of a given amendment.

Editing the Outline Curve

The set of outline curves defined by the table 2117 for each component together comprise a two dimensional projection of the three dimensional figure into a given viewing direction corresponding to a display area 160*f* or 160*g*. They may directly be edited, using the two dimensional editing techniques referred to above, to add an extra curve control point into the table 2117 or to add an attribute control point. Any extra curve control points added are deleted from the table when it is reconstructed after editing any other part of the arch or component, but attribute control points are retained. As above, the entry for each attribute control comprises a parametric position on the outline curve, between a pair of curve control points thereof in the table 2117, and a value of the attribute thereat.

For a general discussion of the attributes, our above referenced copending U.S. Pat. No. 5,611,036. is incorporated herein by reference.

Figure 62B:
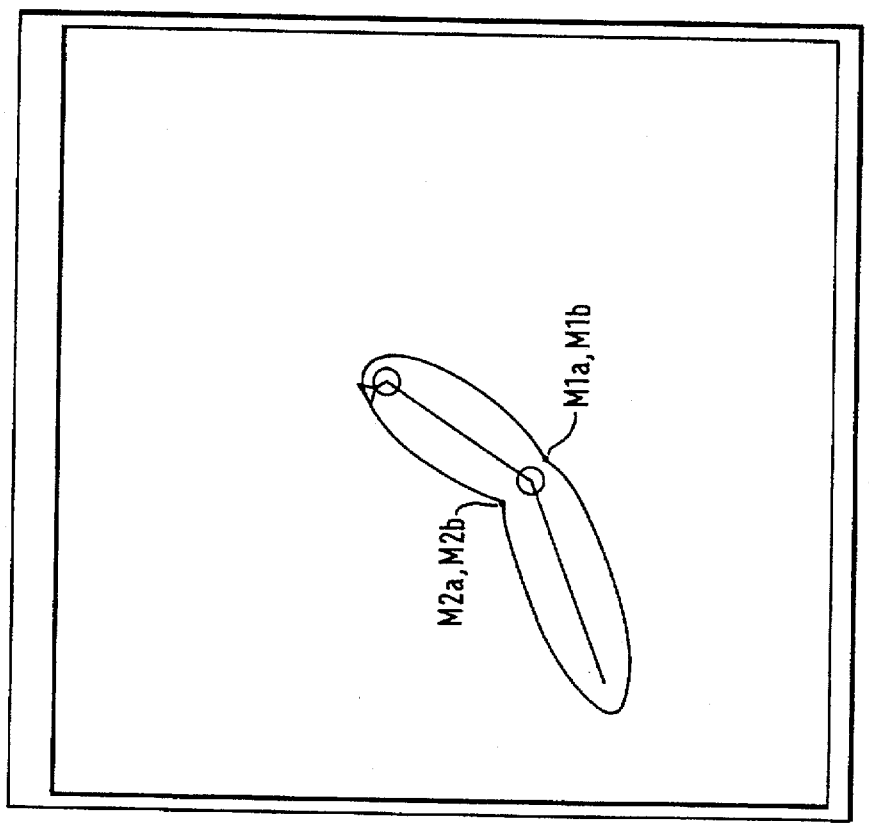
FIGS. 62a and 62b show an embodiment of the present invention, and illustrate overlap of components at a joint.
Figure 62A:
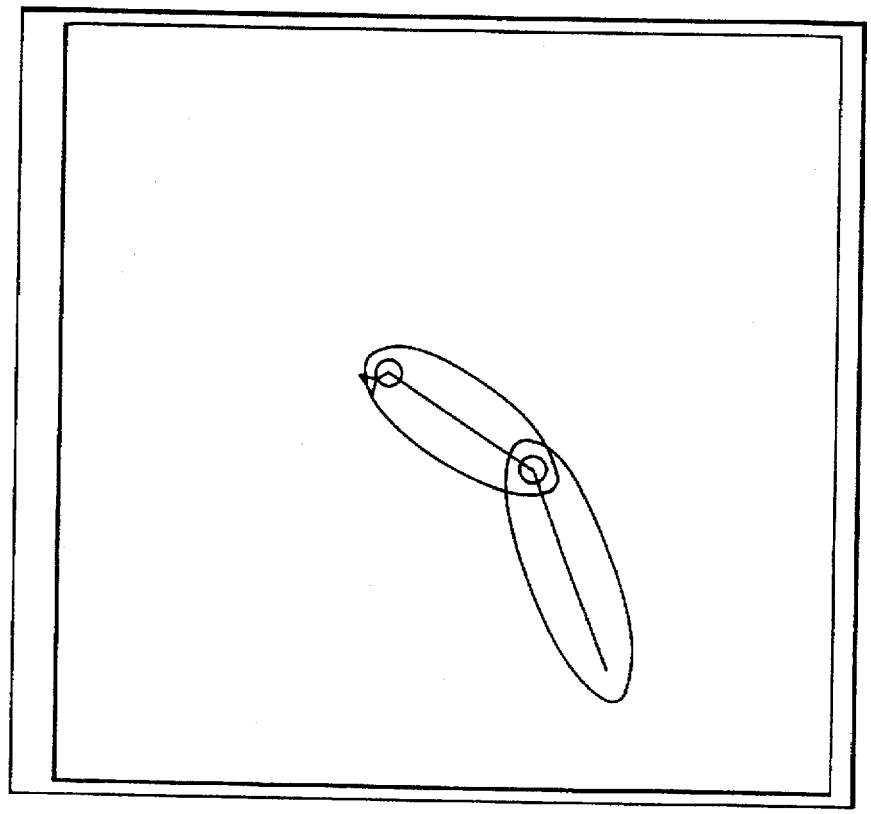

Referring to FIG. 62, it will be noted that where two armatures are joined, their envelope components may overlap as shown in FIG. 62*a*. Accordingly, to cause the overlapping portions of the outline curves not to be displayed, an attribute control point is added by the user on each of the curves, for example at the point where the curves intersect (M1a, M2a on the first curve and M1b, M2b on the second curve in FIG. 62*b*) or at some other point. The opacity value at each attribute control point is set to zero, so that the overlapping sections of each boundary curve are rendered invisible when displayed on the display areas 160*f*, 160*g*, in the manner described in the above referenced copending U.S. Pat. No. 5,611,036.

Alternatively, the set of tables 2117 for all the components may be stored in, or converted to, the format of a key frame table 122 in the first aspect, and edited as described above in reference thereto.

Bending Components

Figure 40A:
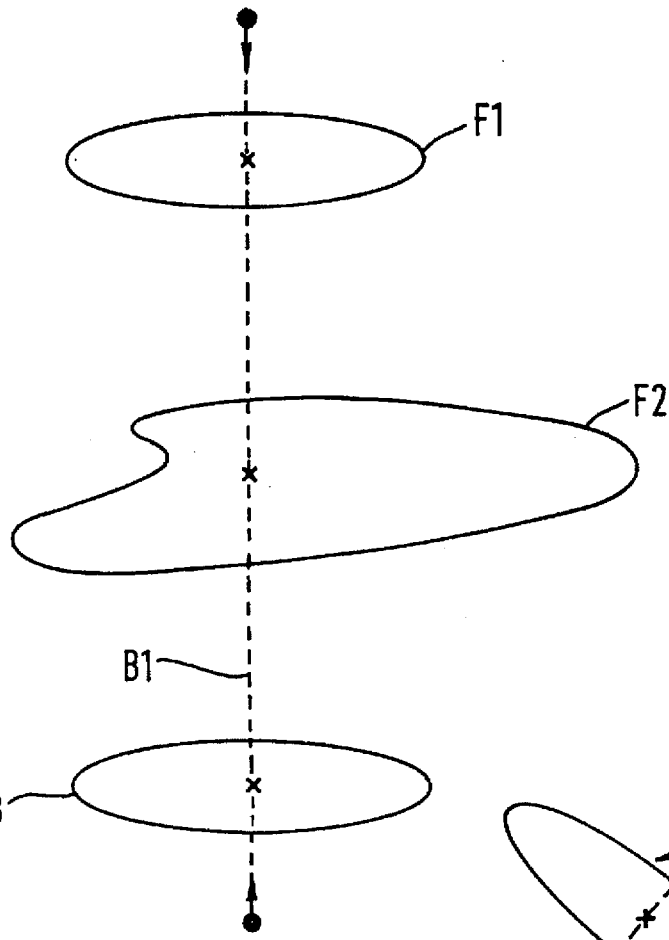
FIG. 40a shows an embodiment of the present invention, and shows diagramatically disposition of sections about an armature forming a part of the model of FIG. 38 or FIG. 35.
Figure 40B:
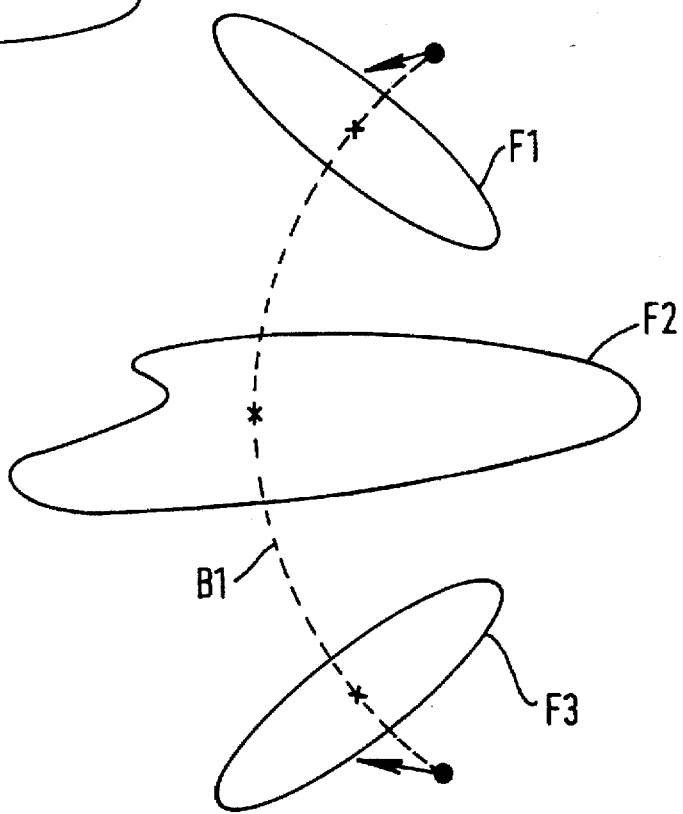
FIG. 40b shows an embodiment of the present invention, and illustrates diagramatically the effects of bending the armature on the disposition of the sections.

As shown in FIG. 40*a* and 40*b*, when the armature is bent (as described above), the shapes of the cross sections remain unchanged as do their proportionate distances along the armature. Thus, none of the data in the component table 2110 need be amended when the armature is bent; the only step necessary is to recalculate the perimeter curves by the process of FIG. 52 as described above.

Figure 63:
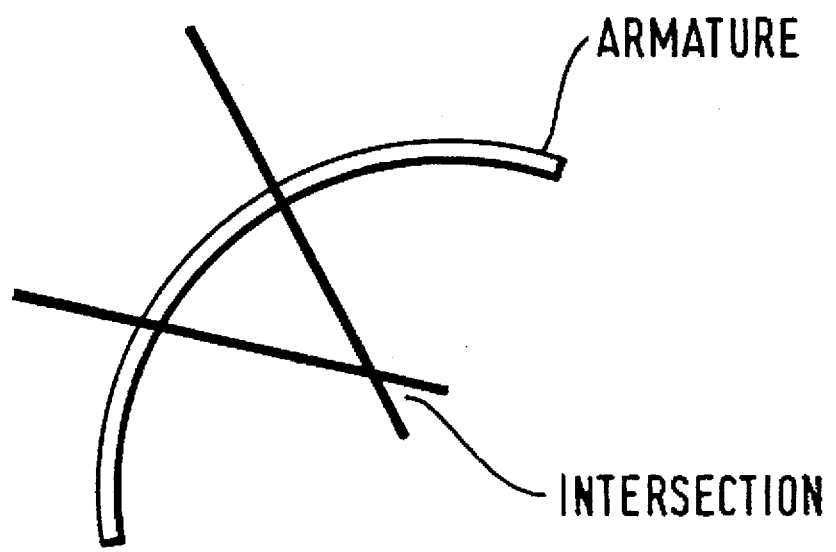
FIG. 63 shows an embodiment of the present invention, and illustrates a potential overlap of sections when an armature is bent.

Referring to FIG. 63, in extreme cases of bending of the armature, the projected extent points of the sections may intersect. This causes some difficulty in following the procedure of FIG. 52, since the points in the table 2117 are now ordered to define a reentrant curve. Although this problem may not occur in practice, preferred embodiments provide means for overcoming it for example in one of the following ways:

(1) Interchange the order of the two extent points concerned in the table 2117. This produces a smooth curve around the intersection.

(2) As (1) above, but add a further control point at the intersection, with tangents such as to provide an acute angle. This provides a "crease" effect, as for example at the rear side of the human knee.

(3) Replace both extent points by a single point at the intersection, or at the average between them.

Rendering

Figure 64:
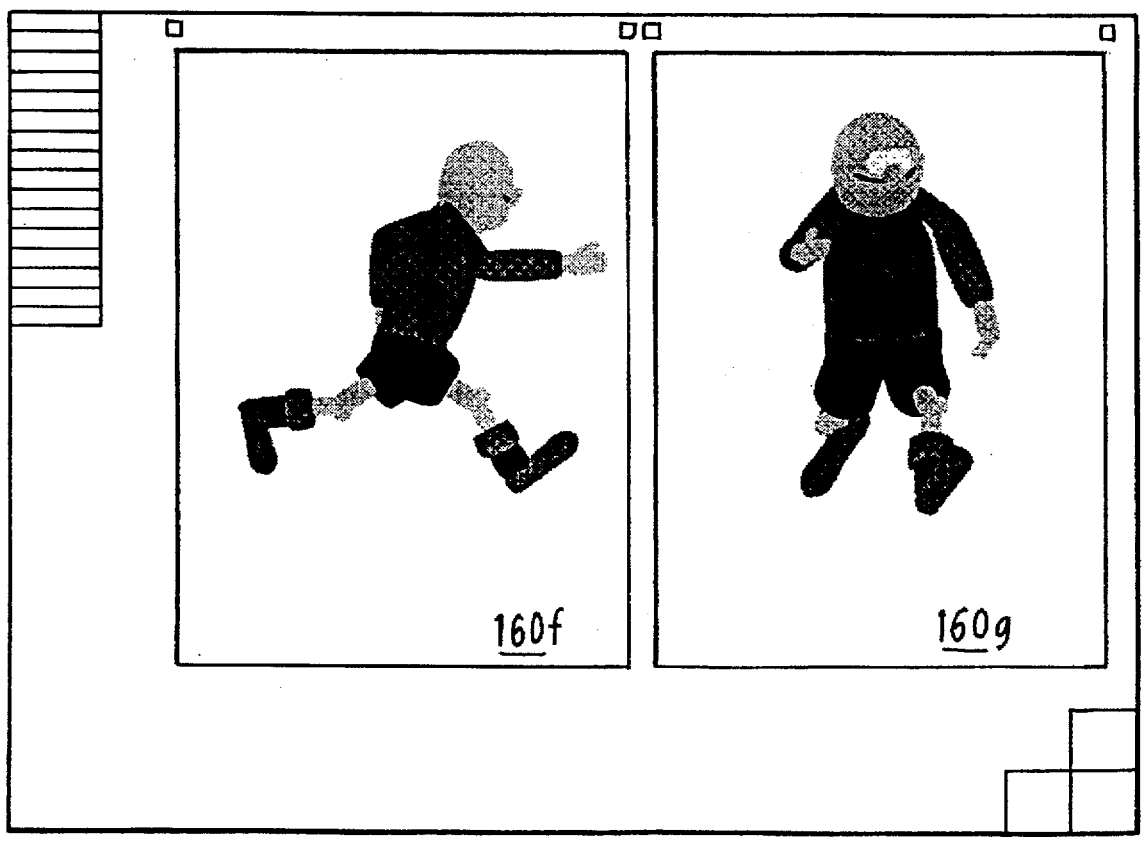
FIG. 64 shows an embodiment of the present invention, and shows the appearance on the monitor 160 of an object with depth-dependant colouring.

The outline curves generated, for each component, using the process of FIG. 52 may be rendered for example by filling in each curve with a predetermined colour set by the user and stored associated with the corresponding component table 2117. To perform hidden surface removal, the rendering is preferably by filling each outline curve in turn in depth order, so that the closest to the viewing angle overwrite the furthest away. Accordingly, when each end point of each component is projected into the viewing plane as described above, the z or depth value also produced by the transformation may be stored with the outline table 2117, so that the components can be coloured in order of decreasing z component for each view, as shown in FIG. 64.

Two Dimensional Animation

Figure 65:
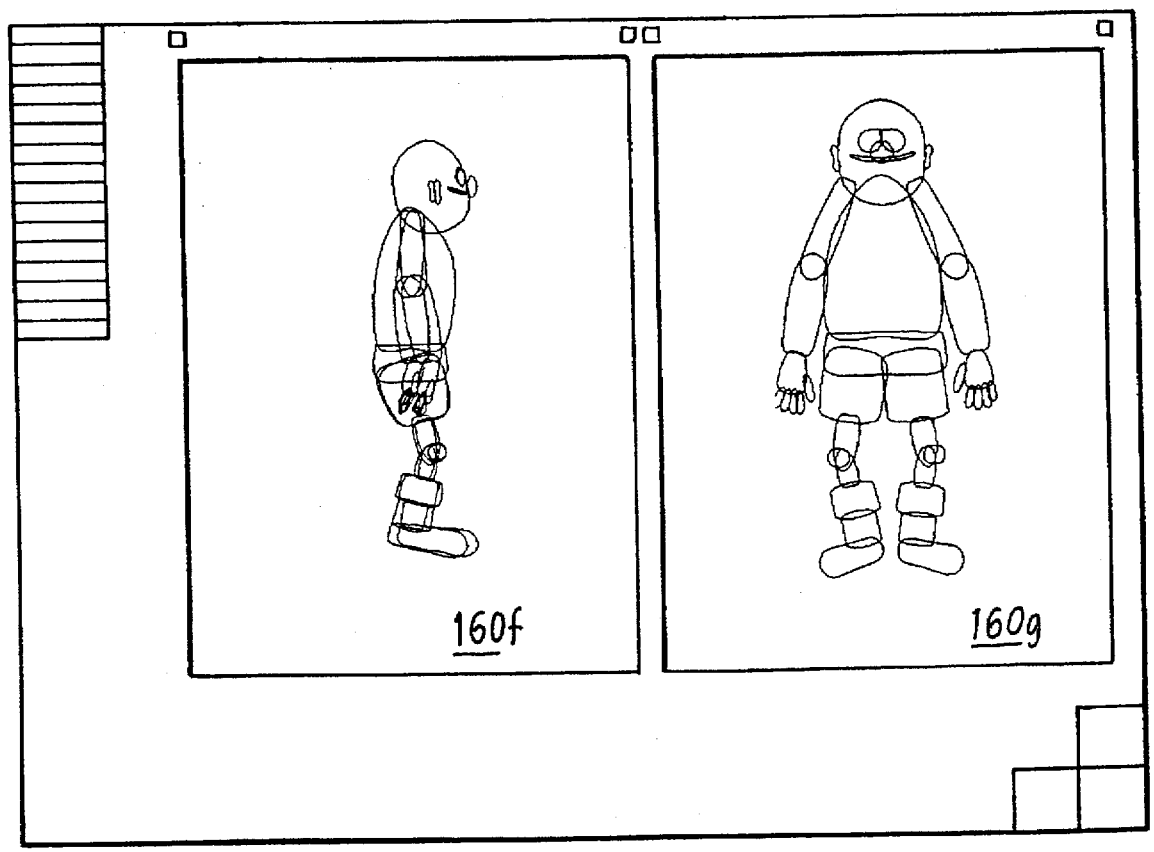
FIG. 65 shows an embodiment of the present invention, and shows the appearance on the monitor 160 of the outlines of an object.

The above described three dimensional character modelling system can be used, as described, to create outline curves in any desired viewing direction of a jointed object (for example a cartoon character) and to pose and edit the character. FIG. 65 shows the set of outline curves, each described by two cloensional closed curve control point data held in a table 2117, which are generated thereby.

Preferably, this aspect of the invention is combined with the earlier described two dimensional interpolation and animation system forming the first aspect of the invention, so that this set of closed curves can simply be used as a template 122 for two dimensional interpolation.

Because the number of components and armatures is the same in each view, in many cases, two different sets of outline curves derived from the same figure will include corresponding component outline curve tables 2117 in each case, and consequently two dimensional interpolation as described above from one to the other will be possible. This is not always the case, however, because as described with reference to FIG. 57, a component outline curve may include extra curve control points when the component is viewed end on. However, it is possible to make the two curve sets compatible as described in the first aspect of the invention.

Three Dimensional Interpolation

An embodiment of this aspect of the invention for performing three dimensional interpolation is arranged to store a table 5000 containing the data for a character as a three dimensional template table for that character, typically in the mass storage device 180. The position and proportions of the character which are selected to define the template table are a matter of choice for the user, but it is generally convenient to select a position at which each rotation at each joint is at an intermediate position; equally, it may be convenient to select a visually meaningful position such as a standing position for a humanoid character.

The template table having been stored, a copy of the table 5000 is retained in the memory 121, and the contents are amended as the user moves, poses or edits the figure.

To perform three dimensional interpolation, the user manipulates the object into a first position, and allocates (inputs) a frame or time slot number for that first position. The computer 100 then reads the table 5000, subtracts from the coordinates of each point therein the coordinates of the corresponding template point read from the stored template table, and stores the difference coordinates in a first object difference table. For the transformations relating to the joints, held in the table 5400, the angular difference from the transformation in the template table is likewise calculated and stored in the difference table.

Figure 66:
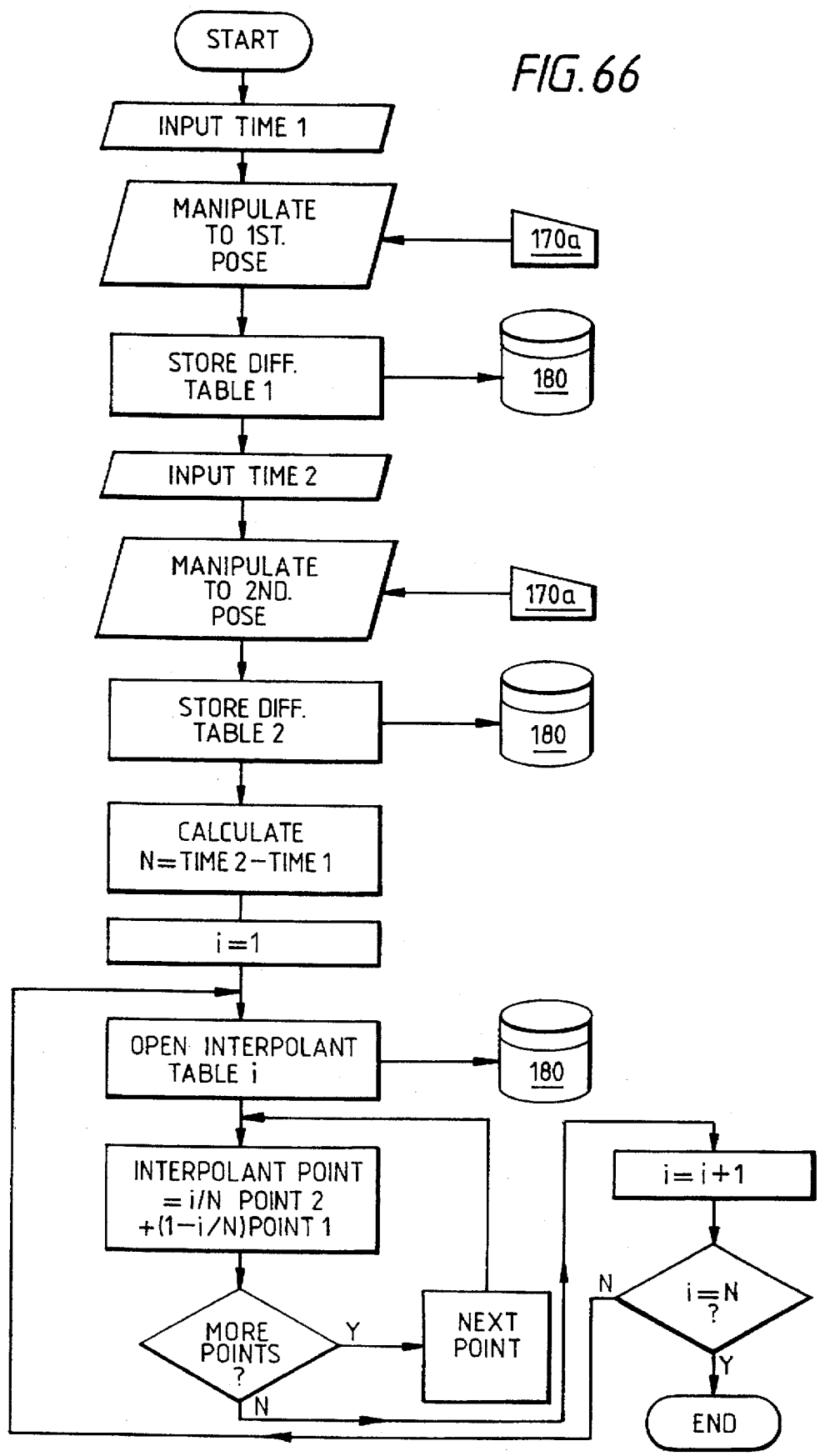
FIG. 66 shows an embodiment of the present invention, and is a flow diagram of the process of three dimensional interpolation.

Accordingly, the first difference table thus derived defines the deviation of the first version of the object, corresponding to the first time slot from the template; it is then stored together with the first time slot number, as shown in FIG. 66.

The user then manipulates the object into a second position. He can also edit the armature control point data and component data values which are held in the table 5000. The user then inputs a second frame or time slot number for the second object to pose, and the computer derives for each point and transformation in the current object table 5000 in memory 121, the difference from the template table, and stores the difference values as a second difference table.

Next, the computer counts the number of intervening frames or time slots between the two specified by the user, and opens a corresponding number of interpolant tables in the memory 121 containing an identical number and arrangement of entries to the template table. Each entry in each of the interpolant tables is derived by (for example, linear) interpolation between the two stored tables, so that, for example, if there 8 intervening interpolated tables, each value in the first interpolated table is derived as 0.1 times the second stored table and 0.9 times the first, and so on for the second (for linear interpolation). The principle is exactly analogous to the two dimensional interpolation discussed in the first aspect of the invention.

After each interpolated difference value has been calculated for each interpolated table, the corresponding value is added back from the stored template table and the cumulative transformation table 4000 for each interpolated table is constructed. Each interpolated pose may then be displayed in turn on monitor 160 from a given view angle in an animated sequence by constructing the outline tables 2117 for all components of each in turn at a repetition rate of 5–30 frames per second.

One particularly advantageous mode of employment of the apparatus is in allowing the user to create key poses of a given figure, and then interpolate, in three dimensions, a sparse number of intervening poses. The outline curve sets thus derived are then stored as template or key frame files for use by the two dimensional animation process of the first aspect described above, which generates further interpolated frames. In this manner, the distortions which can arise when long sequences of interpolated two dimensional frames are generated, are avoided.

Combining Different Object Poses

Since each armature (and its associated envelope component data) is defined in its own reference space, if two differently edited versions of the same three dimensional object are held as two tables corresponding to a stored template table 5000, each having equivalent data entries for equivalent armature and component control points, a corresponding pair of difference tables are calculated as above. The two are added together pointwise to produce a composite figure having the characteristics of both, in exactly the same way as described above for the first aspect of the invention for claims of corresponding time lines from the same template.

Accordingly, it is possible for different animators or artists to work on different parts of the same character, and to combine the results.

To achieve this, a new composite object table 5000 is opened in the memory 121, with an entry corresponding to each entry present in the template table and hence, both the two tables from which the composite object is to be produced.

Each entry in the composite is then generated by adding together the corresponding entries from the two difference tables (or, if desired, adding predetermined proportions thereof), in just the same way as in interpolation above, and then adding back the corresponding template table entry.

The operations of interpolation and creating composite object poses are thus seen to be equivalent to those in the two dimensional aspect of the invention. In a preferred embodiment of the second aspect, each armature table and/or component table is arranged to be able to store attribute control points comprising a parametric position along the armature or boundary curve and a flag indicating whether or not the control point is active; as before, when the flag is changed by the user, the computer 100 is arranged to treat the point as a new control point. In the event that the point is on an armature, the computer 100 is arranged to create a new armature table and tranformations relating to a joint, and to split the existing armature at the new control point and to provide a new joint with transformations set initially to zero rotations, to allow the armature to be subsequently edited around the joint by the user.

In this way, exactly as in the two dimensional case, the user can increase the complexity of a three dimensional object where desired, and can interpolate between, or add together, two three dimensional objects having different degrees of complexity by providing a template which has dormant curve control points of this type.

FURTHER ASPECTS AND EMBODIMENTS

Multiple Objects

In a preferred embodiment of the invention, preferably the computer 100 is arranged to be able to accept a plurality of concurrent object tables 5000a, 5000b . . . within the working memory 121, each defining a different object. Associated with each object is a cumulative transformation table 4000, and all objects are or may be concurrently displayed, each in the manner already described, so that the animator can compose a scene of several objects or characters at different spatial positions.

Libraries

In a preferred embodiment of the invention, the computer 100 is arranged to read from the mass storage device 180 predefined object tables providing a basis for further editing, or to be combined into a composite object as described above. For instance, it is convenient to provide a humanoid skeleton of the type shown in FIG. 35, as many animated cartoon characters are based on such a skeleton.

Equally, a plurality of stored object tables corresponding to different poses of an object derived from a common template may be provided, so as to provide stock animated sequences for walking, for example. Such tables are preferably stored as difference tables. Advantageously, only the armatures are stored; in this embodiment, the computer 100 is arranged to combine these stored armature difference tables with a template defining an object including a set of components, so as to produce an object in which the armature motion is dictated by the prestored poses but the components are provided by the particular object of interest. In this manner, a cartoon character can be created (for example the rabbit in FIG. 38) and animated by referring to prestored humanoid armatures describing predetermined motion sequences such as walking.

These library techniques are made straightforward in the preferred embodiments by the use of small volumes of control data, the feature that separate paths of the object are defined in a local space, and the feature that object tables are stored as differences from a common, predetermined pose; each of these features contribute singly and in contribution.

Likewise, libraries of components may be provided, and read from the mass storage device to be added to a desired armature.

This use of libraries, firstly for storing given poses and versions of a single cartoon character (for example), and secondly for storing sequences of poses which are generic to the number of characters (for example, walking sequences) are of great value in reducing the time and effort necessary in producing animated sequences.

Other Details

It will be understood that the features of time line displays described in relation to the first aspect are equally applicable to the second. The same applies to other details of the first aspect, mutatis mutandis.

We claim:

1. Apparatus for generating a sequence of pictures for animation, the apparatus comprising:

a store for storing picture data defining first and second key pictures, each said key picture including an object represented by a plurality of lines, each said line being defined by a plurality of control points, wherein a first line in the first key picture is comprised of a first number of control points and a second line in the second key picture corresponding to the first line is comprised of a second number of control points, the second number being greater than the first number, said picture data comprising fine data defining said plurality of lines, said line data comprising control point data defining said plurality of control points;

said control point data further comprising data defining at least one attribute point, said attribute point having a position relative to said first line of said first key picture, but said attribute point not being one of the plurality of control points defining said first line; and an interpolator for reading the picture data of said first key picture and said second key picture, and for generating therefrom intervening picture data defining one or more intervening pictures for inclusion in said sequence between said first and second key pictures, said intervening picture data being generated in accordance with a topological correspondence which identifies, (a) for each control point of said first key picture, one corresponding control point of said second key picture, and (b) for each said attribute point, one of the plurality of control points in said second key picture.

2. Apparatus according to claim 1 wherein said position of said attribute point is on said first line, and wherein the interpolator determines said position by reference to the control point data which defines the plurality of control points which define the first line.

3. Apparatus according to claim 1 wherein at least some of said lines are outlines of said object.

4. Apparatus according to claim 3 wherein the picture data includes color data specifying a color of the object, and wherein the apparatus includes a color interpolator for generating interpolated color values for display between the outlines in accordance with said color data.

5. Apparatus according to claim 3 wherein the picture data includes transparency data specifying a transparency of the object, and wherein the apparatus includes a transparency interpolator for generating interpolated transparency values for display between the outlines in accordance with said transparency data.

6. Apparatus according to claim 1 wherein said picture data includes three-dimensional data defining three-dimensional properties of said lines, and wherein said intervening pictures are generated in dependence upon said three-dimensional data.

7. Apparatus according to claim 1, wherein the interpolator comprises means for generating the intervening picture data by (a) interpolating between each control point of said first key picture and the corresponding control point in said second key picture and (b) interpolating between each attribute point and the corresponding control point the second key picture in accordance with said topological correspondence.

8. Apparatus according to claim 1 further comprising a sequence editor for selecting one of said key pictures as a selected key picture and selecting one of said control points of said selected key picture as a selected control point and modifying the picture data defining said selected key picture so as to modify said object as represented in said selected key picture, said sequence editor comprising:

a picture selector operable to identify one of said key pictures as a selected key picture;

display generator for generating a display including the selected key picture;

a line selector operable to identify a line of the selected key picture in said display as a selected line;

a line editor operable to select one of the control points of the selected line in the display and cause movement thereof independent of other control points of said selected line, and further operable to modify the control point data within the store for said desired one of the control points in accordance with said movement so as to display said selected key picture with a changed appearance.

9. Apparatus according to claim 8, wherein said sequence editor further comprises a picture converter for selecting an intervening picture and causing the apparatus to store said intervening picture data as data defining a new key picture.

10. Apparatus according to claim 8, wherein said sequence editor further comprises a correspondence editor for amending said topological correspondence.

11. Apparatus according to claim 8, wherein said sequence editor further comprises a control point converter for converting said attribute point into a control point which defines the first line.

12. Apparatus according to claim 8, wherein said line editor further comprises means for changing said position of said attribute point.

13. Apparatus according to claim 8, further comprising:

a template generator for generating picture data defining a template picture in which each control point and each attribute point in each key picture of said sequence corresponds topologically to a corresponding one of a control point and an attribute point in the template picture; and at template store for storing said template picture.

14. Apparatus according to claim 13 further comprising a line editor for selecting the said line defined by said selected control point and editing the selected line by adding further control point data to the control point data defining the selected line, and wherein the template generator automatically causes a corresponding amendment in the picture data defining the template picture.

15. Apparatus according to claim 13 in which each control point in a key picture has a position in the key picture and each control point in the template picture has a position in the template picture, and wherein said store stores the position of each control point in a key picture as a difference between the position in the key picture and the position of the corresponding control point in the template picture.

16. Apparatus according to claim 8, further comprising:

a sequence store for storing time position data defining a time position in the sequence for each key picture.

17. Apparatus according to claim 16 wherein said sequence editor further comprises:

a picture selector for selecting said selected key picture;

a display generator for generating a display including said selected key picture;

a line editor for selecting said selected control point, for causing movement of said selected control point independent of other control points, and for modifying the control point data within the store for said selected control point in accordance with said movement so as to display said selected key picture with a changed appearance.

18. Apparatus according to claim 17 wherein said line editor comprises position sensitive input means for manually interacting with said display generator.

19. Apparatus according to claim 17 in which said display further includes a bar chart display providing a bar corresponding to each key picture and a bar corresponding to each intervening picture in the sequence, each bar having a position in a first direction across the display in accordance with the time position in the sequence of the corresponding picture.

20. Apparatus according to claim 19 in which said sequence editor further comprises means for selecting and manipulating a bar in said bar chart display and amending the time position of a key picture in said sequence in response thereto.

21. Apparatus according to claim 20 in which said sequence editor further comprises means for amending together the time positions of a plurality of pictures of the sequence.

22. Apparatus according to claim 19 wherein said intervening picture data for each intervening picture comprises control point data defining a plurality of control points defining a plurality of lines in each said intervening picture, and is generated by interpolating between the control point data of each of said first and second key pictures, with reference to said topological correspondence, in respective proportions determined by an interpolation ratio related to the time position of each said intervening picture relative to the time positions of said first and second key pictures, and wherein each bar corresponding to each said intervening picture has a length representing said interpolation ratio, and wherein the sequence editor further comprises means for amending the interpolation ratio for said intervening pictures in response to an operator amending the length of the corresponding bar on said bar chart display.

23. Apparatus according to claim 17 wherein the display generator further comprises means for displaying a plurality of pictures of the sequence.

24. Apparatus according to claim 23 wherein each picture of said plurality of pictures is displayed at a location on the display displaced in accordance with its time position in the sequence.

25. Apparatus according to claim 24 wherein said plurality of pictures are displayed so as to overlap.

26. Apparatus according to claim 24 wherein said plurality of pictures are displayed superimposed.

27. Apparatus according to claim 23 wherein said plurality of pictures are displayed so that key pictures and intervening pictures are displayed together in different visual styles, such that an operator can readily distinguish which pictures are key pictures.

28. Apparatus according to claim 23 wherein said plurality of pictures are displayed as an animated sequence over a period of time.

29. Apparatus according to claim 17 further comprising a sequence combiner for temporally merge picture data generated for each of a plurality of different sequences so as to generate a merged picture sequence.

30. Apparatus according to claim 29 wherein said sequence combiner generates said merged sequence by merging all but a selected one of said plurality of sequences, and wherein said display generator displays said merged sequence while said step of editing is performed.

31. Apparatus according to claim 16, wherein said intervening picture data for each said intervening picture comprises control point data defining a plurality of control points defining lines of each said intervening picture, and is generated by interpolating between the control point data of each of said first and second key pictures, with reference to said topological correspondence, in respective proportions determined by an interpolation ratio related to the time position of each said intervening picture relative to the time positions of said first and second key pictures.

32. Apparatus according to claim 31 wherein said interpolation ratio is linearly proportional to the time position of the intervening picture relative to the time positions of said first and second key pictures.

33. Apparatus according to claim 31 wherein said interpolation ratio is sigmoidally proportional to the time position of each said intervening picture relative to the time positions of said first and second key pictures.

34. Apparatus according to claim 31 further comprising means for setting said interpolation ratio to exceed unity.

35. Apparatus according to claim 31 wherein said sequence editor further comprises means for amending the interpolation ratio for at least one intervening picture.

36. Apparatus according to claim 35 wherein said sequence editor further comprises means for amending the interpolation ratio independently for each intervening picture.

37. A method for generating a sequence of pictures for animation, the method comprising:

providing a first key picture and a second key picture, each said key picture including an object defined by a plurality of lines, each said line being defined by a plurality of control points, wherein a first line in the first key picture is comprised of a first number of control points and a second line in the second key picture corresponding to the first line is comprised of a second number of control points, the second number being greater than the first number, storing, in a store, picture data representing said first and second key pictures, said picture data comprising line data representing said plurality of lines, said line data comprising control point data defining said plurality of control points, said control point data further comprising data representing an attribute point, said attribute point having a position relative to said first line of said first key picture, but said attribute point not being one of the plurality of control points defining said first line, said picture data defining a topological correspondence to identify (a) a corresponding control point in said second key picture for each control point of said first key picture and (b) for each said attribute point, one of the plurality of control points of said second key picture; and interpolating an intervening picture for inclusion in said sequence between said first and second key pictures, said interpolating comprising generating intervening picture data representing said intervening picture by using said picture data of said first and second key picture in accordance with said topological correspondence.

38. A method according to claim 37 wherein said attribute point has a position on said first line, and wherein said interpolating step further comprises determining said position of said attribute point by reference to the control point data which represents the plurality of control points defining said first line.

39. A method according to claim 37 wherein at least some of said lines are outlines of at least one said object.

40. A method according to claim 39 wherein said picture data includes color data specifying a color of said at least one object, and wherein said method further comprises the step of generating interpolated color values for display between the outlines in accordance with said color data.

41. A method according to claim 39 wherein said picture data includes transparency data specifying a transparency of said at least one object, and wherein said method further comprises the step of generating interpolated transparency values for display between the outlines in accordance with said transparency data.

42. A method according to claim 37 wherein said picture data includes three-dimensional data defining three-dimensional properties of said lines, and wherein said step of generating data defining intervening pictures further comprises generating said data dependent upon said three-dimensional data.

43. A method according to claim 37, wherein the step of interpolating an intervening picture comprises generating the intervening picture data by (a) interpolating between each control point of said first key picture and the corresponding control point in said second key picture and (b) interpolating between, each attribute point and the corresponding control point of the second key picture in accordance with said topological correspondence.

44. A method according to claim 37, further comprising the step of:
editing said sequence try selecting one of said key pictures as a selected key picture and selecting one of said control points of said selected key picture as a selected control point and modifying the picture data defining said selected key picture so as to modify said object as represented in said selected key picture.

45. A method according to claim 44, wherein said editing step further comprises storing said intervening picture data as picture data defining a new key picture.

46. A method according to claim 44, wherein said editing step further comprises converting said attribute point into a control point which defines the first line.

47. A method according to claim 44, wherein said editing step further comprises changing said position of said attribute point.

48. A method according to claim 44, further comprising the step of generating picture data defining a template picture in which each control point and each attribute point in each key picture corresponds topologically to a corresponding one of a control point and an attribute point in the template picture and the step of storing said template picture in a template store.

49. A method according to claim 48 wherein said editing step further comprises adding additional control point data to the control point data defining the selected key picture and automatically causing a corresponding amendment in the picture data defining the template picture.

50. A method according to claim 48 in which each control point in a key picture has a position in the key picture and each control point in the template picture has a position in the template picture, and wherein said step of storing further comprises storing the position of each control point in a key picture as a difference between the position in the key picture and the position of the corresponding control point in the template picture.

51. A method according to any of claims 37 or 38–49 further comprising the step of recording said sequence of pictures in a storage medium for subsequent display as a motion picture.

52. A method according to claim 44, further comprising the step of temporally merging picture data generated for each of a plurality of different sequences so as to generate a merged picture sequence.

53. A method according to claim 52 wherein said step of temporally merging comprises generating a merged sequence by merging all but a selected one of said plurality of sequences, and further comprising displaying said merged sequence on a display while said step of editing is performed so as to edit said selected one of said sequences.

54. A method according to claim 44, wherein said step of selecting comprises generating a display including the selected key picture and identifying a line of the selected key picture in said display as a selected line, and said step of modifying comprises moving said selected control point independent of other control points of said selected line and modifying said control point data defining said selected control point in accordance with said movement and displaying said selected key picture with a changed appearance.

55. A method according to claim 44, further comprising amending said topological correspondence.

56. A method according to claim 44, further comprising the step of
storing time position data in a sequence store, said time position data defining a time position in said sequence for each said key picture.

57. A method according to claim 56, wherein said intervening picture data for each said intervening picture comprises control point data defining a plurality of control points defining lines of each said intervening picture, and is generated by interpolating between the control point data of each of said first and second key pictures, with reference to said topological correspondence, in respective proportions determined by an interpolation ratio related to the time position of each said intervening picture relative to the time positions of said first and second key pictures.

58. A method according to claim 56, wherein said editing step further comprises displaying a display including a bar chart providing a bar corresponding to each key picture and a bar corresponding to each intervening picture, each bar having a position in a first direction across the display in accordance with the time position of the corresponding picture.

59. A method according to claim 56, wherein said editing step further comprises displaying a plurality of pictures of the sequence in a display.

60. A method according to claim 57 wherein said interpolation ratio is linearly proportional to the time positions of said first and second key pictures.

61. A method according to claim 57 wherein said interpolation ratio is sigmoidally proportional to the time position of the intervening picture relative to the time positions of said first and second key pictures.

62. A method according to claim 59 wherein said interpolation ratio exceeds unity.

63. A method according to claim 59 wherein said editing step further comprises amending the interpolation ratio for said intervening picture.

64. A method according to claim 63 wherein said amending step further comprises amending the interpolation ratio independently for each intervening picture.

65. A method according to claim 59 wherein said interpolating step further comprises interpolating a plurality of intervening pictures, each said intervening picture having a different time position in said sequence.

66. A method according to claim 58 wherein said editing step further comprises selecting and manipulating a bar in said bar chart display and amending the time position of one of said key pictures in response to said manipulation.

67. A method according to claim 66 wherein said editing step further comprises amending together the time positions of a plurality of pictures of the sequence.

68. A method according to claim 58 wherein said intervening picture data comprises control point data defining a plurality of control points which define a plurality of lines in the intervening picture, wherein said time position data defines a time position for said intervening picture, wherein said interpolating step further comprises determining the control points of said intervening picture in accordance with an interpolation ratio, said interpolation ratio being proportional to the time position of the intervening picture relative to the time positions of said first and second key pictures, and wherein each bar corresponding to each intervening picture has a length representing said interpolation ratio, and wherein said editing step further comprises amending the interpolation ratio for an intervening picture in response to an operator amending the length of the corresponding bar on the bar chart display.

69. A method according to claim 59 wherein said step of displaying further comprises displaying each of said plurality of pictures at a location dependent upon the time position of said each of said plurality of pictures.

70. A method according to claim 69 wherein said plurality of pictures are displayed so as to overlap.

71. A method according to claim 59 wherein said plurality of pictures are displayed superimposed.

72. A method according to claim 59 wherein said step of displaying a display comprises displaying said plurality of pictures so that key pictures and intervening pictures are displayed together in different visual styles to distinguish said key pictures from said intervening pictures.

73. A method according to claim 59 wherein said step of displaying a display further comprises displaying said plurality of pictures as an animated sequence over a period of time.

74. A computer-useable medium having computer-readable instructions stored therein for causing a processor in a computer animation apparatus to generate a sequence of pictures for animation, the instructions comprising instructions for;
 causing the processor to provide a first key picture and a second key pictures, each said key picture including an object defined by a plurality of lines, each said line being defined by a plurality of control points, wherein a first line in the first key picture is comprised of a first number of control points and a second line in the second key picture corresponding to the first line is comprised of a second number of control points, the second number being greater than the first number,
 causing the processor to store, in a store, picture data representing said first and second key pictures, said picture data comprising line data representing said plurality of lines, said line data comprising control point data defining said plurality of control points, said control data further comprising data representing an attribute point, said attribute point having a position relative to said first line of said first key picture, but said attribute point not being one of the plurality of control points defining said first line,
 said picture data defining a topological correspondence to identify (a) a corresponding control point in said second key picture for each control point of said first key picture and (b) for each said attribute point one of the plurality of control points of said second key picture; and
 causing the processor to interpolate an intervening picture for inclusion in said sequence between said first and second key pictures, said interpolating comprising generating intervening picture data representing said intervening picture by using said picture data of said first and second key pictures in accordance with said topological correspondence.

75. A computer-useable medium according to claim 74 wherein the instructions for causing the processor to provide a first key picture and a second key picture cause the processor to provide said attribute point with a position on said first line, and wherein said instructions for causing the processor to interpolate an intervening picture further comprise instructions for causing the processor to determine said position of said attribute point by reference to the control point data which represents the plurality of control points defining said first line.

76. A computer-useable medium according to claim 74 further comprising instructions for causing the processor to allow a user to convert said attribute point into a control point which defines the first line.

77. A computer-useable medium according to claim 74 further comprising instructions for causing the processor to allow a user to move said attribute point.

78. A computer-useable medium according to claim 74 further comprising instructions for causing the processor to generate picture data defining a template picture in which each control point and each attribute point in each key picture corresponds topologically to a corresponding one of a control point and an attribute point in the template picture and instructions for causing the processor to store said template picture in a template store.

79. A computer-useable medium according to claim 74 further comprising instructions for causing the processor to add additional control point data to the control point data defining a selected key picture and to automatically cause a corresponding amendment in the picture data defining the template picture.

80. A computer-useable medium according to claim 74, wherein the instructions for causing the processor to interpolate an intervening picture cause the processor to generate the intervening picture data by (a) interpolating between each control point of said first key picture and the corresponding control point in the second key picture and (b) interpolating between each attribute point and the corresponding control point of the second key picture in accordance with said topological correspondence.

81. Apparatus for generating a sequence of pictures for animation, the apparatus comprising:
 a store for storing picture data defining first and second key pictures, each said key picture including an object represented by a plurality of lines, each said line being defined by a plurality of control points, wherein a first line in the first key picture is comprised of a first number of control points and a second line in the second key picture corresponding to the first line is comprised of a second number of control points, the second number being greater than the first number;
 said picture data comprising line data defining said plurality of lines,
 said line data comprising control point data defining said plurality of control points;
 an interpolator for reading the picture data of said first key picture and said second key picture, end for generating therefrom intervening picture data defining one or more intervening pictures for inclusion in said sequence between said first and second key pictures, said intervening picture data being generated in accordance with a topological correspondence which identifies one corresponding control point of second key picture for each control point of said first key picture; and a sequence editor for selecting one of said key pictures as a selected key picture and selecting one of said control points of said selected key picture as a selected control point and modifying the picture data defining said selected key picture so as to modify said object as represented in said selected key picture.

82. Apparatus according to claim 81 wherein said first and second key pictures have time positions within aid sequence, said first key picture have a time position before said second key picture.

83. Apparatus according to claim 81 wherein aid first and second key picture have time positions within said sequence, said first key picture have a time position after said second key picture.

* * * * *

UNITED STATES PATENT AND TRADEMARK OFFICE
CERTIFICATE OF CORRECTION

PATENT NO. : 5,692,117
DATED : November 25, 1997
INVENTOR(S) : Berend et al.

It is certified that error appears in the above-indentified patent and that said Letters Patent is hereby corrected as shown below:

Column 1, line 22 "which senior" should read --which a senior--.

Column 1, line 39, "has successfully" should read --have successfully--.

Column 5, line 55, "6a-b" should read --6a--.

Column 6, line 38, "animate" should read --animated--.

Column 6, line 52 "embodiments" should read --embodiment--.

Column 6, line 56, "control point; FIGS. 29a-d show and" should read

--control point;

FIGS. 29a-d show an--.

Column 6, line 59, "and show" should read --and shows--.

Column 6, line 66, "and show" should read --and shows--.

Column 7, line 17, "FIG. 35; FIG. 39a" should read

--FIG. 35;

FIG. 39a--.

Column 7, line 43, "on the" should read --on a portion of the--.

Column 8, line 18, "illustrates" should read --illustrate--.

Column 9, line 34, "at its" should read --its--.

Column 11, line 48, "08/811,898" should read --08/311,398--.

Column 14, line 26, "other" should read --other hand--.

Column 16, line 17, "is correct." should read --are correct.--.

Column 16, line 38, "is by" should read --are by--.

Column 18, line 20, "5,611,086" should read --5,611,036--.

UNITED STATES PATENT AND TRADEMARK OFFICE
CERTIFICATE OF CORRECTION

PATENT NO. : 5,692,117

DATED : November 25, 1997

INVENTOR(S) : Berend et al.

It is certified that error appears in the above-indentified patent and that said Letters Patent is hereby corrected as shown below:

Column 22, line 44, "frame are" should read --frame is--.

Column 25, line 23, "key frame." should read --key frames.--.

Column 26, line 58, "key frame," should read --key frame),--.

Column 29, line 18, "coordinates are" should read --coordinates is--.

Column 39, lines 30-31, "160$f$14 160$h$" should read --160f-160h--.

Column 40, line 22, "symbols" should read --symbol--.

Column 41, line 20, "viewdinates" should read --coordinates--.

Column 52, line 14, "cloensional" should read --dimensional--.

Column 53, line 10, "there 8" should read --there are 8--.

Column 55, line 15, "fine" should read --line--.

Column 55, line 63, "point the" should read --point of the--.

Column 55, line 66, "claim 1" should read --claim 1,--.

Column 56, line 8, "display generator" should read --a display generator--.

Column 56, line 42, "at" should read --at a--.

Column 57, line 49, "claim 24" should read --claim 23--.

Column 57, line 60, "merge" should read --merging--.

Column 59, line 27, "try" should read --by--.

Column 60, line 21, "of" should read --of;--.

Column 60, line 52, "claim 59" should read --claim 57--.

Column 60, line 54, "claim 59" should read --claim 57--.

UNITED STATES PATENT AND TRADEMARK OFFICE
CERTIFICATE OF CORRECTION

PATENT NO. : 5,692,117
DATED : November 25, 1997
INVENTOR(S) : Berend et al.

It is certified that error appears in the above-indentified patent and that said Letters Patent is hereby corrected as shown below:

Column 60, line 60, "claim 59" should read --claim 57--.

Column 62, line 62, "end" should read --and--.

Column 64, line 2, "aid" should read --said--.

Column 64, line 3, "have" should read --having--.

Column 64, line 5, "aid" should read --said--.

Column 64, line 7, "have" should read --having--.

Signed and Sealed this

Eleventh Day of August 1998

Attest:

BRUCE LEHMAN

Attesting Officer

Commissioner of Patents and Trademarks